US012474336B2

(12) United States Patent
Becich et al.

(10) Patent No.: US 12,474,336 B2
(45) Date of Patent: Nov. 18, 2025

(54) BIOMARKERS FOR PREDICTING MULTIPLE SCLEROSIS DISEASE ACTIVITY

(71) Applicant: Octave Bioscience, Inc., Menlo Park, CA (US)

(72) Inventors: Michael Justin Becich, San Francisco, CA (US); Victor Michael Gehman, Burlingame, CA (US); Ferhan Qureshi, Fremont, CA (US); William A. Hagstrom, Santa Barbara, CA (US); Amal Kamal Katrib, Seattle, WA (US); Fatima Rubio da Costa, Mountain View, CA (US)

(73) Assignee: Octave Bioscience, Inc., Menlo Park, CA (US)

( * ) Notice: Subject to any disclaimer, the term of this patent is extended or adjusted under 35 U.S.C. 154(b) by 901 days.

(21) Appl. No.: 17/687,322

(22) Filed: Mar. 4, 2022

(65) Prior Publication Data
US 2022/0187295 A1 Jun. 16, 2022

Related U.S. Application Data

(63) Continuation of application No. PCT/US2020/049375, filed on Sep. 4, 2020.

(60) Provisional application No. 62/896,430, filed on Sep. 5, 2019.

(51) Int. Cl.
*G01N 33/564* (2006.01)
*G16H 50/20* (2018.01)
*G16H 50/30* (2018.01)

(52) U.S. Cl.
CPC .......... *G01N 33/564* (2013.01); *G16H 50/20* (2018.01); *G16H 50/30* (2018.01); *G01N 2800/285* (2013.01)

(58) Field of Classification Search
CPC .... G16H 50/20; G16H 50/30; G01N 2800/24; G01N 2800/28
See application file for complete search history.

(56) References Cited

U.S. PATENT DOCUMENTS

| 8,980,548 B2 | 3/2015 | Shuster et al. |
| 2015/0031562 A1 | 1/2015 | Kantor et al. |
| 2018/0275145 A1 | 9/2018 | Axtell et al. |
| 2019/0111263 A1* | 4/2019 | Levine ............... A61B 5/388 |
| 2019/0127798 A1 | 5/2019 | Hagstrom et al. |
| 2019/0192691 A1 | 6/2019 | Barrett et al. |
| 2019/0265254 A1 | 8/2019 | Bielekova et al. |
| 2020/0108016 A1* | 4/2020 | Cobb, Jr. ............ A61K 9/2013 |

FOREIGN PATENT DOCUMENTS

| WO | 2021/046329 A1 | 3/2021 |
| WO | 2022/051674 A1 | 3/2022 |

OTHER PUBLICATIONS

Comabella et al., "Body Fluid Biomarkers in Multiple Sclerosis," The Lancet Neurology, Dec. 9, 2013, vol. 13, Issue 1, pp. 113-126.
De Jager et al., "Meta-analysis of Genome Scans and Replication Identify CD6, IRF8 and TNFRSF1A as New Multiple Sclerosis Susceptibility Loci," Nat Genet, Jul. 2009; 4(7) 776-782.
Festa et al., "Serum Levels of CXCL 13 are Elevated in Active Multiple Sclerosis," Multiple Sclerosis, 15(11) 1271-1279, 2009.
Gironi et al., "Growth Hormone and Disease Severity in Early Stage of Multiple Sclerosis," Multiple Sclerosis International, vol. 2013, Article ID 836486, 5 pages.
Huang et al., "Meta-analysis of the IL23R and IL12B Polymorphisms in Multiple Sclerosis," International Journal of Neuroscience, 126:3, pp. 205-212, 2016.
Jahanbani-Ardakani et al., "Interleukin 18 Polymorphisms and its Serum Level in Patients with Multiple Sclerosis," Annals of Indian Academy of Neurology, 2019, 3 pages.
Lovett-Racke et al., "Th1 Versus Th17: Are T Cell Cytokines Relevant in Multiple Sclerosis?" Biochim Biophys Acta. Feb. 2001; 1812(2): 246-251.
Matsuda et al., "Increased Levels of Soluable Vascular Cell Adhesion Molecule-1 (VCAM-1) in the Cerebrospinal Fluid and Sera of Patients with Multiple Sclerosis and Human T Lymphotropic Virus Type-1-Associated Myelopathy," Journal of Neuroimmunology, 59 (1995) 35-40.
Notification of Transmittal of the International Search Report and the Written Opinion of the International Searching Authority, or the Declaration, Int'l Application No. PCT/US2020/049375, mailed Feb. 9, 2021, 71 pages.
Notification of Transmittal Of the International Search Report and the Written Opinion of the International Searching Authority, or the Declaration, Int'l Application No. PCT/US2021/49155, mailed Feb. 8, 2022, 22 pages.
Novakova et al., "Cerebrospinal Fluid Biomarkers as a Measure of Disease Activity and Treatment Efficacy in Relapsing-Remitting Multiple Sclerosis," Journal of Neurochemistry, Oct. 27, 2016, vol. 141, Issue 2, pp. 296-304.
Peterson et al., "VCAM-1-Positive Microglia Target Oligodendrocytes at the Border of Multiple Sclerosis Lesions," Journal of Neuropathology and Experimental Neurology, vol. 61, No. 6, Jun. 2002, pp. 539-546.

* cited by examiner

*Primary Examiner* — Changhwa J Cheu
(74) *Attorney, Agent, or Firm* — Goodwin Procter LLP

(57) ABSTRACT

Disclosed herein are methods for analzying quantitative expression values of biomarkers of a biomarker panel for determining disease activity in a human subject. Further disclosed herein are kits for measuring quantitative expression values of the markers as well as computer systems and software embodiments of predictive models for determining disease activity in human subjects based on the quantitative expression values of the markers.

15 Claims, 17 Drawing Sheets

Training Data
190

| Individual | Marker A | Marker B | ... | Indication |
|---|---|---|---|---|
| 1 | A1 | B1 | | Positive |
| 2 | A2 | B2 | | Positive |
| 3 | A3 | B3 | | Negative |
| 4 | A4 | B4 | | Negative |

FIG. 1C

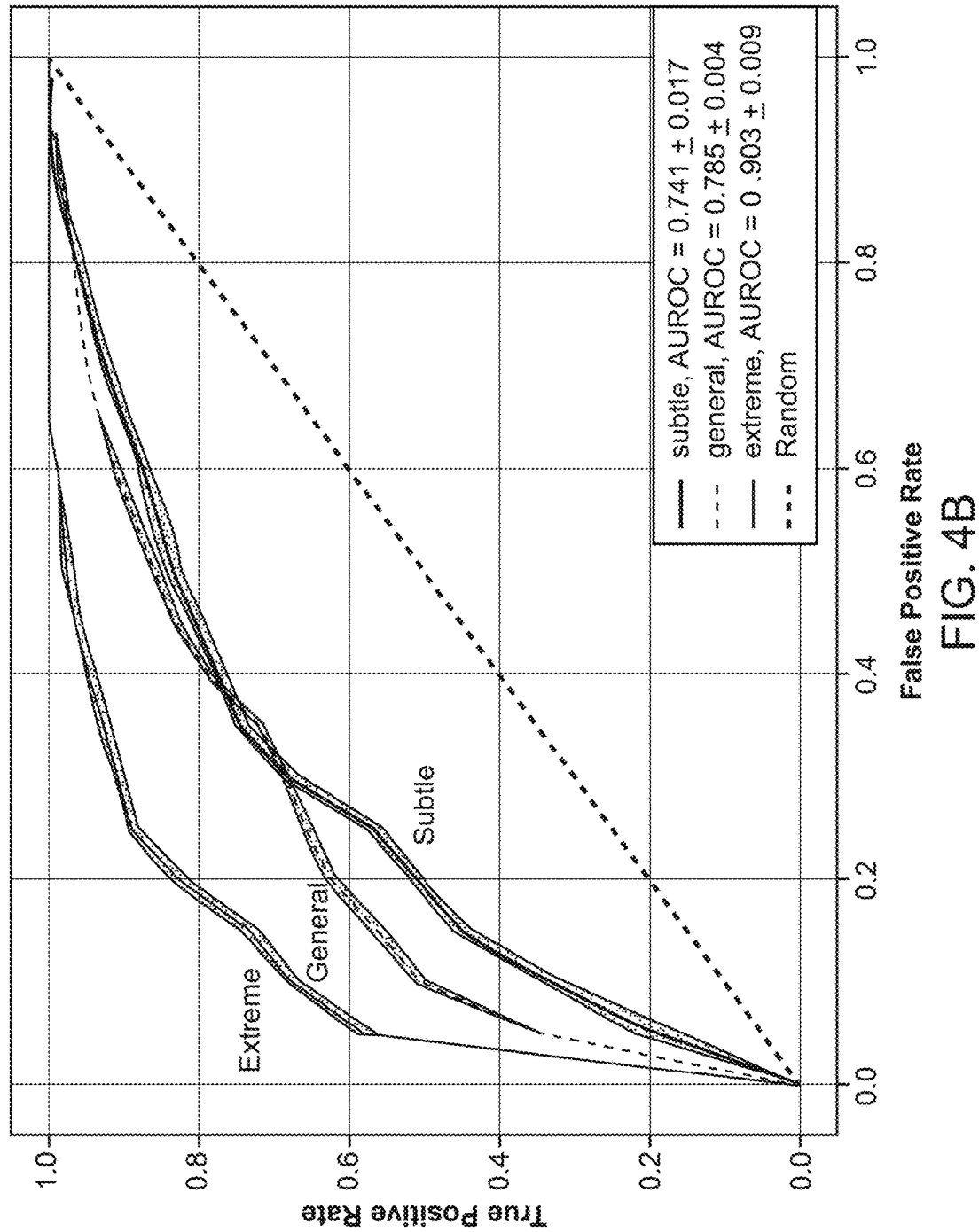

FIG. 4C

BIOMARKERS FOR PREDICTING MULTIPLE SCLEROSIS DISEASE ACTIVITY

CROSS REFERENCE TO RELATED APPLICATIONS

This application is a continuation of International Application No. PCT/US2020/049375, which claims the benefit of and priority to U.S. Provisional Patent Application No. 62/896,430 filed Sep. 5, 2019, the entire disclosures of which are hereby incorporated by reference in their entirety for all purposes.

SUMMARY

Disclosed herein are methods for predicting multiple sclerosis disease activity using multivariate biomarker panels. Additionally disclosed herein are non-transitory computer readable mediums for predicting multiple sclerosis disease activity using multivariate biomarker panels. Additionally disclosed herein are kits containing a set of reagents for determining expression levels of multivariate biomarkers that are informative for predicting multiple sclerosis disease activity. Additionally disclosed herein are systems for predicting multiple sclerosis disease activity using multivariate biomarker panels.

The advantages of a multivariate biomarker panel for detecting disease activity include the following:
  Improved sensitivity: A multi-biomarker test improves performance (AUC, accuracy), especially by eliminating false negatives as that individual biomarkers are unable to detect
  Subtle-disease activity: Multivariate models can help distinguish samples with one gadolinium (Gd) lesion better than individual biomarkers alone.
  Specificity: Individual biomarkers are often differentially expressed in other neurologic conditions. A multi-biomarker test would help differentiate multiple sclerosis specific disease activity/progression.
  Predictive Power: Multivariate models incorporating shifts in biomarker levels identify patients heading towards increasing or decreasing active lesions (w/stronger performance than individual biomarkers alone).

Disclosed herein is a method for determining multiple sclerosis activity in a subject, the method comprising: obtaining or having obtained a dataset comprising expression levels of a plurality of biomarkers, wherein the plurality of biomarkers comprise each biomarker in at least one group selected from group 1, group 2, and group 3, wherein group 1 comprises biomarker 1, biomarker 2, biomarker 3, biomarker 4, biomarker 5, biomarker 6, biomarker 7, and biomarker 8, wherein biomarker 1 is NEFL, MOG, CADM3, or GFAP, wherein biomarker 2 is MOG, CADM3, KLK6, BCAN, OMG, or GFAP, wherein biomarker 3 is CD6, CD5, CRTAM, CD244, or TNFRSF9, wherein biomarker 4 is CXCL9, CXCL10, IL-12B, CXCL11, or GFAP, wherein biomarker 5 is OPG, TFF3, or ENPP2, wherein biomarker 6 is OPN, OMD, MEPE, or GFAP, wherein biomarker 7 is CXCL13, NOS3, or MMP-2, and wherein biomarker 8 is GFAP, NEFL, OPN, CXCL9, MOG, or CHI3L1, and wherein group 2 comprises biomarker 9, biomarker 10, biomarker 11, biomarker 12, biomarker 13, biomarker 14, biomarker 15, biomarker 16, and biomarker 17, wherein biomarker 9 is CDCP1, IL-18BP, IL-18, GFAP, or MSR1, wherein biomarker 10 is CCL20, CCL3, or TWEAK, wherein biomarker 11 is IL-12B, IL12A, or CXCL9, wherein biomarker 12 is APLP1, SEZ6L, BCAN, DPP6, NCAN, or KLK6, wherein biomarker 13 is TNFRSF10A, TNFRSF11A, SPON2, CHI3L1, or IFI30, wherein biomarker 14 is COL4A1, IL6, NOTCH3, or PCDH17, wherein biomarker 15 is SERPINA9, TNFRSF9, or CNTN4, wherein biomarker 16 is FLRT2, DDR1, NTRK2, CDH6, MMP-2, and wherein biomarker 17 is TNFSF13B, CXCL16, ALCAM, or IL-18, wherein group 3 comprises biomarker 18, biomarker 19, biomarker 20, and biomarker 21, wherein biomarker 18 is GH, GH2, or IGFBP-1, wherein biomarker 19 is VCAN, TINAGL1, CANT1, NECTIN2, MMP-9, or NPDC1, wherein biomarker 20 is PRTG, NTRK2, NTRK3, or CNTN4, and wherein biomarker 21 is CNTN2, DPP6, GDNFR-alpha-3, or SCARF2, and generating a prediction of multiple sclerosis disease activity by applying a predictive model to the expression levels of the plurality of biomarkers.

In various embodiments, the plurality of biomarkers comprise each biomarker in group 1, wherein biomarker 1 is NEFL, wherein biomarker 2 is MOG, wherein biomarker 3 is CD6, wherein biomarker 4 is CXCL9, wherein biomarker 5 is OPG, wherein biomarker 6 is OPN, wherein biomarker 7 is CXCL13, and wherein biomarker 8 is GFAP. In various embodiments, a performance of the predictive model is characterized by an area under the curve (AUC) ranging from 0.667 to 0.869. In various embodiments, a performance of the predictive model is characterized by a positive predictive value ranging from 0.617 up to 0.861. In various embodiments, the plurality of biomarkers comprise each biomarker in group 2, wherein biomarker 9 is CDCP1, wherein biomarker 10 is CCL20, wherein biomarker 11 is IL-12B, wherein biomarker 12 is APLP1, wherein biomarker 13 is TNFRSF10A, wherein biomarker 14 is COL4A1, wherein biomarker 15 is SERPINA9, wherein biomarker 16 is FLRT2, and wherein biomarker 17 is TNFSF13B. In various embodiments, a performance of the predictive model is characterized by an area under the curve (AUC) ranging from 0.595 to 0.761. In various embodiments, a performance of the predictive model is characterized by a positive predictive value ranging from 0.523 to 0.769. In various embodiments, the plurality of biomarkers further comprise each biomarker in group 2, wherein biomarker 9 is CDCP1, wherein biomarker 10 is CCL20, wherein biomarker 11 is IL-12B, wherein biomarker 12 is APLP1, wherein biomarker 13 is TNFRSF10A, wherein biomarker 14 is COL4A1, wherein biomarker 15 is SERPINA9, wherein biomarker 16 is FLRT2, and wherein biomarker 17 is TNFSF13B. In various embodiments, a performance of the predictive model is characterized by an area under the curve (AUC) ranging from 0.693 to 0.892. In various embodiments, a performance of the predictive model is characterized by a positive predictive value ranging from 0.613 to 0.843.

In various embodiments, the plurality of biomarkers comprise each biomarker in group 3, wherein biomarker 18 is GH, wherein biomarker 19 is VCAN, wherein biomarker 20 is PRTG, and wherein biomarker 21 is CNTN2. In various embodiments, a performance of the predictive model is characterized by an area under the curve (AUC) ranging from 0.566 to 0.644. In various embodiments, a performance of the predictive model is characterized by a positive predictive value ranging from 0.370 to 0.742. In various embodiments, the plurality of biomarkers further comprise each biomarker in group 3, wherein biomarker 18 is GH, wherein biomarker 19 is VCAN, wherein biomarker 20 is PRTG, and wherein biomarker 21 is CNTN2. In various embodiments, a performance of the predictive model is characterized by an area under the curve (AUC) ranging from 0.686 to 0.889. In various embodiments, a performance of the predictive model is characterized by a positive predictive value ranging from 0.648 to 0.835.

Additionally disclosed herein is a method for determining multiple sclerosis activity in a subject, the method comprising: obtaining or having obtained a dataset comprising expression levels of a plurality of biomarkers comprising NEFL, MOG, CD6, CXCL9, OPG, OPN, CXCL13, and GFAP; and generating a prediction of multiple sclerosis disease activity by applying a predictive model to the expression levels of the plurality of biomarkers. In various embodiments, the plurality of biomarkers further comprises CDCP1, CCL20, IL-12B, APLP1, TNFRSF10A, COL4A1, SERPINA9, FLRT2, and TNFSF13B. In various embodiments, the plurality of biomarkers further comprise GH, VCAN, PRTG, and CNTN2.

Additionally disclosed herein is a method for generating quantitative data for a subject comprising: performing at least one immunoassay on a sample obtained from the subject to generate a dataset comprising the quantitative data, wherein the quantitative data represents at least eight protein biomarkers comprising: NEFL, MOG, CD6, CXCL9, OPG, OPN, CXCL13, and GFAP, wherein the subject has or is suspected of having multiple sclerosis. In various embodiments, the quantitative data further represents at least an additional nine protein biomarkers comprising: CDCP1, CCL20, IL-12B, APLP1, TNFRSF10A, COL4A1, SERPINA9, FLRT2, and TNFSF13B. In various embodiments, the quantitative data further represents at least an additional four protein biomarkers comprising: GH, VCAN, PRTG, and CNTN2. In various embodiments, the method further comprises: determining multiple sclerosis activity in the subject, wherein the determination comprises applying a predictive model to the quantitative data. In various embodiments, applying the determination further comprises comparing a score outputted by the predictive model to a reference score. In various embodiments, the reference score corresponds to any of: A) the patient at a baseline timepoint when the patient was not exhibiting disease activity, B) clinically diagnosed patients with no disease activity, or C) healthy patients.

Additionally disclosed herein is a method for determining multiple sclerosis activity in a subject, the method comprising: obtaining or having obtained a dataset comprising expression levels of a plurality of biomarkers comprising: one or more neurodegeneration biomarkers selected from a group consisting of NEFL, APLP1, OPG, SERPINA9, PRTG, GFAP, CNTN2, and FLRT2; one or more inflammation biomarkers selected from a group consisting of CCL20, GH, CXCL13, IL-12B, VCAN, TNFRSF10A, TNFSF13B, CD6, and CXCL9; one or more immune modulation biomarkers selected from a group consisting of CDCP1, and OPN; one or more myelin integrity biomarkers selected from a group consisting of COL4A1 and MOG; and generating a prediction of multiple sclerosis disease activity by applying a predictive model to the expression levels of the plurality of biomarkers.

In various embodiments, the one or more neurodegeneration biomarkers comprise NEFL, OPG, and GFAP, wherein the one or more inflammation biomarkers comprise CXCL13, CD6, and CXCL9, wherein the one or more immune modulation biomarkers comprise OPN, and wherein the one or more myelin integrity biomarkers comprise MOG. In various embodiments, the one or more neurodegeneration biomarkers further comprise APLP1, SERPINA9, and FLRT2, wherein the one or more inflammation biomarkers further comprise CCL20, IL-12B, TNFRSF10A, and TNFSF13B, wherein the one or more immune modulation biomarkers further comprise CDCP1, and wherein the one or more myelin integrity biomarkers further comprise COL4A1. In various embodiments, the one or more neurodegeneration biomarkers further comprise PRTG and CNTN2, and wherein the one or more inflammation biomarkers comprise GH and VCAN. In various embodiments, the plurality of biomarkers are protein biomarkers.

In various embodiments, the multiple sclerosis disease activity is any one of: a presence of general disease activity, a presence of subtle disease activity, a shift (increase or decrease) in disease activity, a severity of MS, a relapse or flare event associated with MS, a rate of relapse, a MS state, a response to a MS therapy, a degree of MS disability, or a risk of developing MS. In various embodiments, the general disease activity is a presence or absence of one or more gadolinium enhancing MRI lesion and wherein the subtle disease activity is a presence of one gadolinium enhancing MRI lesion. In various embodiments, the severity of MS corresponds to a number of gadolinium enhancing MRI lesions. In various embodiments, the MS state is an exacerbated or quiescent state of multiple sclerosis.

Additionally disclosed herein is a method for determining multiple sclerosis activity in a subject, the method comprising: obtaining or having obtained a dataset comprising expression levels of a plurality of biomarkers, wherein the plurality of biomarkers comprises two or more of: NEFL, MOG, CD6, CXCL9, OPG, OPN, CXCL13, GFAP, CDCP1, CCL20, IL-12B, APLP1, TNFRSF10A, COL4A1, SERPINA9, FLRT2, TNFSF13B, GH, VCAN, PRTG, and CNTN2; and generating a prediction of multiple sclerosis disease activity by applying a predictive model to the expression levels of the plurality of biomarkers.

Additionally disclosed herein is a method for preparing a biomarker fraction from a sample obtained from a subject, the method comprising: (a) extracting biomarkers from the sample; (b) producing a fraction of the extracted biomarkers after (a), wherein the fraction of the extracted biomarkers after (b) comprises a plurality of biomarkers, wherein the plurality of biomarkers comprises two or more of: NEFL, MOG, CD6, CXCL9, OPG, OPN, CXCL13, GFAP, CDCP1, CCL20, IL-12B, APLP1, TNFRSF10A, COL4A1, SERPINA9, FLRT2, TNFSF13B, GH, VCAN, PRTG, and CNTN2; (c) analyzing the plurality of biomarkers of the fraction of the extracted biomarkers produced in (b). In various embodiments, the two or more biomarkers comprise NEFL and at least one other biomarker. In various embodiments, the two or more biomarkers are a pair of biomarkers selected from any one of: A) NEFL and CD6, B) NEFL and MOG, C) NEFL and CXCL9, and D) NEFL and TNFRSF10A. In various embodiments, the two or more biomarkers are a biomarker triplicate selected from any one of: A) NEFL, CD6, and CXCL9 and B) NEFL, TNFRSF10A, and COL4A1. In various embodiments, the two or more biomarkers are a biomarker quadruplet selected from any one of: A) NEFL, MOG, CD6, and CXCL9, B) NEFL, CXCL9, TNFRSF10A, and COL4A1, C) NEFL, CD6, CXCL9, and CXCL13, and D) NEFL, TNFRSF10A, COL4A1, and CCL20. In various embodiments, the two or more biomarkers do not include NEFL. In various embodiments, the two or more biomarkers are a pair of biomarkers selected from any one of: A) MOG and IL-12B, B) CXCL9 and CD6, C) MOG and CXCL9, D) MOG and CD6, E) CXCL9 and COL4A1, and F) CD6 and VCAN. In various embodiments, the two or more biomarkers are a biomarker triplicate selected from any one of: A) MOG, IL-12B, and APLP1, B) MOG, CD6, and CXCL9, C) CXCL9, COL4A1, and VCAN, D) MOG, IL-12B, and CNTN2, and E) CD6, CCL20, and VCAN. In various embodiments, the two or more biomarkers are a biomarker quadruplet selected from any one of: A) MOG, CXCL9, IL-12B, APLP1, B) CXCL9, COL4A1, OPG, and VCAN, C) CXCL9, OPG, APLP1, and OPN, D) MOG, IL-12B, OPN, and CNTN2, and E) CD6, COL4A1, CCL20, and VCAN. In various embodiments, the multiple sclerosis activity is a shift in disease activity.

In various embodiments, the two or more biomarkers are a pair of biomarkers selected from any one of: A) NEFL and TNFSF13B, B) NEFL and CNTN2, and C) NEFL and CXCL9. In various embodiments, the two or more biomarkers are a biomarker triplicate selected from any one of: A) NEFL, CNTN2, and TNFSF13B, B) NEFL, APLP1, and TNFSF13B, and C) NEFL, TNFRSF10A, and TNFSF13B. In various embodiments, the two or more biomarkers are a biomarker quadruplet selected from any one of: A) NEFL, TNFRSF10A, CNTN2, and TNFSF13B, B) NEFL, COL4A1, CNTN2, and TNFSF13B, and C) NEFL, TNFRSF10A, APLP1, and TNFSF13B. In various embodiments, the two or more biomarkers are a pair of biomarkers selected from any one of: A) MOG and CDCP1, B) MOG and TNFSF13B, and C) MOG and CXCL9. In various embodiments, the two or more biomarkers are a biomarker triplicate and wherein one biomarker of the biomarker triplicate is MOG. In various embodiments, the biomarker triplicate is selected from any one of: A) MOG, CXCL9, and TNFSF13B, B) MOG, OPG, and TNFSF13B, and C) MOG, CCL20, and TNFSF13B. In various embodiments, the two or more biomarkers are a biomarker quadruplet and wherein one biomarker of the biomarker quadruplet is MOG. In various embodiments, the biomarker quadruplet is selected from any one of: A) MOG, CXCL9, APLP1, and TNFSF13B, B) MOG, CXCL9, OPG, and TNFSF13B, and C) MOG, CXCL9, OPG, and CNTN2. In various embodiments, the multiple sclerosis activity is a presence or absence of multiple sclerosis.

In various embodiments, the two or more biomarkers are a pair of biomarkers selected from any one of: A) NEFL and TNFSF13B, B) NEFL and SERPINA9, and C) NEFL and GH. In various embodiments, the two or more biomarkers are a biomarker triplicate selected from any one of: A) NEFL, SERPINA9, and TNFSF13B, B) NEFL, CNTN2, and TNFSF13B, and C) NEFL, APLP1, and TNFSF13B. In various embodiments, the two or more biomarkers are a biomarker quadruplet selected from any one of: A) NEFL, CCL20, SERPINA9, and TNFSF13B, B) NEFL, APLP1, SERPINA9, and TNFSF13B, C) NEFL, CCL20, APLP1, and TNFSF13B. In various embodiments, the two or more biomarkers are a biomarker pair selected from any one of: A) MOG and TNFSF13B, B) MOG and CXCL9, and C) MOG and IL-12B. In various embodiments, the two or more biomarkers are a biomarker triplicate selected from any one of: A) MOG, CXCL9, and TNFSF13B, B) MOG, SERPINA9, and TNFSF13B, and C) MOG, OPG, and TNFSF13B. In various embodiments, the two or more biomarkers are a biomarker quadruplet selected from any one of: A) MOG, CXCL9, OPG, and TNFSF13B, B) MOG, CXCL9, OPG, SERPINA9, and TNFSF13B, C) MOG, CXCL9, SERPINA9, and TNFSF13B. In various embodiments, the multiple sclerosis activity is disease severity based on a predicted number of gadolinium enhancing lesions.

In various embodiments, the two or more biomarkers are a biomarker pair selected from any one of: A) GFAP and MOG, B) GFAP and NEFL, C) APLP1 and GFAP, D) NEFL and MOG, E) or CXCL9 and OPG. In various embodiments, the two or more biomarkers are a biomarker triplicate selected from any one of: A) GFAP, NEFL, and MOG, B) NEFL, MOG, and GH, C) NEFL, MOG, and SERPINA9, D) CXCL9, OPG, and SERPINA9, E) or CXCL9, OPG, and TNFRSF10A. In various embodiments, the two or more biomarkers are a biomarker triplicate selected from any one of: A) GFAP, NEFL, MOG, and IL12B, B) GFAP, NEFL, MOG, and PRTG, C) GFAP, NEFL, MOG, and APLP1, D) NEFL, MOG, GH, and SERPINA9, E) NEFL, MOG, GH, and TNFRSF10A, F) MOG, CXCL9, OPG, and SERPINA9, or G) CD6, IL12B, APLP1, and CCL20. In various embodiments, the multiple sclerosis activity is disease progression.

In various embodiments, the method further comprises classifying the subject based on the prediction. In various embodiments, generating the prediction of multiple sclerosis disease activity comprises comparing a score outputted by the predictive model to a reference score. In various embodiments, the reference score corresponds to any of: A) the patient at a baseline timepoint when the patient was not exhibiting disease activity, B) clinically diagnosed patients with no disease activity, or C) healthy patients. In various embodiments, the expression levels of the plurality of biomarkers is determined from a test sample obtained from the subject. In various embodiments, the test sample is a blood or serum sample. In various embodiments, the subject has multiple sclerosis, is suspected of having multiple sclerosis, or was previously diagnosed with multiple sclerosis. In various embodiments, obtaining or having obtained the dataset comprises performing an immunoassay to determine the expression levels of the plurality of biomarkers. In various embodiments, the immunoassay is a Proximity Extension Assay (PEA) or LUMINEX xMAP Multiplex Assay. In various embodiments, performing the immunoassay comprises contacting a test sample with a plurality of reagents comprising antibodies. In various embodiments, the antibodies comprise one of monoclonal and polyclonal antibodies. In various embodiments, the antibodies comprise both monoclonal and polyclonal antibodies.

In various embodiments, the method further comprises selecting a therapy for administering to the subject based on the prediction of multiple sclerosis disease activity. In various embodiments, the method further comprises determining a therapeutic efficacy of a therapy previously administered to the subject based on the prediction of multiple sclerosis disease activity. In various embodiments, determining the therapeutic efficacy of the therapy comprises comparing the prediction to a prior prediction determined for the subject at a prior timepoint. In various embodiments, determining the therapeutic efficacy of the therapy comprises determining that the therapy exhibits efficacy responsive to a difference between the prediction and the prior prediction. In various embodiments, determining the therapeutic efficacy of the therapy comprises determining that the therapy lacks efficacy responsive to a lack of difference between the prediction and the prior prediction. In various embodiments, the method further comprises determining a differential diagnosis of multiple sclerosis based on the prediction of multiple sclerosis disease activity. In various embodiments, the differential diagnosis of multiple sclerosis comprises at least one of relapsing-remitting multiple sclerosis (RRMS), secondary progressive multiple sclerosis (SPMS), primary-progressive multiple sclerosis (PPMS), progressive relapsing multiple sclerosis (PRMS), and clinically isolated syndrome (CIS).

Additionally disclosed herein is a non-transitory computer readable medium for determining multiple sclerosis activity in a subject, the non-transitory computer readable medium comprising instructions that, when executed by a processor, cause the processor to: obtain a dataset comprising expression levels of a plurality of biomarkers, wherein the plurality of biomarkers comprise each biomarker in at least one group selected from group 1, group 2, and group 3, wherein group 1 comprises biomarker 1, biomarker 2, biomarker 3, biomarker 4, biomarker 5, biomarker 6, biomarker 7, and biomarker 8, wherein biomarker 1 is NEFL, MOG, CADM3, or GFAP, wherein biomarker 2 is MOG, CADM3, KLK6, BCAN, OMG, or GFAP, wherein biomarker 3 is CD6, CD5, CRTAM, CD244, or TNFRSF9, wherein biomarker 4 is CXCL9, CXCL10, IL-12B, CXCL11, or GFAP, wherein biomarker 5 is OPG, TFF3, or ENPP2, wherein biomarker 6 is OPN, OMD, MEPE, or GFAP, wherein biomarker 7 is CXCL13, NOS3, or MMP-2, and wherein biomarker 8 is GFAP, NEFL, OPN, CXCL9, MOG, or CHI3L1, and wherein group 2 comprises biomarker 9, biomarker 10, biomarker 11, biomarker 12, biomarker 13, biomarker 14, biomarker 15, biomarker 16, and biomarker 17, wherein biomarker 9 is CDCP1, IL-18BP, IL-18, GFAP, or MSR1, wherein biomarker 10 is CCL20, CCL3, or TWEAK, wherein biomarker 11 is IL-12B, IL12A, or CXCL9, wherein biomarker 12 is APLP1, SEZ6L, BCAN, DPP6, NCAN, or KLK6, wherein biomarker 13 is TNFRSF10A, TNFRSF11A, SPON2, CHI3L1, or IFI30, wherein biomarker 14 is COL4A1, IL6, NOTCH3, or PCDH17, wherein biomarker 15 is SERPINA9, TNFRSF9, or CNTN4, wherein biomarker 16 is FLRT2, DDR1, NTRK2, CDH6, MMP-2, and wherein biomarker 17 is TNFSF13B, CXCL16, ALCAM, or IL-18, wherein group 3 comprises biomarker 18, biomarker 19, biomarker 20, and biomarker 21, wherein biomarker 18 is GH, GH2, or IGFBP-1, wherein biomarker 19 is VCAN, TINAGL1, CANT1, NECTIN2, MMP-9, or NPDC1, wherein biomarker 20 is PRTG, NTRK2, NTRK3, or CNTN4, and wherein biomarker 21 is CNTN2, DPP6, GDNFR-alpha-3, or SCARF2, and generate a prediction of multiple sclerosis disease activity by applying a predictive model to the expression levels of the plurality of biomarkers.

In various embodiments, the plurality of biomarkers comprise each biomarker in group 1, wherein biomarker 1 is NEFL, wherein biomarker 2 is MOG, wherein biomarker 3 is CD6, wherein biomarker 4 is CXCL9, wherein biomarker 5 is OPG, wherein biomarker 6 is OPN, wherein biomarker 7 is CXCL13, and wherein biomarker 8 is GFAP. In various embodiments, a performance of the predictive model is characterized by an area under the curve (AUC) ranging from 0.667 to 0.869. In various embodiments, a performance of the predictive model is characterized by a positive predictive value ranging from 0.617 up to 0.861.

In various embodiments, the plurality of biomarkers comprise each biomarker in group 2, wherein biomarker 9 is CDCP1, wherein biomarker 10 is CCL20, wherein biomarker 11 is IL-12B, wherein biomarker 12 is APLP1, wherein biomarker 13 is TNFRSF10A, wherein biomarker 14 is COL4A1, wherein biomarker 15 is SERPINA9, wherein biomarker 16 is FLRT2, and wherein biomarker 17 is TNFSF13B. In various embodiments, a performance of the predictive model is characterized by an area under the curve (AUC) ranging from 0.595 to 0.761. In various embodiments, a performance of the predictive model is characterized by a positive predictive value ranging from 0.523 to 0.769.

In various embodiments, the plurality of biomarkers further comprise each biomarker in group 2, wherein biomarker 9 is CDCP1, wherein biomarker 10 is CCL20, wherein biomarker 11 is IL-12B, wherein biomarker 12 is APLP1, wherein biomarker 13 is TNFRSF10A, wherein biomarker 14 is COL4A1, wherein biomarker 15 is SERPINA9, wherein biomarker 16 is FLRT2, and wherein biomarker 17 is TNFSF13B. In various embodiments, a performance of the predictive model is characterized by an area under the curve (AUC) ranging from 0.693 to 0.892. In various embodiments, a performance of the predictive model is characterized by a positive predictive value ranging from 0.613 to 0.843.

In various embodiments, the plurality of biomarkers comprise each biomarker in group 3, wherein biomarker 18 is GH, wherein biomarker 19 is VCAN, wherein biomarker 20 is PRTG, and wherein biomarker 21 is CNTN2. In various embodiments, a performance of the predictive model is characterized by an area under the curve (AUC) ranging from 0.566 to 0.644. In various embodiments, a performance of the predictive model is characterized by a positive predictive value ranging from 0.370 to 0.742. In various embodiments, the plurality of biomarkers further comprise each biomarker in group 3, wherein biomarker 18 is GH, wherein biomarker 19 is VCAN, wherein biomarker 20 is PRTG, and wherein biomarker 21 is CNTN2. In various embodiments, a performance of the predictive model is characterized by an area under the curve (AUC) ranging from 0.686 to 0.889. In various embodiments, a performance of the predictive model is characterized by a positive predictive value ranging from 0.648 to 0.835.

Additionally disclosed herein is a non-transitory computer readable medium for determining multiple sclerosis activity in a subject, the non-transitory computer readable medium comprising instructions that, when executed by a processor, cause the processor to perform steps of: obtaining or having obtained a dataset comprising expression levels of a plurality of biomarkers comprising NEFL, MOG, CD6, CXCL9, OPG, OPN, CXCL13, and GFAP; and generating a prediction of multiple sclerosis disease activity by applying a predictive model to the expression levels of the plurality of biomarkers. In various embodiments, the plurality of biomarkers further comprises CDCP1, CCL20, IL-12B, APLP1, TNFRSF10A, COL4A1, SERPINA9, FLRT2, and TNFSF13B. In various embodiments, the plurality of biomarkers further comprise GH, VCAN, PRTG, and CNTN2.

Additionally disclosed herein is a non-transitory computer readable medium for determining multiple sclerosis activity in a subject, the non-transitory computer readable medium comprising instructions that, when executed by a processor, cause the processor to: obtain a dataset comprising expression levels of a plurality of biomarkers comprising: one or more neurodegeneration biomarkers selected from a group consisting of NEFL, APLP1, OPG, SERPINA9, PRTG, GFAP, CNTN2, and FLRT2; one or more inflammation biomarkers selected from a group consisting of CCL20, GH, CXCL13, IL-12B, VCAN, TNFRSF10A, TNFSF13B, CD6, and CXCL9; one or more immune modulation biomarkers selected from a group consisting of CDCP1, and OPN; one or more myelin integrity biomarkers selected from a group consisting of COL4A1 and MOG; and generating a prediction of multiple sclerosis disease activity by applying a predictive model to the expression levels of the plurality of biomarkers.

In various embodiments, the one or more neurodegeneration biomarkers comprise NEFL, OPG, and GFAP, wherein the one or more inflammation biomarkers comprise CXCL13, CD6, and CXCL9, wherein the one or more immune modulation biomarkers comprise OPN, and wherein the one or more myelin integrity biomarkers comprise MOG. In various embodiments, the one or more neurodegeneration biomarkers further comprise APLP1, SERPINA9, and FLRT2, wherein the one or more inflammation biomarkers further comprise CCL20, IL-12B, TNFRSF10A, and TNFSF13B, wherein the one or more immune modulation biomarkers further comprise CDCP1, and wherein the one or more myelin integrity biomarkers further comprise COL4A1. In various embodiments, the one or more neurodegeneration biomarkers further comprise PRTG and CNTN2, and wherein the one or more inflammation biomarkers comprise GH and VCAN. In various embodiments, the plurality of biomarkers are protein biomarkers. In various embodiments, the multiple sclerosis disease activity is any one of a presence of general disease activity, a presence of subtle disease activity, a shift (increase or decrease) in disease activity, a severity of MS, a relapse or flare event associated with MS, a rate of relapse, a MS state, a response to a MS therapy, a degree of MS disability, or a risk of developing MS. In various embodiments, the general disease activity is a presence or absence of one or more gadolinium enhancing MRI lesion and wherein the subtle disease activity is a presence of one gadolinium enhancing MRI lesion. In various embodiments, the severity of MS corresponds to a number of gadolinium enhancing MRI lesions. In various embodiments, the MS state is an exacerbated or quiescent state of multiple sclerosis.

Additionally disclosed herein is a non-transitory computer readable medium for determining multiple sclerosis activity in a subject, the non-transitory computer readable medium comprising instructions that, when executed by a processor, cause the processor to: obtain a dataset comprising expression levels of a plurality of biomarkers, wherein the plurality of biomarkers comprises two or more of: NEFL, MOG, CD6, CXCL9, OPG, OPN, CXCL13, GFAP, CDCP1, CCL20, IL-12B, APLP1, TNFRSF10A, COL4A1, SERPINA9, FLRT2, TNFSF13B, GH, VCAN, PRTG, and CNTN2; and generate a prediction of multiple sclerosis disease activity by applying a predictive model to the expression levels of the plurality of biomarkers. In various embodiments, the two or more biomarkers comprise NEFL and at least one other biomarker.

In various embodiments, the two or more biomarkers are a pair of biomarkers selected from any one of: A) NEFL and CD6, B) NEFL and MOG, C) NEFL and CXCL9, and D) NEFL and TNFRSF10A. In various embodiments, the two or more biomarkers are a biomarker triplicate selected from any one of: A) NEFL, CD6, and CXCL9 and B) NEFL, TNFRSF10A, and COL4A1. In various embodiments, the two or more biomarkers are a biomarker quadruplet selected from any one of: A) NEFL, MOG, CD6, and CXCL9, B) NEFL, CXCL9, TNFRSF10A, and COL4A1, C) NEFL, CD6, CXCL9, and CXCL13, and D) NEFL, TNFRSF10A, COL4A1, and CCL20. In various embodiments, the two or more biomarkers do not include NEFL. In various embodiments, the two or more biomarkers are a pair of biomarkers selected from any one of: A) MOG and IL-12B, B) CXCL9 and CD6, C) MOG and CXCL9, D) MOG and CD6, E) CXCL9 and COL4A1, and F) CD6 and VCAN. In various embodiments, the two or more biomarkers are a biomarker triplicate selected from any one of: A) MOG, IL-12B, and APLP1, B) MOG, CD6, and CXCL9, C) CXCL9, COL4A1, and VCAN, D) MOG, IL-12B, and CNTN2, and E) CD6, CCL20, and VCAN. In various embodiments, the two or more biomarkers are a biomarker quadruplet selected from any one of: A) MOG, CXCL9, IL-12B, APLP1, B) CXCL9, COL4A1, OPG, and VCAN, C) CXCL9, OPG, APLP1, and OPN, D) MOG, IL-12B, OPN, and CNTN2, and E) CD6, COL4A1, CCL20, and VCAN. In various embodiments, the multiple sclerosis activity is a shift in disease activity.

In various embodiments, the two or more biomarkers are a pair of biomarkers selected from any one of: A) NEFL and TNFSF13B, B) NEFL and CNTN2, and C) NEFL and CXCL9. In various embodiments, the two or more biomarkers are a biomarker triplicate selected from any one of: A) NEFL, CNTN2, and TNFSF13B, B) NEFL, APLP1, and TNFSF13B, and C) NEFL, TNFRSF10A, and TNFSF13B. In various embodiments, the two or more biomarkers are a biomarker quadruplet selected from any one of: A) NEFL, TNFRSF10A, CNTN2, and TNFSF13B, B) NEFL, COL4A1, CNTN2, and TNFSF13B, and C) NEFL, TNFRSF10A, APLP1, and TNFSF13B. In various embodiments, the two or more biomarkers are a pair of biomarkers selected from any one of: A) MOG and CDCP1, B) MOG and TNFSF13B, and C) MOG and CXCL9. In various embodiments, the two or more biomarkers are a biomarker triplicate and wherein one biomarker of the biomarker triplicate is MOG. In various embodiments, the biomarker triplicate is selected from any one of: A) MOG, CXCL9, and TNFSF13B, B) MOG, OPG, and TNFSF13B, and C) MOG, CCL20, and TNFSF13B. In various embodiments, the two or more biomarkers are a biomarker quadruplet and wherein one biomarker of the biomarker quadruplet is MOG. In various embodiments, the biomarker quadruplet is selected from any one of: A) MOG, CXCL9, APLP1, and TNFSF13B, B) MOG, CXCL9, OPG, and TNFSF13B, and C) MOG, CXCL9, OPG, and CNTN2. In various embodiments, the multiple sclerosis activity is a presence or absence of multiple sclerosis.

In various embodiments, the two or more biomarkers are a pair of biomarkers selected from any one of: A) NEFL and TNFSF13B, B) NEFL and SERPINA9, and C) NEFL and GH. In various embodiments, the two or more biomarkers are a biomarker triplicate selected from any one of: A) NEFL, SERPINA9, and TNFSF13B, B) NEFL, CNTN2, and TNFSF13B, and C) NEFL, APLP1, and TNFSF13B. In various embodiments, the two or more biomarkers are a biomarker quadruplet selected from any one of: A) NEFL, CCL20, SERPINA9, and TNFSF13B, B) NEFL, APLP1, SERPINA9, and TNFSF13B, C) NEFL, CCL20, APLP1, and TNFSF13B. In various embodiments, the two or more biomarkers are a biomarker pair selected from any one of: A) MOG and TNFSF13B, B) MOG and CXCL9, and C) MOG and IL-12B. In various embodiments, the biomarker triplicate is selected from any one of: A) MOG, CXCL9, and TNFSF13B, B) MOG, SERPINA9, and TNFSF13B, and C) MOG, OPG, and TNFSF13B. In various embodiments, the biomarker quadruplet is selected from any one of: A) MOG, CXCL9, OPG, and TNFSF13B, B) MOG, CXCL9, OPG, SERPINA9, and TNFSF13B, C) MOG, CXCL9, SERPINA9, and TNFSF13B. In various embodiments, the multiple sclerosis activity is disease severity based on a predicted number of gadolinium enhancing lesions.

In various embodiments, the two or more biomarkers are a biomarker pair selected from any one of: A) GFAP and MOG, B) GFAP and NEFL, C) APLP1 and GFAP, D) NEFL and MOG, E) or CXCL9 and OPG. In various embodiments, the two or more biomarkers are a biomarker triplicate selected from any one of: A) GFAP, NEFL, and MOG, B) NEFL, MOG, and GH, C) NEFL, MOG, and SERPINA9, D) CXCL9, OPG, and SERPINA9, E) or CXCL9, OPG, and TNFRSF10A. In various embodiments, the two or more biomarkers are a biomarker triplicate selected from any one of: A) GFAP, NEFL, MOG, and IL12B, B) GFAP, NEFL, MOG, and PRTG, C) GFAP, NEFL, MOG, and APLP1, D) NEFL, MOG, GH, and SERPINA9, E) NEFL, MOG, GH, and TNFRSF10A, F) MOG, CXCL9, OPG, and SERPINA9, or G) CD6, IL12B, APLP1, and CCL20. In various embodiments, the multiple sclerosis activity is disease progression.

In various embodiments, the steps further comprise classifying the subject based on the prediction. In various embodiments, generating the prediction of multiple sclerosis disease activity comprises comparing a score outputted by the predictive model to a reference score. In various embodiments, the reference score corresponds to any of: A) the patient at a baseline timepoint when the patient was not exhibiting disease activity, B) clinically diagnosed patients with no disease activity, or C) healthy patients.

In various embodiments, the expression levels of the plurality of biomarkers is determined from a test sample obtained from the subject. In various embodiments, the test sample is a blood or serum sample. In various embodiments, the subject has multiple sclerosis, is suspected of having multiple sclerosis, or was previously diagnosed with multiple sclerosis. In various embodiments, the dataset is obtained from a performed immunoassay. In various embodiments, the immunoassay is a Proximity Extension Assay (PEA) or LUMINEX xMAP Multiplex Assay. In various embodiments, performing the immunoassay comprises contacting a test sample with a plurality of reagents comprising antibodies. In various embodiments, the antibodies comprise one of monoclonal and polyclonal antibodies. In various embodiments, the antibodies comprise both monoclonal and polyclonal antibodies.

In various embodiments, the steps further comprise: selecting a therapy for administering to the subject based on the prediction of multiple sclerosis disease activity. In various embodiments, the steps further comprise: determining a therapeutic efficacy of a therapy previously administered to the subject based on the prediction of multiple sclerosis disease activity. In various embodiments, determining the therapeutic efficacy of the therapy comprises comparing the prediction to a prior prediction determined for the subject at a prior timepoint. In various embodiments, determining the therapeutic efficacy of the therapy comprises determining that the therapeutic exhibits efficacy responsive to a difference between the prediction and the prior prediction. In various embodiments, determining the therapeutic efficacy of the therapy comprises determining that the therapeutic lacks efficacy responsive to a lack of difference between the prediction and the prior prediction. In various embodiments, the steps further comprise determining a differential diagnosis of multiple sclerosis based on the prediction of multiple sclerosis disease activity. In various embodiments, the differential diagnosis of multiple sclerosis comprises any one of relapsing-remitting multiple sclerosis (RRMS), secondary progressive multiple sclerosis (SPMS), primary-progressive multiple sclerosis (PPMS), progressive relapsing multiple sclerosis (PRMS), and clinically isolated syndrome (CIS).

Additionally disclosed herein is a kit for assessing multiple sclerosis disease activity in a subject, the kit comprising: a set of reagents for determining expression levels for a plurality of biomarkers from a test sample from the subject, wherein the plurality of biomarkers comprise each biomarker in at least one group selected from group 1, group 2, and group 3, wherein group 1 comprises biomarker 1, biomarker 2, biomarker 3, biomarker 4, biomarker 5, biomarker 6, biomarker 7, and biomarker 8, wherein biomarker 1 is NEFL, MOG, CADM3, or GFAP, wherein biomarker 2 is MOG, CADM3, KLK6, BCAN, OMG, or GFAP, wherein biomarker 3 is CD6, CD5, CRTAM, CD244, or TNFRSF9, wherein biomarker 4 is CXCL9, CXCL10, IL-12B, CXCL11, or GFAP, wherein biomarker 5 is OPG, TFF3, or ENPP2, wherein biomarker 6 is OPN, OMD, MEPE, or GFAP, wherein biomarker 7 is CXCL13, NOS3, or MMP-2, and wherein biomarker 8 is GFAP, NEFL, OPN, CXCL9, MOG, or CHI3L1, and wherein group 2 comprises biomarker 9, biomarker 10, biomarker 11, biomarker 12, biomarker 13, biomarker 14, biomarker 15, biomarker 16, and biomarker 17, wherein biomarker 9 is CDCP1, IL-18BP, IL-18, GFAP, or MSR1, wherein biomarker 10 is CCL20, CCL3, or TWEAK, wherein biomarker 11 is IL-12B, IL12A, or CXCL9, wherein biomarker 12 is APLP1, SEZ6L, BCAN, DPP6, NCAN, or KLK6, wherein biomarker 13 is TNFRSF10A, TNFRSF11A, SPON2, CHI3L1, or IFI30, wherein biomarker 14 is COL4A1, IL6, NOTCH3, or PCDH17, wherein biomarker 15 is SERPINA9, TNFRSF9, or CNTN4, wherein biomarker 16 is FLRT2, DDR1, NTRK2, CDH6, MMP-2, and wherein biomarker 17 is TNFSF13B, CXCL16, ALCAM, or IL-18, wherein group 3 comprises biomarker 18, biomarker 19, biomarker 20, and biomarker 21, wherein biomarker 18 is GH, GH2, or IGFBP-1, wherein biomarker 19 is VCAN, TINAGL1, CANT1, NECTIN2, MMP-9, or NPDC1, wherein biomarker 20 is PRTG, NTRK2, NTRK3, or CNTN4, and wherein biomarker 21 is CNTN2, DPP6, GDNFR-alpha-3, or SCARF2, and instructions for using the set of reagents to determine the expression levels of biomarkers from the test sample.

In various embodiments, the plurality of biomarkers comprise each biomarker in group 1, wherein biomarker 1 is NEFL, wherein biomarker 2 is MOG, wherein biomarker 3 is CD6, wherein biomarker 4 is CXCL9, wherein biomarker 5 is OPG, wherein biomarker 6 is OPN, wherein biomarker 7 is CXCL13, and wherein biomarker 8 is GFAP. In various embodiments, a performance of the predictive model is characterized by an area under the curve (AUC) ranging from 0.667 to 0.869. In various embodiments, a performance of the predictive model is characterized by a positive predictive value ranging from 0.617 up to 0.861.

In various embodiments, the plurality of biomarkers comprise each biomarker in group 2, wherein biomarker 9 is CDCP1, wherein biomarker 10 is CCL20, wherein biomarker 11 is IL-12B, wherein biomarker 12 is APLP1, wherein biomarker 13 is TNFRSF10A, wherein biomarker 14 is COL4A1, wherein biomarker 15 is SERPINA9, wherein biomarker 16 is FLRT2, and wherein biomarker 17 is TNFSF13B. In various embodiments, the predictive model is characterized by an area under the curve (AUC) ranging from 0.595 to 0.761. In various embodiments, a performance of the predictive model is characterized by a positive predictive value ranging from 0.523 to 0.769.

In various embodiments, the plurality of biomarkers further comprise each biomarker in group 2, wherein biomarker 9 is CDCP1, wherein biomarker 10 is CCL20, wherein biomarker 11 is IL-12B, wherein biomarker 12 is APLP1, wherein biomarker 13 is TNFRSF10A, wherein biomarker 14 is COL4A1, wherein biomarker 15 is SERPINA9, wherein biomarker 16 is FLRT2, and wherein biomarker 17 is TNFSF13B. In various embodiments, a performance of the predictive model is characterized by an area under the curve (AUC) ranging from 0.693 to 0.892. In various embodiments, a performance of the predictive model is characterized by a positive predictive value ranging from 0.613 to 0.843. In various embodiments, the plurality of biomarkers comprise each biomarker in group 3, wherein biomarker 18 is GH, wherein biomarker 19 is VCAN, wherein biomarker 20 is PRTG, and wherein biomarker 21 is CNTN2. In various embodiments, a performance of the predictive model is characterized by an area under the curve (AUC) ranging from 0.566 to 0.644. In various embodiments, a performance of the predictive model is characterized by a positive predictive value ranging from 0.370 to 0.742. In various embodiments, the plurality of biomarkers further comprise each biomarker in group 3, wherein biomarker 18 is GH, wherein biomarker 19 is VCAN, wherein biomarker 20 is PRTG, and wherein biomarker 21 is CNTN2. In various embodiments, a performance of the predictive model is characterized by an area under the curve (AUC) ranging from 0.686 to 0.889. In various embodiments, a performance of the predictive model is characterized by a positive predictive value ranging from 0.648 to 0.835.

Additionally disclosed herein is a kit for assessing multiple sclerosis disease activity in a subject, the kit comprising: a set of reagents for determining expression levels for a plurality of biomarkers from a test sample from the subject, wherein the plurality of biomarkers comprise NEFL, MOG, CD6, CXCL9, OPG, OPN, CXCL13, and GFAP; and instructions for using the set of reagents to determine the expression levels of biomarkers from the test sample. In various embodiments, the plurality of biomarkers further comprises CDCP1, CCL20, IL-12B, APLP1, TNFRSF10A, COL4A1, SERPINA9, FLRT2, and TNFSF13B. In various embodiments, the plurality of biomarkers further comprise GH, VCAN, PRTG, and CNTN2.

Additionally disclosed herein is a kit for assessing multiple sclerosis disease activity in a subject, the kit comprising: a set of reagents for determining expression levels for a plurality of biomarkers from a test sample from the subject, wherein the plurality of biomarkers comprise: one or more neurodegeneration biomarkers selected from a group consisting of NEFL, APLP1, OPG, SERPINA9, PRTG, GFAP, CNTN2, and FLRT2; one or more inflammation biomarkers selected from a group consisting of CCL20, GH, CXCL13, IL-12B, VCAN, TNFRSF10A, TNFSF13B, CD6, and CXCL9; one or more immune modulation biomarkers selected from a group consisting of CDCP1, and OPN; one or more myelin integrity biomarkers selected from a group consisting of COL4A1 and MOG; and instructions for using the set of reagents to determine the expression levels of biomarkers from the test sample. In various embodiments, the one or more neurodegeneration biomarkers comprise NEFL, OPG, and GFAP, wherein the one or more inflammation biomarkers comprise CXCL13, CD6, and CXCL9, wherein the one or more immune modulation biomarkers comprise OPN, and wherein the one or more myelin integrity biomarkers comprise MOG. In various embodiments, the one or more neurodegeneration biomarkers further comprise APLP1, SERPINA9, and FLRT2, wherein the one or more inflammation biomarkers further comprise CCL20, IL-12B, TNFRSF10A, and TNFSF13B, wherein the one or more immune modulation biomarkers further comprise CDCP1, and wherein the one or more myelin integrity biomarkers further comprise COL4A1. In various embodiments, the one or more neurodegeneration biomarkers further comprise PRTG and CNTN2, and wherein the one or more inflammation biomarkers comprise GH and VCAN. In various embodiments, the plurality of biomarkers are protein biomarkers. In various embodiments, the multiple sclerosis disease activity is any one of: a presence of general disease activity, a presence of subtle disease activity, a shift (increase or decrease) in disease activity, a severity of MS, a relapse or flare event associated with MS, a rate of relapse, a MS state, a response to a MS therapy, a degree of MS disability, or a risk of developing MS. In various embodiments, the general disease activity is a presence or absence of one or more gadolinium enhancing MRI lesion and wherein the subtle disease activity is a presence of one gadolinium enhancing MRI lesion. In various embodiments, the severity of MS corresponds to a number of gadolinium enhancing MRI lesions. In various embodiments, the MS state is an exacerbated or quiescent state of multiple sclerosis.

Additionally disclosed herein is a kit for determining multiple sclerosis activity in a subject, the kit comprising: a set of reagents for determining expression levels for a plurality of biomarkers from a test sample from the subject, the plurality of biomarkers comprising two or more of: NEFL, MOG, CD6, CXCL9, OPG, OPN, CXCL13, GFAP, CDCP1, CCL20, IL-12B, APLP1, TNFRSF10A, COL4A1, SERPINA9, FLRT2, TNFSF13B, GH, VCAN, PRTG, and CNTN2; and instructions for using the set of reagents to determine the expression levels of biomarkers from the test sample. In various embodiments, the two or more biomarkers comprise NEFL and at least one other biomarker. In various embodiments, the two or more biomarkers are a pair of biomarkers selected from any one of: A) NEFL and CD6, B) NEFL and MOG, C) NEFL and CXCL9, and D) NEFL and TNFRSF10A. In various embodiments, the two or more biomarkers are a biomarker triplicate selected from any one of: A) NEFL, CD6, and CXCL9 and B) NEFL, TNFRSF10A, and COL4A1. In various embodiments, the two or more biomarkers are a biomarker quadruplet selected from any one of: A) NEFL, MOG, CD6, and CXCL9, B) NEFL, CXCL9, TNFRSF10A, and COL4A1, C) NEFL, CD6, CXCL9, and CXCL13, and D) NEFL, TNFRSF10A, COL4A1, and CCL20. In various embodiments, the two or more biomarkers do not include NEFL. In various embodiments, the two or more biomarkers are a pair of biomarkers selected from any one of: A) MOG and IL-12B, B) CXCL9 and CD6, C) MOG and CXCL9, D) MOG and CD6, E) CXCL9 and COL4A1, and F) CD6 and VCAN. In various embodiments, the two or more biomarkers are a biomarker triplicate selected from any one of: A) MOG, IL-12B, and APLP1, B) MOG, CD6, and CXCL9, C) CXCL9, COL4A1, and VCAN, D) MOG, IL-12B, and CNTN2, and E) CD6, CCL20, and VCAN. In various embodiments, the two or more biomarkers are a biomarker quadruplet selected from any one of: A) MOG, CXCL9, IL-12B, APLP1, B) CXCL9, COL4A1, OPG, and VCAN, C) CXCL9, OPG, APLP1, and OPN, D) MOG, IL-12B, OPN, and CNTN2, and E) CD6, COL4A1, CCL20, and VCAN. In various embodiments, the multiple sclerosis activity is a shift in disease activity.

In various embodiments, the two or more biomarkers are a pair of biomarkers selected from any one of: A) NEFL and TNFSF13B, B) NEFL and CNTN2, and C) NEFL and CXCL9. In various embodiments, the two or more biomarkers are a biomarker triplicate selected from any one of: A) NEFL, CNTN2, and TNFSF13B, B) NEFL, APLP1, and TNFSF13B, and C) NEFL, TNFRSF10A, and TNFSF13B. In various embodiments, the two or more biomarkers are a biomarker quadruplet selected from any one of: A) NEFL, TNFRSF10A, CNTN2, and TNFSF13B, B) NEFL, COL4A1, CNTN2, and TNFSF13B, and C) NEFL, TNFRSF10A, APLP1, and TNFSF13B. In various embodiments, the two or more biomarkers are a pair of biomarkers selected from any one of: A) MOG and CDCP1, B) MOG and TNFSF13B, and C) MOG and CXCL9. In various embodiments, the two or more biomarkers are a biomarker triplicate and wherein one biomarker of the biomarker triplicate is MOG. In various embodiments, the biomarker triplicate is selected from any one of: A) MOG, CXCL9, and TNFSF13B, B) MOG, OPG, and TNFSF13B, and C) MOG, CCL20, and TNFSF13B. In various embodiments, the two or more biomarkers are a biomarker quadruplet and wherein one biomarker of the biomarker quadruplet is MOG. In various embodiments, the biomarker quadruplet is selected from any one of: A) MOG, CXCL9, APLP1, and TNFSF13B, B) MOG, CXCL9, OPG, and TNFSF13B, and C) MOG, CXCL9, OPG, and CNTN2. In various embodiments, the multiple sclerosis activity is a presence or absence of multiple sclerosis.

In various embodiments, the two or more biomarkers are a pair of biomarkers selected from any one of: A) NEFL and TNFSF13B, B) NEFL and SERPINA9, and C) NEFL and GH. In various embodiments, the two or more biomarkers are a biomarker triplicate selected from any one of: A) NEFL, SERPINA9, and TNFSF13B, B) NEFL, CNTN2, and TNFSF13B, and C) NEFL, APLP1, and TNFSF13B. In various embodiments, the two or more biomarkers are a biomarker quadruplet selected from any one of: A) NEFL, CCL20, SERPINA9, and TNFSF13B, B) NEFL, APLP1, SERPINA9, and TNFSF13B, C) NEFL, CCL20, APLP1, and TNFSF13B. In various embodiments, the two or more biomarkers are a biomarker pair selected from any one of: A) MOG and TNFSF13B, B) MOG and CXCL9, and C) MOG and IL-12B. In various embodiments, the two or more biomarkers are a biomarker triplicate selected from any one of: A) MOG, CXCL9, and TNFSF13B, B) MOG, SERPINA9, and TNFSF13B, and C) MOG, OPG, and TNFSF13B. In various embodiments, the two or more biomarkers are a biomarker quadruplet selected from any one of: A) MOG, CXCL9, OPG, and TNFSF13B, B) MOG, CXCL9, OPG, SERPINA9, and TNFSF13B, C) MOG, CXCL9, SERPINA9, and TNFSF13B. In various embodiments, the multiple sclerosis activity is disease severity based on a predicted number of gadolinium enhancing lesions.

In various embodiments, the two or more biomarkers are a biomarker pair selected from any one of: A) GFAP and MOG, B) GFAP and NEFL, C) APLP1 and GFAP, D) NEFL and MOG, E) or CXCL9 and OPG. In various embodiments, the two or more biomarkers are a biomarker triplicate selected from any one of: A) GFAP, NEFL, and MOG, B) NEFL, MOG, and GH, C) NEFL, MOG, and SERPINA9, D) CXCL9, OPG, and SERPINA9, E) or CXCL9, OPG, and TNFRSF10A. In various embodiments, the two or more biomarkers are a biomarker triplicate selected from any one of: A) GFAP, NEFL, MOG, and IL12B, B) GFAP, NEFL, MOG, and PRTG, C) GFAP, NEFL, MOG, and APLP1, D) NEFL, MOG, GH, and SERPINA9, E) NEFL, MOG, GH, and TNFRSF10A, F) MOG, CXCL9, OPG, and SERPINA9, or G) CD6, IL12B, APLP1, and CCL20. In various embodiments, the multiple sclerosis activity is disease progression.

In various embodiments, the instructions further comprise instructions for generating the prediction of multiple sclerosis disease activity by applying a predictive model to the expression levels of the plurality of biomarkers. In various embodiments, generating the prediction of multiple sclerosis disease activity comprises comparing a score outputted by the predictive model to a reference score. In various embodiments, the reference score corresponds to any of: A) the patient at a baseline timepoint when the patient was not exhibiting disease activity, B) clinically diagnosed patients with no disease activity, or C) healthy patients. In various embodiments, the test sample is a blood or serum sample. In various embodiments, the subject has multiple sclerosis, is suspected of having multiple sclerosis, or was previously diagnosed with multiple sclerosis. In various embodiments, the instructions for using the set of reagents comprises instructions for performing an immunoassay to determine the expression levels of the plurality of biomarkers. In various embodiments, the immunoassay is a Proximity Extension Assay (PEA) or LUMINEX xMAP Multiplex Assay. In various embodiments, the performing immunoassay comprises contacting a test sample with a plurality of reagents comprising antibodies. In various embodiments, the antibodies comprise one of monoclonal and polyclonal antibodies. In various embodiments, the antibodies comprise both monoclonal and polyclonal antibodies.

In various embodiments, the kit further comprises instructions for: selecting a therapy for administering to the subject based on the prediction of multiple sclerosis disease activity. In various embodiments, the kit further comprises instructions for: determining a therapeutic efficacy of a therapy previously administered to the subject based on the prediction of multiple sclerosis disease activity. In various embodiments, determining the therapeutic efficacy of the therapy comprises comparing the prediction to a prior prediction determined for the subject at a prior timepoint In various embodiments, determining the therapeutic efficacy of the therapy comprises determining that the therapeutic exhibits efficacy responsive to a difference between the prediction and the prior prediction. In various embodiments, determining the therapeutic efficacy of the therapy comprises determining that the therapeutic lacks efficacy responsive to a lack of difference between the prediction and the prior prediction. In various embodiments, the kit further comprises instructions for determining a differential diagnosis of multiple sclerosis based on the prediction of multiple sclerosis disease activity. In various embodiments, the differential diagnosis of multiple sclerosis comprises any one of relapsing-remitting multiple sclerosis (RRMS), secondary progressive multiple sclerosis (SPMS), primary-progressive multiple sclerosis (PPMS), progressive relapsing multiple sclerosis (PRMS), and clinically isolated syndrome (CIS).

Additionally disclosed herein is a system for assessing multiple sclerosis disease activity in a subject, the system comprising: a set of reagents used for determining expression levels for a plurality of biomarkers from a test sample from the subject, wherein the plurality of biomarkers comprise each biomarker in at least one group selected from group 1, group 2, and group 3, wherein group 1 comprises biomarker 1, biomarker 2, biomarker 3, biomarker 4, biomarker 5, biomarker 6, biomarker 7, and biomarker 8, wherein biomarker 1 is NEFL, MOG, CADM3, or GFAP, wherein biomarker 2 is MOG, CADM3, KLK6, BCAN, OMG, or GFAP, wherein biomarker 3 is CD6, CD5, CRTAM, CD244, or TNFRSF9, wherein biomarker 4 is CXCL9, CXCL10, IL-12B, CXCL11, or GFAP, wherein biomarker 5 is OPG, TFF3, or ENPP2, wherein biomarker 6 is OPN, OMD, MEPE, or GFAP, wherein biomarker 7 is CXCL13, NOS3, or MMP-2, and wherein biomarker 8 is GFAP, NEFL, OPN, CXCL9, MOG, or CHI3L1, and wherein group 2 comprises biomarker 9, biomarker 10, biomarker 11, biomarker 12, biomarker 13, biomarker 14, biomarker 15, biomarker 16, and biomarker 17, wherein biomarker 9 is CDCP1, IL-18BP, IL-18, GFAP, or MSR1, wherein biomarker 10 is CCL20, CCL3, or TWEAK, wherein biomarker 11 is IL-12B, IL12A, or CXCL9, wherein biomarker 12 is APLP1, SEZ6L, BCAN, DPP6, NCAN, or KLK6, wherein biomarker 13 is TNFRSF10A, TNFRSF11A, SPON2, CHI3L1, or IFI30, wherein biomarker 14 is COL4A1, IL6, NOTCH3, or PCDH17, wherein biomarker 15 is SERPINA9, TNFRSF9, or CNTN4, wherein biomarker 16 is FLRT2, DDR1, NTRK2, CDH6, MMP-2, and wherein biomarker 17 is TNFSF13B, CXCL16, ALCAM, or IL-18, wherein group 3 comprises biomarker 18, biomarker 19, biomarker 20, and biomarker 21, wherein biomarker 18 is GH, GH2, or IGFBP-1, wherein biomarker 19 is VCAN, TINAGL1, CANT1, NECTIN2, MMP-9, or NPDC1, wherein biomarker 20 is PRTG, NTRK2, NTRK3, or CNTN4, and wherein biomarker 21 is CNTN2, DPP6, GDNFR-alpha-3, or SCARF2, and an apparatus configured to receive a mixture of one or more reagents in the set and the test sample and to measure the expression levels for the biomarkers from the test sample; and a computer system communicatively coupled to the apparatus to obtain a dataset comprising the expression levels for the plurality of biomarkers from the test sample and to generate a prediction of multiple sclerosis disease activity by applying a predictive model to the expression levels of the plurality of biomarkers.

In various embodiments, the plurality of biomarkers comprise each biomarker in group 1, wherein biomarker 1 is NEFL, wherein biomarker 2 is MOG, wherein biomarker 3 is CD6, wherein biomarker 4 is CXCL9, wherein biomarker 5 is OPG, wherein biomarker 6 is OPN, wherein biomarker 7 is CXCL13, and wherein biomarker 8 is GFAP. In various embodiments, a performance of the predictive model is characterized by an area under the curve (AUC) ranging from 0.667 to 0.869. In various embodiments, a performance of the predictive model is characterized by a positive predictive value ranging from 0.617 up to 0.861.

In various embodiments, the plurality of biomarkers comprise each biomarker in group 2, wherein biomarker 9 is CDCP1, wherein biomarker 10 is CCL20, wherein biomarker 11 is IL-12B, wherein biomarker 12 is APLP1, wherein biomarker 13 is TNFRSF10A, wherein biomarker 14 is COL4A1, wherein biomarker 15 is SERPINA9, wherein biomarker 16 is FLRT2, and wherein biomarker 17 is TNFSF13B. In various embodiments, a performance of the predictive model is characterized by an area under the curve (AUC) ranging from 0.595 to 0.761. In various embodiments, a performance of the predictive model is characterized by a positive predictive value ranging from 0.523 to 0.769.

In various embodiments, the plurality of biomarkers further comprise each biomarker in group 2, wherein biomarker 9 is CDCP1, wherein biomarker 10 is CCL20, wherein biomarker 11 is IL-12B, wherein biomarker 12 is APLP1, wherein biomarker 13 is TNFRSF10A, wherein biomarker 14 is COL4A1, wherein biomarker 15 is SERPINA9, wherein biomarker 16 is FLRT2, and wherein biomarker 17 is TNFSF13B. In various embodiments, a performance of the predictive model is characterized by an area under the curve (AUC) ranging from 0.693 to 0.892. In various embodiments, a performance of the predictive model is characterized by a positive predictive value ranging from 0.613 to 0.843.

In various embodiments, the plurality of biomarkers comprise each biomarker in group 3, wherein biomarker 18 is GH, wherein biomarker 19 is VCAN, wherein biomarker 20 is PRTG, and wherein biomarker 21 is CNTN2. In various embodiments, a performance of the predictive model is characterized by an area under the curve (AUC) ranging from 0.566 to 0.644. In various embodiments, a performance of the predictive model is characterized by a positive predictive value ranging from 0.370 to 0.742.

In various embodiments, the plurality of biomarkers further comprise each biomarker in group 3, wherein biomarker 18 is GH, wherein biomarker 19 is VCAN, wherein biomarker 20 is PRTG, and wherein biomarker 21 is CNTN2. In various embodiments, a performance of the predictive model is characterized by an area under the curve (AUC) ranging from 0.686 to 0.889. In various embodiments, a performance of the predictive model is characterized by a positive predictive value ranging from 0.648 to 0.835.

Additionally disclosed herein is a system for assessing multiple sclerosis disease activity in a subject, the system comprising: a set of reagents used for determining expression levels for a plurality of biomarkers from a test sample from the subject, wherein the plurality of biomarkers comprise NEFL, MOG, CD6, CXCL9, OPG, OPN, CXCL13, and GFAP; and an apparatus configured to receive a mixture of one or more reagents in the set and the test sample and to measure the expression levels for the biomarkers from the test sample; and a computer system communicatively coupled to the apparatus to obtain a dataset comprising the expression levels for the plurality of biomarkers from the test sample and to generate a prediction of multiple sclerosis disease activity by applying a predictive model to the expression levels of the plurality of biomarkers. In various embodiments, the plurality of biomarkers further comprises CDCP1, CCL20, IL-12B, APLP1, TNFRSF10A, COL4A1, SERPINA9, FLRT2, and TNFSF13B. In various embodiments, the plurality of biomarkers further comprise GH, VCAN, PRTG, and CNTN2.

Additionally disclosed herein is a system for determining multiple sclerosis activity in a subject, the system comprising: a set of reagents used for determining expression levels for a plurality of biomarkers from a test sample from the subject, wherein the plurality of biomarkers comprise: obtaining or having obtained a dataset comprising expression levels of a plurality of biomarkers comprising: one or more neurodegeneration biomarkers selected from a group consisting of NEFL, APLP1, OPG, SERPINA9, PRTG, GFAP, CNTN2, and FLRT2; one or more inflammation biomarkers selected from a group consisting of CCL20, GH, CXCL13, IL-12B, VCAN, TNFRSF10A, TNFSF13B, CD6, and CXCL9; one or more immune modulation biomarkers selected from a group consisting of CDCP1, and OPN; one or more myelin integrity biomarkers selected from a group consisting of COL4A1 and MOG; and an apparatus configured to receive a mixture of one or more reagents in the set and the test sample and to measure the expression levels for the biomarkers from the test sample; and a computer system communicatively coupled to the apparatus to obtain a dataset comprising the expression levels for the plurality of biomarkers from the test sample and to generate a prediction of multiple sclerosis disease activity by applying a predictive model to the expression levels of the plurality of biomarkers.

In various embodiments, the one or more neurodegeneration biomarkers comprise NEFL, OPG, and GFAP, wherein the one or more inflammation biomarkers comprise CXCL13, CD6, and CXCL9, wherein the one or more immune modulation biomarkers comprise OPN, and wherein the one or more myelin integrity biomarkers comprise MOG. In various embodiments, the one or more neurodegeneration biomarkers further comprise APLP1, SERPINA9, and FLRT2, wherein the one or more inflammation biomarkers further comprise CCL20, IL-12B, TNFRSF10A, and TNFSF13B, wherein the one or more immune modulation biomarkers further comprise CDCP1, and wherein the one or more myelin integrity biomarkers further comprise COL4A1. In various embodiments, the one or more neurodegeneration biomarkers further comprise PRTG and CNTN2, and wherein the one or more inflammation biomarkers comprise GH and VCAN. In various embodiments, the plurality of biomarkers are protein biomarkers. In various embodiments, the multiple sclerosis disease activity is any one of: a presence of general disease activity, a presence of subtle disease activity, a shift (increase or decrease) in disease activity, a severity of MS, a relapse or flare event associated with MS, a rate of relapse, a MS state, a response to a MS therapy, a degree of MS disability, or a risk of developing MS. In various embodiments, the general disease activity is a presence or absence of one or more gadolinium enhancing MRI lesion and wherein the subtle disease activity is a presence of one gadolinium enhancing MRI lesion. In various embodiments, the severity of MS corresponds to a number of gadolinium enhancing MRI lesions. In various embodiments, the MS state is an exacerbated or quiescent state of multiple sclerosis.

Additionally disclosed herein is a system for determining multiple sclerosis activity in a subject, the system comprising: a set of reagents used for determining expression levels for a plurality of biomarkers from a test sample from the subject, wherein the plurality of biomarkers comprise two or more of: NEFL, MOG, CD6, CXCL9, OPG, OPN, CXCL13, GFAP, CDCP1, CCL20, IL-12B, APLP1, TNFRSF10A, COL4A1, SERPINA9, FLRT2, TNFSF13B, GH, VCAN, PRTG, and CNTN2; and an apparatus configured to receive a mixture of one or more reagents in the set and the test sample and to measure the expression levels for the biomarkers from the test sample; and a computer system communicatively coupled to the apparatus to obtain a dataset comprising the expression levels for the plurality of biomarkers from the test sample and to generate a prediction of multiple sclerosis disease activity by applying a predictive model to the expression levels of the plurality of biomarkers. In various embodiments, the two or more biomarkers comprise NEFL and at least one other biomarker. In various embodiments, the two or more biomarkers are a pair of biomarkers selected from any one of: A) NEFL and CD6, B) NEFL and MOG, C) NEFL and CXCL9, and D) NEFL and TNFRSF10A. In various embodiments, the two or more biomarkers are a biomarker triplicate selected from any one of: A) NEFL, CD6, and CXCL9 and B) NEFL, TNFRSF10A, and COL4A1. In various embodiments, the two or more biomarkers are a biomarker quadruplet selected from any one of: A) NEFL, MOG, CD6, and CXCL9, B) NEFL, CXCL9, TNFRSF10A, and COL4A1, C) NEFL, CD6, CXCL9, and CXCL13, and D) NEFL, TNFRSF10A, COL4A1, and CCL20. In various embodiments, the two or more biomarkers do not include NEFL. In various embodiments, the two or more biomarkers are a pair of biomarkers selected from any one of: A) MOG and IL-12B, B) CXCL9 and CD6, C) MOG and CXCL9, D) MOG and CD6, E) CXCL9 and COL4A1, and F) CD6 and VCAN.

In various embodiments, the two or more biomarkers are a biomarker triplicate selected from any one of: A) MOG, IL-12B, and APLP1, B) MOG, CD6, and CXCL9, C) CXCL9, COL4A1, and VCAN, D) MOG, IL-12B, and CNTN2, and E) CD6, CCL20, and VCAN. In various embodiments, the two or more biomarkers are a biomarker quadruplet selected from any one of: A) MOG, CXCL9, IL-12B, APLP1, B) CXCL9, COL4A1, OPG, and VCAN, C) CXCL9, OPG, APLP1, and OPN, D) MOG, IL-12B, OPN, and CNTN2, and E) CD6, COL4A1, CCL20, and VCAN. In various embodiments, the multiple sclerosis activity is a shift in disease activity.

In various embodiments, the two or more biomarkers are a pair of biomarkers selected from any one of: A) NEFL and TNFSF13B, B) NEFL and CNTN2, and C) NEFL and CXCL9. In various embodiments, the two or more biomarkers are a biomarker triplicate selected from any one of: A) NEFL, CNTN2, and TNFSF13B, B) NEFL, APLP1, and TNFSF13B, and C) NEFL, TNFRSF10A, and TNFSF13B. In various embodiments, the two or more biomarkers are a biomarker quadruplet selected from any one of: A) NEFL, TNFRSF10A, CNTN2, and TNFSF13B, B) NEFL, COL4A1, CNTN2, and TNFSF13B, and C) NEFL, TNFRSF10A, APLP1, and TNFSF13B. In various embodiments, the two or more biomarkers are a pair of biomarkers selected from any one of: A) MOG and CDCP1, B) MOG and TNFSF13B, and C) MOG and CXCL9. In various embodiments, the two or more biomarkers are a biomarker triplicate and wherein one biomarker of the biomarker triplicate is MOG. In various embodiments, the biomarker triplicate is selected from any one of: A) MOG, CXCL9, and TNFSF13B, B) MOG, OPG, and TNFSF13B, and C) MOG, CCL20, and TNFSF13B. In various embodiments, the two or more biomarkers are a biomarker quadruplet and wherein one biomarker of the biomarker quadruplet is MOG. In various embodiments, the biomarker quadruplet is selected from any one of: A) MOG, CXCL9, APLP1, and TNFSF13B, B) MOG, CXCL9, OPG, and TNFSF13B, and C) MOG, CXCL9, OPG, and CNTN2. In various embodiments, the multiple sclerosis activity is a presence or absence of multiple sclerosis.

In various embodiments, the two or more biomarkers are a pair of biomarkers selected from any one of: A) NEFL and TNFSF13B, B) NEFL and SERPINA9, and C) NEFL and GH. In various embodiments, the two or more biomarkers are a biomarker triplicate selected from any one of: A) NEFL, SERPINA9, and TNFSF13B, B) NEFL, CNTN2, and TNFSF13B, and C) NEFL, APLP1, and TNFSF13B. In various embodiments, the two or more biomarkers are a biomarker quadruplet selected from any one of: A) NEFL, CCL20, SERPINA9, and TNFSF13B, B) NEFL, APLP1, SERPINA9, and TNFSF13B, C) NEFL, CCL20, APLP1, and TNFSF13B. In various embodiments, the two or more biomarkers are a biomarker pair selected from any one of: A) MOG and TNFSF13B, B) MOG and CXCL9, and C) MOG and IL-12B. In various embodiments, the two or more biomarkers are a biomarker triplicate selected from any one of: A) MOG, CXCL9, and TNFSF13B, B) MOG, SERPINA9, and TNFSF13B, and C) MOG, OPG, and TNFSF13B. In various embodiments, the two or more biomarkers are a biomarker quadruplet selected from any one of: A) MOG, CXCL9, OPG, and TNFSF13B, B) MOG, CXCL9, OPG, SERPINA9, and TNFSF13B, C) MOG, CXCL9, SERPINA9, and TNFSF13B. In various embodiments, the multiple sclerosis activity is disease severity based on a predicted number of gadolinium enhancing lesions.

In various embodiments, the two or more biomarkers are a biomarker pair selected from any one of: A) GFAP and MOG, B) GFAP and NEFL, C) APLP1 and GFAP, D) NEFL and MOG, E) or CXCL9 and OPG. In various embodiments, the two or more biomarkers are a biomarker triplicate selected from any one of: A) GFAP, NEFL, and MOG, B) NEFL, MOG, and GH, C) NEFL, MOG, and SERPINA9, D) CXCL9, OPG, and SERPINA9, E) or CXCL9, OPG, and TNFRSF10A. In various embodiments, the two or more biomarkers are a biomarker triplicate selected from any one of: A) GFAP, NEFL, MOG, and IL12B, B) GFAP, NEFL, MOG, and PRTG, C) GFAP, NEFL, MOG, and APLP1, D) NEFL, MOG, GH, and SERPINA9, E) NEFL, MOG, GH, and TNFRSF10A, F) MOG, CXCL9, OPG, and SERPINA9, or G) CD6, IL12B, APLP1, and CCL20. In various embodiments, the multiple sclerosis activity is disease progression.

In various embodiments, generate the prediction of multiple sclerosis disease activity comprises comparing a score outputted by the predictive model to a reference score. In various embodiments, the reference score corresponds to any of: A) the patient at a baseline timepoint when the patient was not exhibiting disease activity, B) clinically diagnosed patients with no disease activity, or C) healthy patients.

In various embodiments, the test sample is a blood or serum sample. In various embodiments, the subject has multiple sclerosis, is suspected of having multiple sclerosis, or was previously diagnosed with multiple sclerosis. In various embodiments, the apparatus is configured to perform an immunoassay to determine the expression levels of the plurality of biomarkers. In various embodiments, the immunoassay is a Proximity Extension Assay (PEA) or LUMINEX xMAP Multiplex Assay. In various embodiments, performing the immunoassay comprises contacting a test sample with a plurality of reagents comprising antibodies. In various embodiments, the antibodies comprise one of monoclonal and polyclonal antibodies. In various embodiments, the antibodies comprise both monoclonal and polyclonal antibodies.

In various embodiments, the computer system is further configured to select a therapy for administering to the subject based on the prediction of multiple sclerosis disease activity. In various embodiments, the computer system is further configured to determine a therapeutic efficacy of a therapy previously administered to the subject based on the prediction of multiple sclerosis disease activity. In various embodiments, determining the therapeutic efficacy of the therapy comprises comparing the prediction to a prior prediction determined for the subject at a prior timepoint. In various embodiments, determining the therapeutic efficacy of the therapy comprises determining that the therapeutic exhibits efficacy responsive to a difference between the prediction and the prior prediction. In various embodiments, determining the therapeutic efficacy of the therapy comprises determining that the therapeutic lacks efficacy responsive to a lack of difference between the prediction and the prior prediction. In various embodiments, the computer system is further configured to determine a differential diagnosis of multiple sclerosis based on the prediction of multiple sclerosis disease activity. In various embodiments, the differential diagnosis of multiple sclerosis comprises any one of relapsing-remitting multiple sclerosis (RRMS), secondary progressive multiple sclerosis (SPMS), primary-progressive multiple sclerosis (PPMS), progressive relapsing multiple sclerosis (PRMS), and clinically isolated syndrome (CIS).

BRIEF DESCRIPTION OF THE DRAWINGS

These and other features, aspects, and advantages of the present invention will become better understood with regard to the following description and accompanying drawings.

FIG. 1C depicts an example set of training data, in accordance with an embodiment.

FIG. 4B depicts the ROC curve of the trained model for predicting disease activity (subtle, general, and extreme disease activity).

FIG. 4C depicts the confusion matrix for each of the subtle disease model, general disease model, and extreme disease model.

DETAILED DESCRIPTION

I. Definitions

Figure 1A:
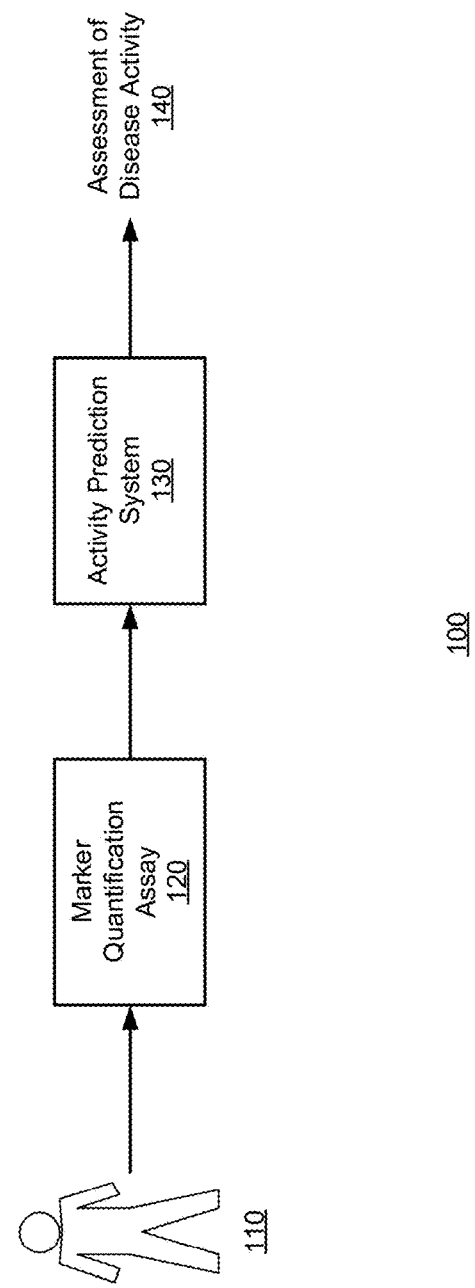
FIG. 1A depicts an overview of an environment for assessing disease activity in a subject via an activity prediction system, in accordance with an embodiment.

Terms used in the claims and specification are defined as set forth below unless otherwise specified.

The term "subject" encompasses a cell, tissue, or organism, human or non-human, whether in vivo, ex vivo, or in vitro, male or female.

The term "mammal" encompasses both humans and non-humans and includes but is not limited to humans, non-human primates, canines, felines, murines, bovines, equines, and porcines.

The term "sample" can include a single cell or multiple cells or fragments of cells or an aliquot of body fluid, such as a blood sample, taken from a subject, by means including venipuncture, excretion, ejaculation, massage, biopsy, needle aspirate, lavage sample, scraping, surgical incision, or intervention or other means known in the art. Examples of an aliquot of body fluid include amniotic fluid, aqueous humor, bile, lymph, breast milk, interstitial fluid, blood, blood plasma, cerumen (earwax), Cowper's fluid (pre-ejaculatory fluid), chyle, chyme, female ejaculate, menses, mucus, saliva, urine, vomit, tears, vaginal lubrication, sweat, serum, semen, sebum, pus, pleural fluid, cerebrospinal fluid, synovial fluid, intracellular fluid, and vitreous humour.

The term "disease activity" encompasses the disease activity of any neurodegenerative disease including multiple sclerosis, Parkinson's Disease, Lewy body disease, Alzheimer's Disease, Amyotrophic lateral sclerosis (ALS), motor neuron disease, Huntington's Disease, Spinal muscular atrophy, Friedreich's ataxia, Batten disease, The term "multiple sclerosis" or "MS" encompasses all forms of multiple sclerosis including relapsing-remitting multiple sclerosis (RRMS), secondary progressive multiple sclerosis (SPMS), primary-progressive multiple sclerosis (PPMS), progressive relapsing multiple sclerosis (PRMS), and clinically isolated syndrome (CIS).

The term "multiple sclerosis disease activity" or "disease activity of multiple sclerosis" as used herein refers to any of a diagnosis of multiple sclerosis (MS), a presence or absence of MS (e.g., general disease, subtle disease), a shift (e.g., increase or decrease) in the disease activity, disease progression, a severity of MS, a relapse or flare event associated with MS, a future or impending relapse or flare event, a rate of relapse (e.g., an annualized rate of relapse), a MS state (e.g., exacerbation or quiescence), a confirmation of no evidence of disease status, a response of a subject diagnosed with multiple sclerosis to a therapy, a degree of multiple sclerosis disability, a risk (e.g., likelihood) of the subject developing multiple sclerosis at a subsequent time, a change in multiple sclerosis disease in comparison to a prior measurement (e.g., longitudinal change in a patient relative to a baseline measurement), a measurable that is informative of the disease activity, or a differential diagnosis of a type of multiple sclerosis, including relapsing-remitting multiple sclerosis (RRMS), secondary progressive multiple sclerosis (SPMS), primary-progressive multiple sclerosis (PPMS), progressive relapsing multiple sclerosis (PRMS), and clinically isolated syndrome (CIS).

In one embodiment, the term "multiple sclerosis disease activity" or "disease activity of multiple sclerosis" refers to a diagnosis of multiple sclerosis (MS). In one embodiment, the term "multiple sclerosis disease activity" or "disease activity of multiple sclerosis" refers to a presence or absence of MS (e.g., general disease, subtle disease). In one embodiment, the term "multiple sclerosis disease activity" or "disease activity of multiple sclerosis" refers to a shift (e.g., increase or decrease) in the disease activity. In one embodiment, the term "multiple sclerosis disease activity" or "disease activity of multiple sclerosis" refers to a severity of MS. In one embodiment, the term "multiple sclerosis disease activity" or "disease activity of multiple sclerosis" refers to a relapse or flare event associated with MS. In one embodiment, the term "multiple sclerosis disease activity" or "disease activity of multiple sclerosis" refers to a future or impending relapse or flare event. In one embodiment, the term "multiple sclerosis disease activity" or "disease activity of multiple sclerosis" refers to a rate of relapse (e.g., an annualized rate of relapse). In one embodiment, the term "multiple sclerosis disease activity" or "disease activity of multiple sclerosis" refers to a MS state (e.g., exacerbation or quiescence). In one embodiment, the term "multiple sclerosis disease activity" or "disease activity of multiple sclerosis" refers to a confirmation of no evidence of disease status. In one embodiment, the term "multiple sclerosis disease activity" or "disease activity of multiple sclerosis" refers to a response of a subject diagnosed with multiple sclerosis to a therapy. In one embodiment, the term "multiple sclerosis disease activity" or "disease activity of multiple sclerosis" refers to a degree of multiple sclerosis disability. In one embodiment, the term "multiple sclerosis disease activity" or "disease activity of multiple sclerosis" refers to a risk (e.g., likelihood) of the subject developing multiple sclerosis at a subsequent time. In one embodiment, the term "multiple sclerosis disease activity" or "disease activity of multiple sclerosis" refers to a change in multiple sclerosis disease in comparison to a prior measurement (e.g., longitudinal change in a patient relative to a baseline measurement). In one embodiment, the term "multiple sclerosis disease activity" or "disease activity of multiple sclerosis" refers to a measurable that is informative of the disease activity.

In various embodiments, measurables that are informative of the MS disease activity include measures of subtle disease activity (e.g., presence or absence of a specific number of gadolinium enhancing lesions e.g., exactly one lesion), general disease activity (e.g., presence or absence of 1 or more gadolinium enhancing lesion), a shift in disease activity (e.g., an appearance or disappearance of active gadolinium enhancing lesions), a severity of disease activity (e.g., a number of gadolinium enhancing lesions, where more gadolinium enhancing lesions is indicative of increased disease severity). In one embodiment, a measure that is informative of MS disease activity includes a measure of subtle disease activity (e.g., presence or absence of a specific number of gadolinium enhancing lesions e.g., exactly one lesion). In one embodiment, a measure that is informative of MS disease activity includes a measure of general disease activity (e.g., presence or absence of 1 or more gadolinium enhancing lesion). In one embodiment, a measure that is informative of MS disease activity includes a measure of a shift in disease activity (e.g., an appearance or disappearance of active gadolinium enhancing lesions). In one embodiment, a measure that is informative of MS disease activity includes a measure of a severity of disease activity (e.g., a number of gadolinium enhancing lesions, where more gadolinium enhancing lesions is indicative of increased disease severity).

In one embodiment, the term "multiple sclerosis disease activity" or "disease activity of multiple sclerosis" refers to progression of MS (e.g., MS disease progression). In one embodiment, a measure that is informative of MS disease activity includes a measure of disease progression (e.g., disease progression using the expanded disability status scale (EDSS)). In some embodiments, the term "multiple sclerosis disease activity" or "disease activity of multiple sclerosis" is not inclusive of the progression of MS (e.g., MS disease progression). Specifically, in such embodiments as disclosed herein, biomarker panels used for predicting "multiple sclerosis disease activity" are distinct from biomarker panels used for predicting "multiple sclerosis disease progression."

The terms "marker," "markers," "biomarker," and "biomarkers" encompass, without limitation, lipids, lipoproteins, proteins, cytokines, chemokines, growth factors, peptides, nucleic acids, genes, and oligonucleotides, together with their related complexes, metabolites, mutations, variants, polymorphisms, modifications, fragments, subunits, degradation products, elements, and other analytes or sample-derived measures. A marker can also include mutated proteins, mutated nucleic acids, variations in copy numbers, and/or transcript variants, in circumstances in which such mutations, variations in copy number and/or transcript variants are useful for generating a predictive model, or are useful in predictive models developed using related markers (e.g., non-mutated versions of the proteins or nucleic acids, alternative transcripts, etc.).

The term "antibody" is used in the broadest sense and specifically covers monoclonal antibodies (including full length monoclonal antibodies), polyclonal antibodies, multispecific antibodies (e.g., bispecific antibodies), and antibody fragments that are antigen-binding so long as they exhibit the desired biological activity, e.g., an antibody or an antigen-binding fragment thereof.

"Antibody fragment", and all grammatical variants thereof, as used herein are defined as a portion of an intact antibody comprising the antigen binding site or variable region of the intact antibody, wherein the portion is free of the constant heavy chain domains (i.e. CH2, CH3, and CH4, depending on antibody isotype) of the Fc region of the intact antibody. Examples of antibody fragments include Fab, Fab', Fab'-SH, F(ab')$_2$, and Fv fragments; diabodies; any antibody fragment that is a polypeptide having a primary structure consisting of one uninterrupted sequence of contiguous amino acid residues (referred to herein as a "single-chain antibody fragment" or "single chain polypeptide").

The term "biomarker panel" refers to a set biomarkers that are informative for predicting multiple sclerosis disease activity. For example, expression levels of the set of biomarkers in the biomarker panel can be informative for predicting multiple sclerosis disease activity, e.g., predicting an MS relapse. In various embodiments, a biomarker panel can include two, three, four, five, six, seven, eight, nine, ten eleven, twelve, thirteen, fourteen, fifteen, sixteen, seventeen, eighteen, nineteen, twenty, twenty one, twenty two, twenty three, twenty four, or twenty five biomarkers.

The term "obtaining a dataset associated with a sample" encompasses obtaining a set of data determined from at least one sample. Obtaining a dataset encompasses obtaining a sample and processing the sample to experimentally determine the data. The phrase also encompasses receiving a set of data, e.g., from a third party that has processed the sample to experimentally determine the dataset. Additionally, the phrase encompasses mining data from at least one database or at least one publication or a combination of databases and publications. A dataset can be obtained by one of skill in the art via a variety of known ways including stored on a storage memory.

It must be noted that, as used in the specification, the singular forms "a," "an" and "the" include plural referents unless the context clearly dictates otherwise.

II. System Environment Overview

FIG. 1A depicts an overview of a system environment 100 for assessing disease activity in a subject, in accordance with an embodiment. The system environment 100 provides context in order to introduce a marker quantification assay 120 and an activity prediction system 130.

In various embodiments, a test sample is obtained from the subject 110. The sample can be obtained by the individual or by a third party, e.g., a medical professional. Examples of medical professionals include physicians, emergency medical technicians, nurses, first responders, psychologists, phlebotomist, medical physics personnel, nurse practitioners, surgeons, dentists, and any other obvious medical professional as would be known to one skilled in the art.

The test sample is tested to determine values of one or more markers by performing the marker quantification assay 120. The marker quantification assay 120 determines quantitative expression values of one or more biomarkers from the test sample. The marker quantification assay 120 may be an immunoassay, and more specifically, a multi-plex immunoassay, examples of which are described in further detail below. The expression levels of various biomarkers can be obtained in a single run using a single test sample obtained from the subject 110. The quantified expression values of the biomarkers are provided to the activity prediction system 130.

Generally, the activity prediction system 130 includes one or more computers, embodied as a computer system 700 as discussed below with respect to FIG. 8. Therefore, in various embodiments, the steps described in reference to the activity prediction system 130 are performed in silico. The activity prediction system 130 analyzes the received biomarker expression values from the marker quantification assay 120 to generate an assessment of disease activity 140 in the subject 110.

In various embodiments, the marker quantification assay 120 and the activity prediction system 130 can be employed by different parties. For example, a first party performs the marker quantification assay 120 which then provides the results to a second party which implements the activity prediction system 130. For example, the first party may be a clinical laboratory that obtains test samples from subjects 110 and performs the assay 120 on the test samples. The second party receives the expression values of biomarkers resulting from the performed assay 120 analyzes the expression values using the activity prediction system 130.

Figure 1B:
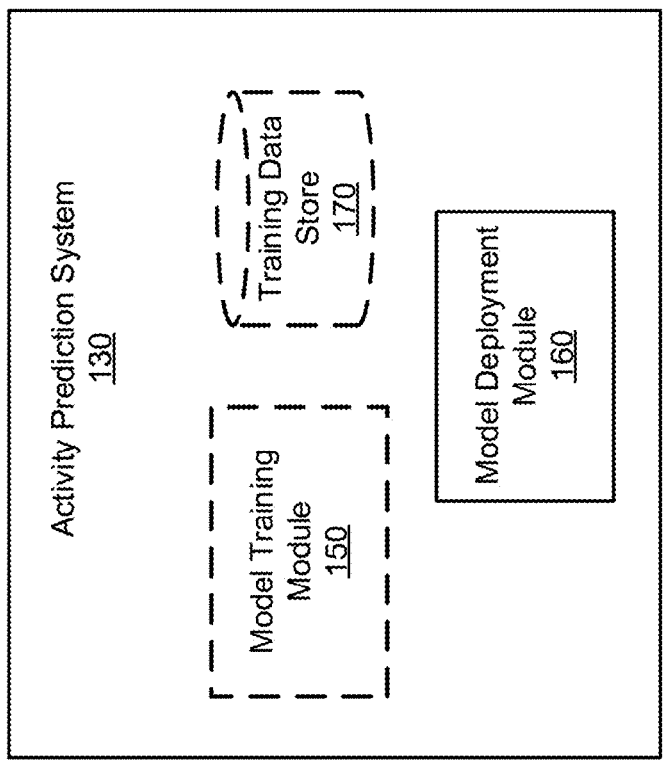
FIG. 1B is an example block diagram of the activity prediction system, in accordance with an embodiment.

Reference is now made to FIG. 1B which depicts a block diagram illustrating the computer logic components of the activity prediction system 130, in accordance with an embodiment. Specifically, the activity prediction system 130 may include a model training module 150, a model deployment module 160, and a training data store 170.

Each of the components of the activity prediction system 130 is hereafter described in reference to two phases: 1) a training phase and 2) a deployment phase. More specifically, the training phase refers to the building and training of one or more predictive models based on training data that includes quantitative expression values of biomarkers obtained from individuals that are known to be healthy, in a state of quiescence, or in a state of remission or remission or individuals that are known to have disease activity, in a state of exacerbation, or in a state of relapse. Therefore, the predictive models are trained to predict disease activity in a subject based on quantitative biomarker expression values. During the deployment phase, a predictive model is applied to quantitative biomarker expression values from a test sample obtained from a subject of interest in order to generate a prediction of disease activity in the subject of interest.

In some embodiments, the components of the activity prediction system 130 are applied during one of the training phase and the deployment phase. For example, the model training module 150 and training data store 170 (indicated by the dotted lines in FIG. 1B) are applied during the training phase whereas the model deployment module 160 is applied during the deployment phase. In various embodiments, the training phase and the deployment phase can be performed to enable continuously trained models. For example, the model training module 150 can train a model that the model deployment module 160 can subsequently deploy. The same model can undergo additional training by the model training module 150 (e.g., continuously trained using, for example, new training data that is obtained). Therefore, as the model is continuously trained, it can exhibit improved prediction capacity when analyzing samples during deployment.

In various embodiments, the components of the activity prediction system 130 can be performed by different parties depending on whether the components are applied during the training phase or the deployment phase. In such scenarios, the training and deployment of the predictive model are performed by different parties. For example, the model training module 150 and training data store 170 applied during the training phase can be employed by a first party (e.g., to train a predictive model) and the model deployment module 160 applied during the deployment phase can be performed by a second party (e.g., to deploy the predictive model).

III. Predictive Model

III.A. Training a Predictive Model

During the training phase, the model training module 150 trains one or more predictive models using training data comprising expression values of biomarkers. Referring to FIG. 1B, the training data may be stored in the training data store 170. In various embodiments, the activity prediction system 130 generates the training data comprising expression values of biomarkers by analyzing biomarker expression values in test samples. In various embodiments, the activity prediction system 130 obtains the training data comprising expression values of biomarkers from a third party. The third party may have analyzed test samples to determine the biomarker expression values.

In various embodiments, the training data comprising expression values of biomarkers are derived from clinical subjects. For example, the training data can be expression values of biomarkers that were measured from test samples obtained from clinical subjects. Examples of expression values of biomarkers derived from clinical subjects include biomarker expression values obtained through clinical studies such as the multiple sclerosis CLIMB study (e.g., Comprehensive Longitudinal Investigation of Multiple Sclerosis at Brigham and Women's Hospital), the Accelerated Cure Project (ACP) for Multiple Sclerosis, and the Expression, Proteomics, Imaging, Clinical (EPIC) study at UCSF, and the University Hospital Basel Cohort (UHBC).

In various embodiments, the training data further includes reference ground truths that indicate a disease activity, such as a multiple sclerosis disease activity. As an example, the training data includes reference ground truths that identify a presence or absence of multiple sclerosis (MS), a relapse or flare event associated with MS, a rate of relapse (e.g., an annualized rate of relapse), a MS state (e.g., exacerbation or quiescence), a response of a subject diagnosed with multiple sclerosis to a therapy, a degree of multiple sclerosis disability, a risk (e.g., likelihood) of the subject developing multiple sclerosis at a subsequent time, or a measure of subtle disease activity (e.g., presence or absence of a specific number of gadolinium enhancing lesions e.g., one, two, three, or four lesions), or a measure of general disease activity (e.g., presence or absence of 1 or more gadolinium enhancing lesion).

Reference is made to FIG. 1C, which depicts an example set of training data 190, in accordance with an embodiment. As shown in FIG. 1C, the training data 190 includes data corresponding to multiple individuals (e.g., column 1 depicting individual 1, 2, 3, 4 . . . ). For each individual, the training data 190 includes quantitative expression values (e.g., A1, B1, A2, B2, etc.) for different biomarkers obtained from the corresponding individual. In some embodiments, the quantitative expression values are determined by the marker quantification assay 120 shown in FIG. 1. Although FIG. 1C depicts 4 individuals and 2 different markers (marker A and marker B), the training data 190 may include tens, hundreds, or thousands of individuals as well as tens, hundreds, or thousands of markers.

As shown in FIG. 1C, a first training example (e.g., first row) of the training data refers to individual 1 and corresponding quantitative expression values of marker A (e.g., A1) and the quantitative expression value of marker B (e.g., B1). Similarly, the second training example (e.g., second row) of the training data refers to individual 2 and corresponding quantitative expression values of marker A (e.g., A2) and the quantitative expression value of marker B (e.g., B2). Individuals 3 and 4 have corresponding marker values as shown in FIG. 1C.

As shown in FIG. 1C, the training data 190 further includes a reference ground truth ("Indication" column) that identifies whether the corresponding individual has a positive or negative indication as to the disease activity. As an example, each indication may be an indication of disease activity in the patient. For example, referring to the first training example (e.g., first row), a "Positive" indication can reflect a presence of disease activity in individual 1. For example, a MRI scan of individual 1 may have revealed a presence of one or more gadolinium enhancing lesions. Similarly, an indication of a negative result (e.g., individual 3 or individual 4) reflects a negative indication of disease activity in the corresponding individual. For example, MRI scans of individual 3 and 4 may have revealed a lack of gadolinium enhancing lesions.

In some embodiments, the model training module 150 retrieves the training data from the training data store 170 and randomly partitions the training data into a training set and a test set. As an example, 80% of the training data may be partitioned into the training set and the other 20% can be partitioned into the test set. Other proportions of training set and test set may be implemented. As such, the training set is used to train predictive models whereas the test set is used to validate the predictive models.

In various embodiments, the predictive model is any one of a regression model (e.g., linear regression, logistic regression, or polynomial regression), decision tree, random forest, support vector machine, Naïve Bayes model, k-means cluster, or neural network (e.g., feed-forward networks, convolutional neural networks (CNN), deep neural networks (DNN), autoencoder neural networks, generative adversarial networks, or recurrent networks (e.g., long short-term memory networks (LSTM), bi-directional recurrent networks, deep bi-directional recurrent networks), or any combination thereof. For example, the predictive model can be a stacked classifier that includes both a linear regression and decision tree.

The predictive model can be trained using a machine learning implemented method, such as any one of a linear regression algorithm, logistic regression algorithm, decision tree algorithm, support vector machine classification, Naïve Bayes classification, K-Nearest Neighbor classification, random forest algorithm, deep learning algorithm, gradient boosting algorithm, and dimensionality reduction techniques such as manifold learning, principal component analysis, factor analysis, autoencoder regularization, and independent component analysis, or combinations thereof. In various embodiments, the cellular disease model is trained using supervised learning algorithms, unsupervised learning algorithms, semi-supervised learning algorithms (e.g., partial supervision), weak supervision, transfer, multi-task learning, or any combination thereof.

In various embodiments, the predictive model has one or more parameters, such as hyperparameters or model parameters. Hyperparameters are generally established prior to training. Examples of hyperparameters include the learning rate, depth or leaves of a decision tree, number of hidden layers in a deep neural network, number of clusters in a k-means cluster, penalty in a regression model, and a regularization parameter associated with a cost function. Model parameters are generally adjusted during training. Examples of model parameters include weights associated with nodes in layers of neural network, support vectors in a support vector machine, and coefficients in a regression model. The model parameters of the cellular disease model are trained (e.g., adjusted) using the training data to improve the predictive capacity of the cellular disease model.

The model training module 150 trains one or more predictive models, each predictive model receiving, as input, one or more biomarkers. In various embodiments, the model training module 150 constructs a predictive model that receives, as input, expression values of two biomarkers. In various embodiments, the model training module 150 constructs a predictive model that receives, as input, expression values of three biomarkers. In various embodiments, the model training module 150 constructs a predictive model that receives, as input, expression values of four biomarkers. In some embodiments, the model training module 150 constructs a predictive model for more than four biomarkers. For example, a predictive model receives, as input, expression values of 8 biomarkers (e.g., 8 biomarkers categorized as Tier 1 in Table 2 or any of their corresponding substitute biomarkers in Table 10). As another example, the predictive model receives, as input, expression values of 17 biomarkers (e.g., 17 biomarkers categorized as Tier 1 or Tier 2 in Table 2 or any of their corresponding substitute biomarkers in Table 10). As another example, the predictive model receives, as input, expression values of 21 biomarkers (e.g., 21 biomarkers categorized as Tier 1, Tier 2, or Tier 3 in Table 2 or any of their corresponding substitute biomarkers in Table 10).

In various embodiments, the model training module 150 identifies a set of biomarkers that are to be used to train a predictive model. The model training module 150 may begin with a list of candidate biomarkers that are promising for predicting disease activity. In one embodiment, candidate biomarkers may be biomarkers identified through a literature curation process. In some embodiments, candidate biomarkers may be biomarkers whose expression values in test samples obtained from individuals that are positive for a disease activity (e.g., presence of MS, in an exacerbated state, and the like) are statistically significant in comparison to expression values of biomarkers in test samples obtained from individuals that are negative for the disease activity.

In one embodiment, the model training module 150 performs a feature selection process to identify the set of biomarkers to be included in the biomarker panel. For example, the model training module 150 performs a sequential forward feature selection based on the expression values of the biomarkers and their importance in predicting a particular endpoint (e.g., disease activity). For example, candidate biomarkers that are determined to be highly correlated with a particular disease activity endpoint would be deemed highly important are therefore likely to be included in the biomarker panel in comparison to other biomarkers that are not highly correlated with the disease activity endpoint.

In some embodiments, the importance of each biomarker for a disease activity endpoint is determined by using a method including one of random forest (RF), gradient boosting (GBM), extreme gradient boosting (XGB), or LASSO algorithms. For example, if using random forest algorithms, the model training module 150 may generate a variable importance plot that depicts the importance of each candidate biomarker. Specifically, the random forest algorithm may provide, for each candidate biomarker, 1) a mean decrease in model accuracy and 2) a mean decrease in a Gini coefficient which is a measure of how much each candidate biomarker contributes to the homogeneity of nodes and leaves in the random forest. In one scenario, the importance of each candidate biomarker is dependent on one or both of the mean decrease in model accuracy and mean decrease in Gini coefficient. Each of GBM, XGB, and LASSO, can also be used to rank the importance of each candidate biomarker based on an influence value. Therefore, the model training module 150 can generate a ranking of each of candidate biomarkers using one of the methods including RF, GBM, XGB, or LASSO.

Each predictive model is iteratively trained using, as input, the quantitative expression values of the markers for each individual. For example, referring again to FIG. 1C, one iteration involves providing a training example (e.g., a row of the training data) that includes the quantitative expression value of biomarkers (e.g., "A1" and "B1") for a particular individual (e.g., individual 1). Each predictive model is trained on reference ground truth data that includes the indication (e.g., the positive or negative result). In various embodiments, over training iterations, each predictive model is trained (e.g., the parameters are tuned) to minimize a prediction error between a prediction of MS activity outputted by the predictive model and the ground truth data. In various embodiments, the prediction error is calculated based on a loss function, examples of which include a L1 regularization (Lasso Regression) loss function, a L2 regularization (Ridge Regression) loss function, or a combination of L1 and L2 regularization (ElasticNet).

III.B. Deploying a Predictive Model

During the deployment phase, the model deployment module 160 (as shown in FIG. 1B) analyzes quantitative biomarker expression values from a test sample obtained from a subject of interest by applying a trained predictive model. In some embodiments, the subject has not previously been diagnosed with a disease and therefore, the deployment of the predictive model enables in silico diagnosis of the disease based on the quantitative biomarker expression values derived from the subject. In some embodiments, the subject has been previously diagnosed with a disease. Here, the deployment of the predictive model enables in silico prediction of disease activity based on the quantitative biomarker expression values derived from the subject.

In various embodiments, the quantitative biomarker expression values are provided as input to the predictive model. The predictive model analyzes the quantitative biomarker expression values and outputs an assessment of disease activity.

In various embodiments, the assessment of disease activity is a predicted score that may be informative of the disease activity in the subject. In various embodiments, the predicted score outputted by the prediction model is compared to one or more reference scores to determine a measure of the disease activity. Reference scores refer to previously determined scores, further described below as "healthy scores" or "diseased scores," that correspond to diseased patients or non-diseased patients. For example, the one or more scores may be "healthy scores" corresponding to healthy patients, a patient's own baseline at a prior timepoint when the patient did not exhibit disease activity (e.g., longitudinal analysis), patients clinically diagnosed with the disease but not exhibiting disease activity, or a threshold score (e.g., a cutoff). As another example, the one or more scores may be "diseased scores" corresponding to diseased patients, a patient's own score indicating disease activity at a prior timepoint, or a threshold score (e.g., a cutoff). As one example, the threshold score can correspond to healthy patients and can be generated by training a predictive model using expression values of biomarkers from healthy patients. As another example, the threshold score can correspond to diseased patients and can be generated by training a predictive model using expression values of biomarkers from the diseased patients.

In various embodiments, the assessment of disease activity corresponds to the presence of absence of disease. In one embodiment, the predicted score outputted by the prediction model can be compared to a healthy score. The subject can be classified as having the disease if the predicted score of the subject is significantly different (e.g., p-value<0.05) in comparison to the healthy score. In one embodiment, the predicted score outputted by the prediction model can be compared to the diseased score. The subject can be classified as not having the disease if the predicted score of the subject is significantly different (e.g., p-value<0.05) in comparison to the diseased score. In some embodiments, the predicted score outputted by the prediction model is compared to both the healthy score and the diseased score. For example, the subject can be classified as having the disease if the predicted score of the subject is significantly different (e.g., p-value<0.05) in comparison to the healthy scores and not significantly different (e.g., p-value>0.05 in comparison to the diseased scores for patients that have been diagnosed with the disease. In various embodiments, depending on the classification of the subject, the subject can undergo treatment. In other words, the assessment can guide the treatment of the subject. For example, if the subject is classified as having the disease, the subject can be administered a therapeutic intervention to treat the disease.

In various embodiments, the assessment of disease activity corresponds to the presence of absence of subtle disease. In one embodiment, the predicted score outputted by the prediction model can be compared to a score corresponding to individuals previously determined to have a presence of subtle disease (e.g., a specific number of gadolinium enhancing lesion on a MRI scan e.g., exactly one lesion). The subject can be classified as having subtle disease if the predicted score of the subject is not significantly different (e.g., p-value>0.05) in comparison to the score corresponding to individuals previously determined to have a presence of subtle disease. The subject can be classified as having subtle disease if the predicted score of the subject is significantly different (e.g., p-value<0.05) in comparison to the score corresponding to individuals previously determined to not have a presence of subtle disease. In one embodiment, the predicted score outputted by the prediction score is compared to a score corresponding to individuals without subtle disease (e.g., zero gadolinium enhancing lesions on a MRI scan). The subject can be classified as not having subtle disease if the predicted score of the subject is not significantly different (e.g., p-value>0.05) from the score corresponding to individuals that do not have subtle disease (e.g., zero gadolinium enhancing lesion on a MRI scan). Alternatively, the subject can be classified as having subtle disease if the predicted score of the subject is significantly different (e.g., p-value<0.05) from the score corresponding to individuals that do not have subtle disease (e.g., zero gadolinium enhancing lesion on a MRI scan).

In some embodiments, the predicted score outputted by the prediction model is compared to both a score corresponding to individuals previously determined to have a presence of subtle disease (e.g., a particular number of gadolinium enhancing lesions on a MRI scan) and a score corresponding to individuals without subtle disease (e.g., zero gadolinium enhancing lesions on a MRI scan). For example, the subject can be classified as having subtle disease if the predicted score of the subject is significantly different (e.g., p-value<0.05) in comparison to the score corresponding to individuals without subtle disease (e.g., zero gadolinium enhancing lesions on a MRI scan) and not significantly different (e.g., p-value>0.05) in comparison to the score corresponding to individuals previously determined to have a presence of subtle disease (e.g., a particular number of gadolinium enhancing lesions on a MRI scan e.g., exactly one gadolinium enhancing lesion).

In various embodiments, the assessment of disease activity corresponds to the presence of absence of general disease. In one embodiment, the predicted score outputted by the prediction model can be compared to a score corresponding to individuals previously determined to have a presence of general disease (e.g., one or more gadolinium enhancing lesions on a MRI scan). The subject can be classified as having general disease if the predicted score of the subject is significantly different (e.g., p-value<0.05) in comparison to the score corresponding to individuals previously determined to not have a presence of general disease. The subject can be classified as not having general disease if the predicted score of the subject is not significantly different (e.g., p-value>0.05) in comparison to the score corresponding to individuals previously determined to not have a presence of general disease. In one embodiment, the predicted score outputted by the prediction score is compared to a score corresponding to individuals without general disease (e.g., zero gadolinium enhancing lesions on a MRI scan). The subject can be classified as not having general disease if the predicted score of the subject is not significantly different (e.g., p-value>0.05) from the score corresponding to individuals that do not have general disease (e.g., zero gadolinium enhancing lesion on a MRI scan). The subject can be classified as having general disease if the predicted score of the subject is significantly different (e.g., p-value<0.05) from the score corresponding to individuals that do not have general disease (e.g., zero gadolinium enhancing lesion on a MRI scan). In some embodiments, the predicted score outputted by the prediction model is compared to both a score corresponding to individuals previously determined to have a presence of general disease (e.g., one or more gadolinium enhancing lesions on a MRI scan) and a score corresponding to individuals without general disease (e.g., zero gadolinium enhancing lesions on a MRI scan). For example, the subject can be classified as having general disease if the predicted score of the subject is significantly different (e.g., p-value<0.05) in comparison to the score corresponding to individuals without general disease (e.g., zero gadolinium enhancing lesions on a MRI scan) and not significantly different (e.g., p-value>0.05) in comparison to the score corresponding to individuals previously determined to have a presence of general disease (e.g., one or more gadolinium enhancing lesions on a MRI scan).

In various embodiments, the assessment of disease activity corresponds to the directional shift in disease activity based on a predicted increase or decrease in the number of gadolinium enhancing lesions. In one embodiment, the predicted score outputted by the prediction model can be compared to a score corresponding to individuals previously determined to have undergone an increase in disease activity (e.g., increasing numbers of gadolinium enhancing lesions on a MRI scan). The subject can be classified as likely to encounter an increase in disease activity if the predicted score of the subject is significantly different (e.g., p-value<0.05) in comparison to the score corresponding to individuals previously determined to not have undergone an increase in disease activity. The subject can be classified as unlikely to encounter an increase in disease activity if the predicted score of the subject is not significantly different (e.g., p-value>0.05) in comparison to the score corresponding to individuals previously determined to not have undergone an increase in disease activity. In one embodiment, the predicted score outputted by the prediction score is compared to a score corresponding to individuals previously determined to have undergone a decrease in disease activity (e.g., decreasing numbers of gadolinium enhancing lesions on a MRI scan). The subject can be classified as likely to encounter a decrease in disease activity if the predicted score of the subject is not significantly different (e.g., p-value>0.05) from the score corresponding to individuals that have encountered a decrease in disease activity. The subject can be classified as likely to encounter a decrease in disease activity if the predicted score of the subject is significantly different (e.g., p-value<0.05) from the score corresponding to individuals that have not encountered a decrease in disease activity. In some embodiments, the predicted score outputted by the prediction model is compared to both a score corresponding to individuals previously determined to have undergone an increase in disease activity (e.g., increasing numbers of gadolinium enhancing lesions on a MRI scan) and a score corresponding to individuals who have undergone a decrease in disease activity (e.g., decreasing numbers of gadolinium enhancing lesions on a MRI scan). For example, the subject can be classified as likely to undergo an increase in disease activity if the predicted score of the subject is significantly different (e.g., p-value<0.05) in comparison to the score corresponding to individuals who have undergone a decrease in disease activity (e.g., decreasing number of gadolinium enhancing lesions on a MRI scan) and not significantly different (e.g., p-value>0.05) in comparison to the score corresponding to individuals who have undergone an increase in disease activity (e.g., increasing numbers of gadolinium enhancing lesions on a MRI scan). In various embodiments, the subject can be classified as unlikely to encounter either an increase or decrease in disease activity (e.g., the disease activity in the subject is stable) if the predicted score of the subject is not significantly different (e.g., p-value>0.05) in comparison to both the score corresponding to individuals who have undergone an increase in disease activity and the score corresponding to individuals who have undergone a decrease in disease activity.

In various embodiments, the assessment of disease activity corresponds to a state of disease in a subject. For example, if the disease is MS, the state of disease in the subject is one of quiescent vs exacerbation. In one embodiment, the predicted score outputted by the prediction model can be compared to a score corresponding to individuals previously determined to be in a quiescent state (e.g., clinically determined to be in a quiescent state). The subject can be classified as being in a quiescent state if the predicted score of the subject is significantly different (e.g., p-value<0.05) in comparison to the score corresponding to individuals previously determined to not be in a quiescent state. The subject can be classified as not being in a quiescent state if the predicted score of the subject is not significantly different (e.g., p-value>0.05) in comparison to the score corresponding to individuals previously determined to be in a quiescent state. In one embodiment, the predicted score outputted by the prediction score is compared to a score corresponding to individuals previously determined to be in an exacerbated state. The subject can be classified as being in an exacerbated state if the predicted score of the subject is not significantly different (e.g., p-value>0.05) from the score corresponding to individuals previously determined to be in an exacerbated state. The subject can be classified as not being in an exacerbated state if the predicted score of the subject is significantly different (e.g., p-value<0.05) from the score corresponding to individuals previously determined to be in an exacerbated state. In some embodiments, the predicted score outputted by the prediction model is compared to both a score corresponding to individuals previously determined to be in a quiescent state and a score corresponding to individuals in an exacerbated state. For example, the subject can be classified as being in an exacerbated state if the predicted score of the subject is significantly different (e.g., p-value<0.05) in comparison to the score corresponding to individuals in a quiescent state and not significantly different (e.g., p-value>0.05) in comparison to the score corresponding to individuals previously determined to be in an exacerbated state.

In various embodiments, the assessment of disease activity corresponds to a likely response to a therapy of provided to the subject. In one embodiment, the predicted score outputted by the prediction model can be compared to a score corresponding to individuals previously determined to be responsive to the therapy (e.g., clinically determined to be responsive to the therapy). The subject can be classified as being a responder if the predicted score of the subject is significantly different (e.g., p-value<0.05) in comparison to the score corresponding to individuals previously determined to not be responsive to the therapy. The subject can be classified as being a responder if the predicted score of the subject is not significantly different (e.g., p-value>0.05) in comparison to the score corresponding to individuals previously determined to be responsive to the therapy. In one embodiment, the predicted score outputted by the prediction score is compared to a score corresponding to individuals previously determined to be non-responders. The subject can be classified as a non-responder if the predicted score of the subject is not significantly different (e.g., p-value>0.05) from the score corresponding to individuals previously determined to be non-responders. The subject can be classified as a non-responder if the predicted score of the subject is significantly different (e.g., p-value<0.05) from the score corresponding to individuals previously determined to be responders. In some embodiments, the predicted score outputted by the prediction model is compared to both a score corresponding to individuals previously determined to be responders and a score corresponding to individuals previously determined to be non-responders. For example, the subject can be classified as being a responder if the predicted score of the subject is significantly different (e.g., p-value<0.05) in comparison to the score corresponding to individuals previously determined to be non-responders and not significantly different (e.g., p-value>0.05) in comparison to the score corresponding to individuals previously determined to be responders.

In one embodiment, the assessment of disease activity is an assessment of disease progression and can correspond to a degree of MS disability in a subject diagnosed with multiple sclerosis. In one embodiment, the degree of MS disability corresponds to the EDSS. In various embodiments, the assessment (e.g., predicted score) corresponding to the subject is compared to multiple scores. Each score may correspond to a group of individuals that have been clinically categorized in a degree of disability. For example, a first score may correspond to individuals clinically categorized with a score of 1 on the EDSS. Additional scores may correspond to groups of individuals that have been clinically categorized with a score of 1.5, 2.0, 2.5, 3.0, 3.5, 4.0, 4.5, 5.0, 5.5, 6.0, 6.5, 7.0, 7.5, 8.0, 8.5, 9.0, 9.5, and 10.0. In one scenario, the subject may be classified with one of the EDSS scores if the subject's predicted score outputted by the prediction model is not significantly different (e.g., p-value>0.05) from one group and is significantly different (e.g., p-value<0.05) in comparison to all other groups. The subject may be treated according to clinical protocols based on the categorization.

In one embodiment, the assessment of disease activity corresponds to a risk (e.g., likelihood) of the subject developing a disease at a subsequent time. In various embodiments, the assessment (e.g., predicted score) corresponding to the subject is compared to multiple scores. Each score may correspond to a group of individuals in a risk group that have been clinically categorized with a particular risk of developing MS. As an example, the risk groups may be divided into a high risk group, medium risk group, and low risk group. In one scenario, the subject may be classified in a risk group if the subject's predicted score is not significantly different (e.g., p-value>0.05) from one group and is significantly different (e.g., p-value<0.05) in comparison to other groups. Therefore, the subject can undertake changes in lifestyle and/or treatments based on the prediction of a risk/likelihood of developing MS.

In various embodiments, a measure of the disease activity predicted by the predictive model provides additional utility for managing the disease activity in the patient. As one example, the measure of the disease activity predicted by the predictive model is useful for selecting a candidate therapeutic or for determining the effectiveness of a previously administered therapeutic.

In various embodiments, the measure of disease activity predicted by the predictive model for a patient can be compared to a prior measure of disease activity to determine whether a therapeutic administered to the patient is demonstrating efficacy. As one example, the prior measure of disease activity may be a prediction determined for the same patient (e.g., a baseline measure of disease activity). Thus in this example, the comparison of the measure of disease activity and the prior measure of disease activity is a longitudinal analysis of a patient that is undergoing treatment using the therapeutic. As such, a difference or lack of difference between the measure of disease activity and prior measure of disease activity can be an indication that the therapeutic is having an effect or lack of an effect. As another example, the prior measure of disease activity may be a measure determined for a population of patients (e.g., a reference set of patients). In this example, the comparison of the measure of disease activity and the prior measure of disease activity can reveal whether the patient is experiencing effects due to a therapeutic, as evidenced by the measure of disease activity, in comparison to the prior measure of disease activity for the population of patients.

In various embodiments, if the comparison between the measure of disease activity and prior measure of disease activity indicates that a currently administered therapeutic is not exhibiting an effect, or is not exhibiting an effect to a desired extent, a change in the patient's treatment can be undertaken. In one embodiment, the treatment dose of the currently administered therapeutic can be altered to effect a patient response. For example, the currently administered therapeutic can be increased in dosage. In one embodiment, a candidate therapeutic can be selected for administration to the patient. In various embodiments, a candidate therapeutic can be administered to the patient in place of the currently administered therapeutic or the candidate therapeutic can be administered to the patient in addition to the currently administered therapeutic.

As another example, a measure of the disease activity is useful for supporting symptom and medication tracking, nursing interventions, laboratory monitoring, and curated longitudinal MRI reports. In such scenarios, the measure of disease activity can reduce unplanned healthcare utilization (e.g., unplanned visits to physician's office), thereby improving patient and physician satisfaction.

IV. Biomarker Panel

In various embodiments, the assessment of disease activity involves implementing a univariate biomarker panel. Therefore, the univariate biomarker panel includes one biomarker. In other embodiments, the assessment of disease activity involves implementing a multivariate biomarker panel. In such embodiments, the multivariate biomarker panel includes more than one biomarker. In various embodiments, the multivariate biomarker panel includes two biomarkers. In various embodiments, the multivariate biomarker panel includes 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 biomarkers. In particular embodiments, the multivariate biomarker panel includes 2 biomarkers. In particular embodiments, the multivariate biomarker panel includes 3 biomarkers. In particular embodiments, the multivariate biomarker panel includes 4 biomarkers. In particular embodiments, the multivariate biomarker panel includes 7 biomarkers. In particular embodiments, the multivariate biomarker panel includes 8 biomarkers. In particular embodiments, the multivariate biomarker panel includes 17 biomarkers. In particular embodiments, the multivariate biomarker panel includes 21 biomarkers.

In various embodiments described herein, a biomarker panel is implemented for the assessment or prediction of disease progression, such as MS disease progression. In various embodiments, the assessment of disease progression involves implementing a univariate biomarker panel. Therefore, the univariate biomarker panel includes one biomarker. In other embodiments, the assessment of disease progression involves implementing a multivariate biomarker panel. In such embodiments, the multivariate biomarker panel for assessing disease progression includes more than one biomarker. In various embodiments, the multivariate biomarker panel for assessing disease progression includes two biomarkers. In various embodiments, the multivariate biomarker panel for assessing disease progression includes 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 biomarkers. In particular embodiments, the multivariate biomarker panel includes 2 biomarkers. In particular embodiments, the multivariate biomarker panel includes 3 biomarkers. In particular embodiments, the multivariate biomarker panel includes 4 biomarkers. In particular embodiments, the multivariate biomarker panel includes 7 biomarkers. In particular embodiments, the multivariate biomarker panel includes 8 biomarkers. In particular embodiments, the multivariate biomarker panel includes 17 biomarkers. In particular embodiments, the multivariate biomarker panel includes 21 biomarkers.

In an embodiment, the biomarkers in the biomarker panel can include one or more of: 6Ckine, Adiponectin, Adrenomedullin (ADM), Alpha-1 Antitrypsin (AAT), Alpha-1-Microglobulin (AlMicro), Alpha-2-Macroglobulin (A2Macro), Alpha-Fetoprotein (AFP), Amphiregulin (AR), Angiogenin, Angiopoietin 1 (ANG-1), Angiopoietin 2 (ANG-2), Angiotensin Converting Enzyme (ACE), Antileukoproteinase (ALP), Antithrombin III (ATIII), Apolipoprotein A (Apo-A), Apolipoprotein D (Apo-D), Apolipoprotein E (Apo-E), AXL Receptor Tyrosine Kinase (AXL), B-cell activating factor (BAFF), B Lymphocyte Chemoattractant (BLC), Beta-Amyloid (1-40) (AB-40), Beta-Amyloid (1-42) (AB-42), Beta-2 Microglobulin (B2M), Betacellulin (BTC), Brain Derived Neurotrophic Factor (BDNF), C-Reactive Protein (CRP), Cadherin 1 (E-Cad), Calbindin, Cancer Antigen 125 (CA-125), Cancer Antigen 15-3 (CA 15-3), Cancer Antigen 19-9 (CA 19-9), Carbonic anhydrase 9 (CA-9), Carcinoembryonic Antigen (CEA), Carcinoembryonic antigen related cell adhesion molecule 1 (CEACAM1), Cathepsin D, CD40 Ligand (CD40-L), CD163, Ceruloplasmin, Chemokine CC-4 (HCC-4), Chromogranin A (CgA), Ciliary Neurotrophic Factor (CNTF), Clusterin (CLU), Complement C3 (C3), Complement Factor H (CFH), Complement Factor H Related Protein 1 (CFHR1), Cystatin B, CystatinC, Decorin, Dickkopf related protein 1 (DKK-1), Dopamine beta hydroxylase (DBH), E-Selectin, EN-RAGE, Eotaxin-1, Eotaxin-2, Eotaxin-3, Epidermal Growth Factor (EGF), Epidermal Growth Factor Receptor (EGFR), Epiregulin (EPR), Epithelial Derived Neutrophil Activating Protein 78 (ENA-78), Erythropoietin (EPO), Factor VII, Fas Ligand (FasL), FASLG Receptor (FAS), Ferritin (FRTN), Fibrinogen, Fibulin 1C (Fib1C), Ficolin 3, Follicle Stimulating Hormone (FSH), Gastric inhibitory polypeptide (GIP), Gelsolin, Glucagon Like Peptide-1 (GLP-1), Glycogen phosphorylase isoenzyme BB (GPBB), Granulocyte Colony Stimulating Factor (GCSF), Granulocyte Macrophage Colony Stimulating Factor (GM-CSF), Growth differentiation factor 15 (GDF-15), Growth Hormone (GH), Growth Regulated alpha protein (GROalpha), Haptoglobin, Heat Shock protein 70 (HSP-70), Heparin Binding EGF Like Growth Factor (HB-EGF), Hepatocyte Growth Factor (HGF), Human Chorionic Gonadotropin beta (hCG), Immunoglobulin A (IgA), Immunoglobulin E (IgE), Immunoglobulin M (IgM), Insulin, Insulin like Growth Factor Binding Protein 2 (IGFBP2), Intercellular Adhesion Molecule 1 (ICAM-1), Interferon alpha (IFN-alpha), Interferon gamma (IFN-gamma), Interferon gamma Induced Protein 10 (IP-10), Interferon inducible T cell alpha chemoattractant (ITAC), Interleukin 1 alpha (IL-1alpha), Interleukin 1 beta (IL-1beta), Interleukin 1 receptor antagonist (IL1ra), Interleukin 2 (IL-2), Interleukin 2 receptor alpha (IL2receptoralpha), Interleukin 3 (IL-3), Interleukin 4 (IL-4), Interleukin 5 (IL-5), Interleukin 6 (IL-6), Interleukin 6 receptor (IL6r), Interleukin 6 receptor subunit beta (IL6Rbeta), Interleukin 7 (IL-7), Interleukin 8 (IL-8), Interleukin 10 (IL-10), Interleukin 12 Subunit p40 (IL12p40), Interleukin 12 Subunit p70 (IL12p70), Interleukin 13 (IL13), Interleukin 15 (IL15), Interleukin 16 (IL16), Interleukin 17 (IL17), Interleukin 18 (IL18), Interleukin 18 binding protein (IL18 bp), Interleukin 22 (IL22), Interleukin 23 (IL23), Interleukin 31 (IL31), Kidney Injury Molecule 1 (KIM-1), Lactoferrin (LTF), Latency Associated Peptide of Transforming Growth Factor beta 1 (LAP TGF b1), Leptin, Leptin Receptor (Leptin R), Leucine rich alpha 2 glycoprotein (LRG1), Luteinizing Hormone (LH), Macrophage Colony Stimulating Factor 1 (M-CSF), Macrophage Derived Chemokine (MDC), Macrophage Inflammatory Protein 1 alpha (MIP1-alpha), Macrophage Inflammatory Protein 1 beta (MIP1-beta), Macrophage Inflammatory Protein 3 alpha (MIP3-alpha), Macrophage Inflammatory Protein 3 beta (MIP3-beta), Macrophage Migration Inhibitory Factor (MIF), Macrophage Stimulating Protein (MSP), Mast stem cell growth factor receptor (SCFR), Matrix Metalloproteinase 1 (MMP-1), Matrix Metalloproteinase 2 (MMP-2), Matrix Metalloproteinase 3 (MMP-3), Matrix Metalloproteinase 7 (MMP-7), Matrix Metalloproteinase 9 (MMP-9), Matrix Metalloproteinase 9 total (MMP-9 total), Matrix Metalloproteinase 10 (MMP-10), Microalbumin, Monocyte Chemotactic Protein 1 (MCP-1), Monocyte Chemotactic Protein 2 (MCP-2), Monocyte Chemotactic Protein 3 (MCP-3), Monocyte Chemotactic Protein 4 (MCP-4), Monokine Induced by Gamma Interferon (MIG), Myeloid Progenitor Inhibitory Factor 1 (MPIF-1), Myeloperoxidase (MPO), Myoglobin, Nerve Growth Factor beta (NGF-beta), Neurofilament heavy polypeptide (NF-H), Neuron Specific Enolase (NSE), Neuronal Cell Adhesion Molecule (NrCAM), Neuropilin-1, Neutrophil Activating Peptide 2 (NAP-2), Omentin, Osteocalcin, Osteopontin, Osteoprotegerin (OPG), P-Selectin, Pancreatic Polypeptide (PPP), Pancreatic secretory trypsin inhibitor (TATI), Paraoxonase-1 (PON1), Pepsinogen-I (PGI), Periostin, Pigment Epithelium Derived Factor (PEDF), Placenta Growth Factor (PLGF), Plasminogen Activator Inhibitor 1 (PAI-1), Platelet endothelial cell adhesion molecule (PECAM-1), Platelet Derived Growth Factor BB (PDGF-BB), Prolactin (PRL), Prostate Specific Antigen Free (PSA-f), Protein DJ-1 (DJ-1), Pulmonary and Activation Regulated Chemokine (PARC), Pulmonary surfactant associated protein D (SP-D), Receptor for advanced glycosylation end products (RAGE), Resistin, S100 calcium binding protein B (S100B), Serum Amyloid A Protein (SAA), Serum Amyloid P Component (SAP), Sex Hormone Binding Globulin (SHBG), Sortilin, ST2, Stem Cell Factor (SCF), Stromal cell derived factor 1 (SDF-1), Superoxide Dismutase 1 soluble (SOD-1), T Cell Specific Protein RANTES (RANTES), T Lymphocyte Secreted Protein I 309 (1309), Tamm Horsfall Urinary Glycoprotein (THP), Tenascin C (TN-C), Tetranectin, Thrombin Activatable ibrinolysis (TAFI), Thrombospondin-1, Thymus and activation regulated chemokine (TARC), Thyroid Stimulating Hormone (TSH), Thyroxine Binding Globulin (TBG), Tissue Inhibitor of Metalloproteinases 1 (TIMP-1), Tissue Inhibitor of Metalloproteinases 2 (TIMP-2), TNF Related Apoptosis Inducing Ligand Receptor 3 (TRAIL-R3), Transferrin receptor protein 1 (TFR1), Transforming Growth Factor beta 3 (TGF-beta3), Tumor Necrosis Factor alpha (TNF-alpha), Tumor Necrosis Factor beta (TNF-beta), Tumor necrosis factor ligand superfamily member 12 (Tweak), Tumor necrosis factor ligand superfamily member 13 (APRIL), Tumor Necrosis Factor Receptor I (TNF-RI), Tumor necrosis factor receptor 2 (TNFR2), Vascular Cell Adhesion Molecule 1 (VCAM-1), Vascular Endothelial Growth Factor (VEGF), Visceral adipose tissue derived serpin A12 (Vaspin), Visfatin, Vitamin D Binding Protein (VDBP), Vitronectin, von Willebrand Factor (vWF), or YKL-40.

In some embodiments, the biomarkers in the biomarker panel include biomarkers shown in Tables 8-10. In some embodiments, the biomarkers can include one or more of: Neurofilament Light Polypeptide Chain (NEFL), Myelin Oligodendrocyte Glycoprotein (MOG), Cluster of Differentiation 6 (CD6), Chemokine (C-X-C motif) ligand 9 (CXCL9), Osteoprotegerin (OPG), Osteopontin (OPN), Matrix Metallopeptidase 9 (MMP-9), Glial Fibrillary Acidic Protein (GFAP), CUB domain-containing protein 1 (CDCP1), C-C Motif Chemokine Ligand 20 (CCL20/MIP 3-α), Interleukin-12 subunit beta (IL-12B), Amyloid Beta Precursor Like Protein 1 (APLP1), Tumor Necrosis Factor Receptor Superfamily Member 10A (TNFRSF10A), Collagen, type IV, alpha 1 (COL4A1), Serpin Family A Member 9 (SERPINA9), Fibronectin Leucine Rich Transmembrane Protein 2 (FLRT2), Chemokine (C-X-C motif) ligand 13 (CXCL13), Growth Hormone (GH), Versican core protein (VCAN), Protogenin (PRTG), Contactin-2 (CNTN2). In some embodiments, the biomarkers further include Growth Hormone (GH2), Interleukin-18 (IL18), Matrix Metalloproteinase-2 (MMP-2), Gamma-Interferon-Inducible Lysosomal Thiol Reductase (IFI30), and Chitinase-3-like protein 1 (CHI3L1/YkL40).

In some embodiments, the biomarkers can include one or more of: Cell Adhesion Molecule 3 (CADM3), Kallikrein Related Peptidase 6 (KLK6), Brevican (BCAN), Oligodendrocyte Myelin Glycoprotein (OMG), CD5 molecule (CD5), Cytotoxic and Regulatory T Cell Molecule (CRTAM), CD244 Molecule (CD244), Tumor Necrosis Factor Receptor Superfamily Member 9 (TNFRSF9), Proteinase 3 (PRTN3), Follistatin Like 3 (FSTL3), C-X-C Motif Chemokine Ligand 10 (CXCL10), C-X-C Motif Chemokine Ligand 11 (CXCL11), Interleukin 18 Binding Protein (IL-18BP), Macrophage Scavenger Receptor 1 (MSR1), C-C Motif Chemokine Ligand 3 (CCL3), Tumor Necrosis Factor Ligand Superfamily Member 12 (TWEAK), Trefoil Factor 3 (TFF3), Ectonucleotide Pyrophosphatase/Phosphodiesterase 2 (ENPP2), Insulin Like Growth Factor Binding Protein 1 (IGFBP-1), Interleukin 12A (IL12A), Seizure Related 6 Homolog Like (SEZ6L), Dipeptidyl Peptidase Like 6 (DPP6), Neurocan (NCAN), Tubulointerstitial Nephritis Antigen Like 1 (TINAGL1), Calcium Activated Nucleotidase 1 (CANT1), Nectin Cell Adhesion Molecule 2 (NECTIN2), Neural Proliferation, Differentiation and Control Protein 1 (NPDC1), Tumor Necrosis Factor Receptor Superfamily Member 11A (TNFRSF11A), Contactin 4 (CNTN4), Neutrophic Receptor Tyrosine Kinase 2 (NTRK2), Neutrophic Receptor Tyrosine Kinase 3 (NTRK3), Cadherin 6 (CDH6), Carcinoembryonic Antigen Related Cell Adhesion Molecule 8 (CEACAM8), Mitotic Arrest Deficient 1 Like 1 (MAD1L1), Fc Fragment of IgA Receptor (FCAR), Myeloperoxidase (MPO), Osteomodulin (OMD), Matrix Extracellular Phosphoglycoprotein (MEPE), GDNF Family Receptor Alpha 3 (GDNFR-alpha-3), Scavenger Receptor Class F Member 2 (SCARF2), CD40 Ligand (IgM), Tumor Necrosis Factor Receptor Superfamily Member 1B (TNF-R2), Programmed Cell Death 1 Ligand (PD-L1), Notch 3 (NOTCH3), Contactin 1 (CNTN1), Oncostatin M (OSM), Transforming Growth Factor Alpha (TGF-α), Peptidoglycan Recognition Protein 1 (PGLYRP1), Nitric Oxide Synthase 3 (N053).

In particular embodiments, the biomarker panel useful for generating a prediction (e.g., a prediction for MS disease activity or a prediction for MS disease progression) includes biomarkers identified as Tier A in Table 1, Tier 1 in Table 2, or any of their corresponding substitute biomarkers in Table 10. For example, the biomarker panel includes NEFL, MOG, CD6, CXCL9, OPG, OPN, MMP-9, and GFAP (Tier A in Table 1). As another example, the biomarker panel includes NEFL, MOG, CD6, CXCL9, OPG, OPN, CXCL13, and GFAP (Tier 1 in Table 2).

In particular embodiments, the biomarker panel useful for generating a prediction (e.g., a prediction for MS disease activity or a prediction for MS disease progression) includes biomarkers identified as Tier B in Table 1, Tier 2 in Table 2, or any of their corresponding substitute biomarkers in Table 10. For example, the biomarker panel includes CDCP1, CCL20/MIP 3-α, IL-12B, APLP1, TNFRSF10A, COL4A1, SERPINA9, FLRT2, and CXCL13 (Tier B in Table 1). As another example, the biomarker panel includes CDCP1, CCL20/MIP 3-α, IL-12B, APLP1, TNFRSF10A, COL4A1, SERPINA9, FLRT2, and TNFSF13B (Tier 2 in Table 2).

In particular embodiments, the biomarker panel useful for generating a prediction (e.g., a prediction for MS disease activity or a prediction for MS disease progression) includes biomarkers identified as Tier C in Table 1, Tier 3 in Table 2 or any of their corresponding substitute biomarkers in Table 10. For example, the biomarker panel includes GH, VCAN, PRTG, and CNTN2 (Tier C in Table 1 and Tier 3 in Table 2).

In particular embodiments, the biomarker panel useful for generating a prediction (e.g., a prediction for MS disease activity or a prediction for MS disease progression) includes biomarkers identified as Tier A and Tier B in Table 1, Tier 1 and Tier 2 in Table 2, or any of their corresponding substitute biomarkers in Table 10. For example, the biomarker panel includes NEFL, MOG, CD6, CXCL9, OPG, OPN, MMP-9, GFAP, CDCP1, CCL20/MIP 3-α, IL-12B, APLP1, TNFRSF10A, COL4A1, SERPINA9, FLRT2, and CXCL13 (Tiers A and B in Table 1). As another example, the biomarker panel includes NEFL, MOG, CD6, CXCL9, OPG, OPN, CXCL13, GFAP, CDCP1, CCL20/MIP 3-α, IL-12B, APLP1, TNFRSF10A, COL4A1, SERPINA9, FLRT2, and TNFSF13B (Tiers 1 and 2 in Table 2).

In particular embodiments, the biomarker panel useful for generating a prediction (e.g., a prediction for MS disease activity or a prediction for MS disease progression) includes biomarkers identified as Tier A, Tier B, or Tier C in Table 1, Tier 1, Tier 2, or Tier 3 in Table 2, or any of their corresponding substitute biomarkers in Table 10. For example, the biomarker panel includes NEFL, MOG, CD6, CXCL9, OPG, OPN, MMP-9, GFAP, CDCP1, CCL20/MIP 3-α, IL-12B, APLP1, TNFRSF10A, COL4A1, SERPINA9, FLRT2, CXCL13, GH, VCAN, PRTG, and CNTN2 (Tiers A, B, and C in Table 1). As another example, the biomarker panel includes NEFL, MOG, CD6, CXCL9, OPG, OPN, CXCL13, GFAP, CDCP1, CCL20/MIP 3-α, IL-12B, APLP1, TNFRSF10A, COL4A1, SERPINA9, FLRT2, TNFSF13B, GH, VCAN, PRTG, CNTN2, GH2, IL18, MMP-2, IFI30, and CHI3L1/YkL40. (Tiers 1, 2, and 3 in Table 2).

In various embodiments, the biomarker panel for generating a prediction (e.g., a prediction for disease activity or a prediction for disease progression) includes a minimal set of predictive biomarkers, such as a pair of biomarkers, a biomarker triplicate, or a biomarker quadruplicate. In various embodiments, at least one of the biomarkers in a biomarker pair, biomarker triplicate, or biomarker quadruplicate is NEFL. In various embodiments, at least one of the biomarkers in a biomarker pair, biomarker triplicate, or biomarker quadruplicate is MOG. In various embodiments, the biomarker pair, biomarker triplicate, or biomarker quadruplicate does not include NEFL. In such embodiments, the biomarker pair, biomarker triplicate, or biomarker quadruplicate not including NEFL does include MOG.

Examples of biomarker pairs useful for generating a prediction (e.g., a prediction for MS disease activity or a prediction for MS disease progression) include: 1) NEFL and MOG, 2) NEFL and CD6, 3) NEFL and CXCL9, 4) NEFL and TNFRSF10A, 5) MOG and IL-12B, 6) CXCL9 and CD6, 7) MOG and CXCL9, 8) MOG and CD6, 9) CXCL9 and COL4A1, and 10) CD6 and VCAN. Additional examples of biomarker pairs that are predictive of multiple sclerosis disease activity include: 1) NEFL and TNFSF13B, 2) NEFL and CNTN2, 3) NEFL and CXCL9, 4) MOG and CDCP1, 5) MOG and TNFSF13B, and 6) MOG and CXCL9. Additional examples of biomarker pairs that are predictive of multiple sclerosis disease activity include: 1) NEFL and TNFSF13B, 2) NEFL and SERPINA9, 3) NEFL and GH, 4) MOG and TNFSF13B, 5) MOG and CXCL9, and 6) MOG and IL-12B.

Examples of biomarker triplicates that are useful for generating a prediction (e.g., a prediction for MS disease activity or a prediction for MS disease progression) include: 1) MOG, IL-12B, and APLP1, 2) MOG, CD6, and CXCL9, 3) CXCL9, COL4A1, and VCAN, 4) NEFL, CD6, and CXCL9, 5) NEFL, TNFRSF10A, and COL4A1, 6) MOG, IL-12B, and CNTN2, and 7) CD6, CCL20, and VCAN. Additional examples of biomarker triplicates that are predictive of multiple sclerosis disease activity include: 1) NEFL, CNTN2, and TNFSF13B, 2) NEFL, APLP1, and TNFSF13B, 3) NEFL, TNFRSF10A, and TNFSF13B, 4) MOG, CXCL9, and TNFSF13B, 5) MOG, OPG, and TNFSF13B, and 6) MOG, CCL20, and TNFSF13B. Additional examples of biomarker triplicates that are predictive of multiple sclerosis disease activity include: 1) NEFL, SERPINA9, and TNFSF13B, 2) NEFL, CNTN2, and TNFSF13B, 3) NEFL, APLP1, and TNFSF13B, 4) MOB, CXCL9, and TNFSF13B, 5) MOG, SERPINA9, and TNFSF13B, and 6) MOG, OPG, and TNFSF13B.

Examples of biomarker quadruplicates that are useful for generating a prediction (e.g., a prediction for MS disease activity or a prediction for MS disease progression) include: 1) NEFL, MOG, CD6, and CXCL9, 2) NEFL, CXCL9, TNFRSF10A, and COL4A1, 3) MOG, CXCL9, IL-12B, and APLP1, 4) CXCL9, COL4A1, OPG, and VCAN, 5) CXCL9, OPG, APLP1, and OPN, 6) NEFL, CD6, CXCL9, and CXCL13, 7) NEFL, MOG, CD6, and CXCL9, 8) NEFL, TNFRSF10A, COL4A1, and CCL20, 9) MOG, IL-12B, OPN, and CNTN2, and 10) CD6, COL4A1, CCL20, and VCA. Additional examples of biomarker quadruplicates that are predictive of multiple sclerosis disease activity include: 1) NEFL, TNFRSF10A, CNTN2, and TNFSF13B, 2) NEFL, COL4A1, CNTN2, and TNFSF13B, 3) NEFL, TNFRSF10A, APLP1, and TNFSF13B, 4) MOG, CXCL9, APLP1, and TNFSF13B, 5) MOG, CXCL9, OPG, and TNFSF13B, and 6) MOG, CXCL9, OPG, and CNTN2. Additional examples of biomarker quadruplicates that are predictive of multiple sclerosis disease activity include: 1) NEFL, CCL20, SERPINA9, and TNFSF13B, 2) NEFL, APLP1, SERPINA9, and TNFSF13B, 3) NEFL, CCL20, APLP1, and TNFSF13B, 4) MOG, CXCL9, OPG, and TNFSF13B, 5) MOG, OPG, SERPINA9, AND TNFSF13B and 6) MOG, CXCL9, SERPINA9, and TNFSF13B.

V. Biomarkers

The dysregulation of biomarkers disclosed herein may contribute to the development and/or progression of disease activity, such as disease activity of a neurodegenerative disease including multiple sclerosis, Parkinson's Disease, Lewy body disease, Alzheimer's Disease, Amyotrophic lateral sclerosis (ALS), motor neuron disease, Huntington's Disease, Spinal muscular atrophy, Friedreich's ataxia, Batten disease, and the like. Biomarkers, and the corresponding categorization of the biomarkers, are shown below in Table 11. Example categories include: neurodegeneration, myelin integrity, neurite outgrowth and neurogenesis, inflammation, immune modulation, cell regulation, cell adhesion, gut-brain axis, metabolism, and neuroregulatory categories. Additionally, biomarkers and their involvement in particular locations (e.g., brain, brain barrier, or blood) and cell types are shown in Tables 12, 13A, and 13B.

NEFL is a 68 kDa biomarker that reflects axonal damage in the microenvironment. In other words, NEFL often serves as a proxy for axonal degeneration. Additionally, NEFL interacts with other biomarkers such as MAP2, Protein Kinase N1, and Tuberous sclerosis (TSC1).

COL4A1 is a 26 kDa biomarker involved in cell proliferation, migration, extracellular matrix formation, as well as inhibition of endothelial cell proliferation, migration, and tube formation. COL4A1 is involved in the outgrowth of hippocampal embryonic neurons and is further involved in myelin integrity. Type IV collagen is a major structural component of glomerular basement membranes (GBM), forming a chicken-wire mesh work together with laminins, proteoglycans and entactin/nidogen. It comprises a C-terminal NC1 domain, which inhibits angiogenesis and tumor formation. The C-terminal half is found to possess the anti-angiogenic activity. Type IV collage also inhibits endothelial cell proliferation, migration and tube formation as well as also inhibiting expression of hypoxia-inducible factor 1alpha and ERK1/2 and p38 MAPK activation. COL4A1 mutations are associated with a wide range of phenotypes that include both ischemic and hemorrhagic strokes, migraines, leukomalacia, nephropathy, hematuria, chronic muscle cramps, and ocular anterior segment diseases including congenital cataracts, glaucoma, and Axenfeld-Rieger anomalies. Case Rep Neurol. 2015 May-August; 7(2): 142-147. Published online 2015 Jun. 2. doi:10.1159/000431309.

APLP1 is a 72 kDa biomarker involved in synaptic maturation during cortical development and regulation of neurite outgrowth. APLP1 is one of two homologs: amyloid-like proteins 1 and 2, or APLP1 and APLP2. The encoding gene of APLP1 is a member of the highly conserved amyloid precursor protein gene family. The encoded protein is a membrane-associated glycoprotein that is cleaved by secretases in a manner similar to amyloid beta A4 precursor protein cleavage. This cleavage liberates an intracellular cytoplasmic fragment that may act as a transcriptional activator. APLP1 may also play a role in synaptic maturation during cortical development. Can regulate neurite outgrowth through binding to components of the extracellular matrix such as heparin and collagen I. APLP1 is extensively expressed in humans. Functions attributed to APLP1 include neurite outgrowth and synaptogenesis, protein trafficking along axons, cell adhesion, calcium metabolism, neuronal damage, synaptic dysfunction, and signal transduction.

MMP2 (72 kDa) and MMP9 (78-92 kDa) are gelatinases, a type of proteolytic enzyme involved in the breakdown of extracellular matrices. MMP2 and MMP9 play role in physiological processes such as embryonic development, reproduction, and tissue remodeling. Serum MMP-2 and MMP-9 are elevated in different multiple sclerosis subtypes. Avolio, C., et al. Serum MMP-2 and MMP-9 are elevated in different multiple sclerosis subtypes, J. Neuroimmunol. March; 136 (1-2):46-53. The integrity of the blood-brain barrier as the main structural interface between periphery and brain seems to play an important role in MS. Reducing the secretion of proteolytic matrix metalloproteinases (MMP), e.g., MMP2 and/or MMP9, as disruptors of blood-brain barrier integrity could have profound implications for MS. Proschinger et al. "Influence of combined functional resistance and endurance exercise over 12 weeks on matrix metalloproteinase-2 serum concentration in persons with relapsing-remitting multiple sclerosis—a community-based randomized controlled trial." BMC Neurol 19, 314 (2019).

FLRT2 is a 74 kDa biomarker and is a member of the fibronectin leucine rich transmembrane protein family, which function in cell adhesion and/or receptor signaling. FLRT2 is expressed in brain as well as in the heart and several other organs, and is involved in fibroblast growth factor-mediated signaling cascades. In the heart, it is required for normal organization of the cardiac basement membrane during embryogenesis, and for normal embryonic epicardium and heart morphogenesis. In the neurology context, FLRT2 functions in cell-cell adhesion, cell migration and axon guidance. It may play a role in the migration of cortical neurons during brain development via its interaction with UNC5D. FLRT2 is also involved in glutamate excitotoxicity, neuronal cell death, and synaptic formation & plasticity.

VCAN (>200 kDa biomarker) is involved in cell motility, cell growth and differentiation, cell adhesion, cell proliferation, cell migration, and angiogenesis. VCAN is further involved in myelin protection, astrocytic excitotoxicity, and is a proinflammatory mediator secretion. VCAN is a key factor in inflammation through interactions with adhesion molecules on the surfaces of inflammatory leukocytes and interactions with chemokines that are involved in recruiting inflammatory cells. In the adult central nervous system, versican is found in perineuronal nets, where it may stabilize synaptic connections. Versican can also inhibit nervous system regeneration and axonal growth following an injury to the central nervous system.

TNFSF13B, also herein referred to as B-cell activating factor (BAFF), is a biomarker involved in T cell-independent B cell activation and ectopic lymphoid follicle formation.

CHI3L1 is a 40 kDa biomarker that plays a role in inflammation, innate immune system, tissue remodeling, and in the capacity of cells to respond to and cope with changes in their environment. CHIL3L1 further plays a role in T-helper cell type 2 (Th2) inflammatory response and IL-13-induced inflammation, regulating allergen sensitization, inflammatory cell apoptosis, dendritic cell accumulation and M2 macrophage differentiation. CHI3L1 facilitates invasion of pathogenic enteric bacteria into colonic mucosa and lymphoid organs, activation of AKT1 signaling pathway and subsequent IL8 production in colonic epithelial cells, antibacterial responses in lung by contributing to macrophage bacterial killing, controlling bacterial dissemination, and augmenting host tolerance. CHI3L1 also regulates hyperoxia-induced injury, inflammation, and epithelial apoptosis in lung.

IL-12B is a 40 kDa biomarker representing one subunit of the IL-12 heterodimer. IL-12A (35 kDa) represents the other subunit of the IL-12 heterodimer. IL-12B is involved in innate & adaptive immunity and in the regulation of memory/effector Th1 cells. IL-12B is a growth factor for activated T and NK cells. IL-12B associates with IL23A to form the IL-23 interleukin, a heterodimeric cytokine which functions in innate and adaptive immunity. Polymorphisms in the genes encoding interleukin 23 receptor (IL23R) and the p40 subunit of IL-12/23 (IL12B) have been implicated in multiple sclerosis (MS) risk. Huang et al., "Meta-analysis of the IL23R and IL12B polymorphisms in multiple sclerosis." Int. J. of Neuroscience, 126:3, 205-212 (2016).

IFI30 is a 30-35 kDa biomarker that plays a role in antigen processing by facilitating complete unfolding of proteins destined for lysosomal degradation. IFI30 facilitates the generation of MHC class II-restricted epitopes from disulfide bond-containing antigen by the endocytic reduction of disulfide bonds. IFI30 also facilitates also MHC class I-restricted recognition of exogenous antigens containing disulfide bonds by CD8+ T-cells or cross presentation. IFI30 is expressed constitutively in antigen presenting cells and is induced by inflammatory cytokines.

SERPINA9 is a 42 kDa biomarker that is a member of the serpin family of serine protease inhibitors. SERPINA9 is involved in neuronal damage. The expression of SERPINA9 is likely restricted to germinal center B cells and lymphoid malignancies. SERPINA9 is likely to function in vivo in the germinal center as an efficient inhibitor of trypsin-like proteases.

IL18 is involved in immune response and inflammatory processes. IL18 is a proinflammatory cytokine primarily involved in polarized T-helper 1 (Th1) cell and natural killer (NK) cell immune responses. It serves as an inhibitor of the early Th1 cytokine response. It further plays a role in Th-1 response through its ability to induce IFN-gamma production in T cells and NK cells. IL-18 in CSF and serum were significantly higher in comparison with the levels found in patients without enhancing lesions. The results suggest involvement of IL-18 in immunopathogenesis of MS especially in the active stages of the disease. Losy, J., et al. IL-18 in patients with multiple sclerosis. Acta Neurologica Scandinavica, 104:171-173 (2001). Additionally, higher IL-18 serum levels and significant different frequencies of two polymorphisms of IL-18 were found in MS patients. Jahanbani-Ardakani, H. et al., Interleukin 18 polymorphisms and its serum level in patients with multiple sclerosis, Ann Indian Acad Neurol; 22:474-76 (2019).

CDCP1 is a 90-140 kDa biomarker involved in T-cell migration, cell adhesion, and cell matrix association. CDCP1 may play a role in the regulation of anchorage versus migration or proliferation versus differentiation via its phosphorylation. CDCP1 is expressed in cells with phenotypes reminiscent of mesenchymal stem cells and neural stem cells. Additionally, CDCP1 is a ligand for CD6, a receptor molecule expressed on certain T-cells and may play a role in their migration and chemotaxis.

CNTN2 is a 113 kDa biomarker involved in cell adhesion, proliferation, migration, axon guidance of neurons, neuronal damage, and axon-dendritic rearrangement. CNTN2 is a member of the contactin family of proteins, part of the immunoglobulin superfamily of cell adhesion molecules. CNTN2 is a glycosylphosphatidylinositol (GPI)-anchored neuronal membrane protein and plays a role in the proliferation, migration, and axon guidance of neurons of the developing cerebellum. A mutation in CNTN2 gene may be associated with adult myoclonic epilepsy. In conjunction with another transmembrane protein, CNTNAP2, which contributes to the organization of axonal domains at nodes of Ranvier by maintaining voltage-gated potassium channels at the juxtaparanodal region.

GFAP is a 50 kDa biomarker involved in demyelination, degeneration, and neuroaxonal injury. Astroglial activation is associated with activation of the immune cascade and is thought to play a role in the demyelination and neuroaxonal injury observed in MS. Glial fibrillar acidic protein (GFAP) is the major constituent of gliotic scarring. GFAP is used as a marker to distinguish astrocytes from other glial cells during development. Higher serum concentrations of both GFAP and NEFL were associated with higher EDSS, older age, longer disease duration, progressive disease course and MRI pathology. Hoge', H., et al., Serum glial fibrillary acidic protein correlates with multiple sclerosis disease severity. Multiple Sclerosis Journal, 26(13) 2018.

MOG is a 28 kDa membrane protein expressed on the oligodendrocyte cell surface and the outermost surface of myelin sheaths. Due to this localization, it serves as a cell surface receptor or cell adhesion molecule and is a primary target antigen involved in immune-mediated demyelination. This protein may be involved in completion and maintenance of the myelin sheath and in cell-cell communication. Diseases associated with MOG include Narcolepsy and Rubella. Among its related pathways are Neural Stem Cell Differentiation Pathways and Lineage-specific Markers. A paralog of the MOG gene is BTN1A1.

CD6 is a 90-130 kDa biomarker involved in central nervous system development. CD6 is a cell-adhesion molecule involved in blood brain barrier breach and T-cell mediated acute inflammatory response. Recent studies have identified CD6 as a risk gene for multiple sclerosis (MS), a disease in which autoreactive T cells are integrally involved. De Jager, P L., et al., Meta-analysis of genome scans and replication identify CD6, IRF8 and TNFRSF1A as new multiple sclerosis susceptibility loci. Nat Genet. 2009; 41(7):776-782. CD6 is found on the outer membrane of T-lymphocytes and is involved in the transmigration of leukocytes across the blood-brain barrier.

CXCL9 is a 12 kDa biomarker involved in immune response and inflammatory processes. CXCL9 is a cytokine that affects the growth, movement, or activation state of cells that participate in immune and inflammatory response. CXCL9 (MIG) is a chemokine that upon binding to its receptor CXCR3 elicits chemotactic activity on T cells and is involved in inflammatory response. CXCL9 is not constitutively expressed but is inducible by IFN-gamma. CXCL9 has been described to be involved in several inflammation-related diseases such as hepatitis C, skin inflammation, rheumatoid arthritis, and pharyngitis. Consistent with this observation is the upregulation of ELR-CXC chemokines, CXCL9, CXCL10 and CXCL11, which are unregulated in the CNS of EAE-affected mice induced by transfer of Th1 cells. Lovett-Racke, A., et al. Th1 versus Th17: Are T cell cytokines relevant in multiple sclerosis? Biochimca et Biophysica Acta (BBA)—Molecular Basis of Disease. 1812 (2): 246-251 (2011).

CXCL13 is a biomarker involved in cell growth, cell reproduction, regeneration and inflammatory responses. CXCL13 belongs to the CXC chemokine family and is selectively chemotactic for B cells. It interacts with chemokine receptor CXCR5 through which it regulates the organization of B cells. Serum levels of CXCL13 have been implicated in multiple sclerosis. Festa, E. et al. Serum levels of CXCL13 are elevated in active multiple sclerosis. Multiple Sclerosis Journal, 15(11): 1271-1279 (2009).

CCL20 is a 11 kDa biomarker involved in axonal guidance and chemotaxis of dendritic cells. CCL20 is a chemokine involved in immunoregulatory and inflammatory processes (e.g., acute inflammatory response) and is expressed in epithelial cells of choroid plexus in the human brain. It serves as a cognate ligand of CCR6.

OPG is a 55-60 kDa biomarker involved in inflammation, cell apoptosis, and T-cell activation processes. OPG is a decoy receptor of cytokines TNFSF11 (RANKL) and possibly TNFSF10 (TRAIL) and belongs to the TNF receptor superfamily. OPG is up-regulated by estrogens and increasing calcium concentrations, and it has a role in transcriptional regulation in inflammation, innate immunity, and cell survival and differentiation; for example, OPG binding to TNFSF11 inhibits the differentiation of osteoclast precursors into mature osteoclasts and OPG has been used experimentally for the treatment of osteoporosis. OPG has been described to be involved in several inflammation-related diseases such as rheumatoid arthritis, inflammatory bowel disease, and periodontitis.

OPN is a 33-44 kDa biomarker involved in inflammation and immune modulation. OPN is a pleiotropic integrin binding protein with functions in cell-mediated immunity, inflammation, tissue repair, and cell survival. OPN also plays a role in biomineralization.

PRTG is a 180 kDa biomarker involved in neurogenesis, neurotrophin binding, neuronal survival, and demyelination. It may play a role in anteroposterior axis elongation. PRTG is a membrane protein and member of the immunoglobulin superfamily. It is considered to be primarily a developmental protein that has some associations to neuralgia, demyelinating diseases and dyslexia.

TNFRSF10A is a 50 kDa biomarker that is a member of the TNF-receptor superfamily. TNFRSF10A is involved in inflammation and neurodegenerative processes. This receptor is activated by tumor necrosis factor-related apoptosis inducing ligand (TNFSF10/TRAIL), and thus transduces cell death signal and induces cell apoptosis.

GH, also known as somatotropin or somatropin, is a neuroendocrine marker that stimulates growth, cell reproduction and regeneration in humans and other animals. It regulates energy homeostasis and metabolism. It is a type of mitogen which is specific only to certain kinds of cells. Prior studies have shown that it is decreased in the serum of severe MS patients. Gironi, M., et al. Growth hormone and Disease Severity in Early Stage of Multiple Sclerosis. Multiple Sclerosis International 2013: (2013).

GH2, also known as growth hormone 2, placenta-specific growth hormone, and growth hormone variant, is a biomarker involved in growth control, differentiation, and proliferation of myoblasts. It regulates energy homeostasis and metabolism. It is produced and secreted by the placenta during pregnancy and is the dominant form of growth hormone during the pregnancy phase.

VCAM-1 is a 80 kDa transmembrane biomarker typically expressed in blood vessels that mediates the adhesion of cells to vascular endothelium. VCAM-1 is characterized by its multiple immunoglobulin domains. VCAM-1 has been implicated in multiple sclerosis. Peterson, J. et al., VCAM-1-Positive Microglia Target Oligodendrocytes at the Border of Multiple Sclerosis Lesions, *Journal of Neuropathology & Experimental Neurology*, Volume 61, Issue 6, June 2002, Pages 539-546. Matsuda, M. et al. Increased levels of soluble vascular cell adhesion molecule-1 (VCAM-1) in the cerebrospinal fluid and sera of patients with multiple sclerosis and human T lymphotropic virus type-1-associated myelopathy. J. Neuroimmunology, 59(1-2): 35-40 (1995).

In various embodiments, the biomarker panel may include yet further additional biomarkers described herein. In various embodiments, these further additional biomarkers serve as substitutable biomarkers for the biomarkers described above. In various embodiments, further additional biomarkers include: Cell Adhesion Molecule 3 (CADM3), Kallikrein Related Peptidase 6 (KLK6), Brevican (BCAN), Oligodendrocyte Myelin Glycoprotein (OMG), CD5 molecule (CD5), Cytotoxic and Regulatory T Cell Molecule (CRTAM), CD244 Molecule (CD244), Tumor Necrosis Factor Receptor Superfamily Member 9 (TNFRSF9), Proteinase 3 (PRTN3), Follistatin Like 3 (FSTL3), C-X-C Motif Chemokine Ligand 10 (CXCL10), C-X-C Motif Chemokine Ligand 11

(CXCL11), Interleukin 18 Binding Protein (IL-18BP), Macrophage Scavenger Receptor 1 (MSR1), C-C Motif Chemokine Ligand 3 (CCL3), Tumor Necrosis Factor Ligand Superfamily Member 12 (TWEAK), Trefoil Factor 3 (TFF3), Ectonucleotide Pyrophosphatase/Phosphodiesterase 2 (ENPP2), Insulin Like Growth Factor Binding Protein 1 (IGFBP-1), Interleukin 12A (IL12A), Seizure Related 6 Homolog Like (SEZ6L), Dipeptidyl Peptidase Like 6 (DPP6), Neurocan (NCAN), Tubulointerstitial Nephritis Antigen Like 1 (TINAGL1), Calcium Activated Nucleotidase 1 (CANT1), Nectin Cell Adhesion Molecule 2 (NECTIN2), Neural Proliferation, Differentiation and Control Protein 1 (NPDC1), Tumor Necrosis Factor Receptor Superfamily Member 11A (TNFRSF11A), Contactin 4 (CNTN4), Neutrophic Receptor Tyrosine Kinase 2 (NTRK2), Neutrophic Receptor Tyrosine Kinase 3 (NTRK3), Cadherin 6 (CDH6), Carcinoembryonic Antigen Related Cell Adhesion Molecule 8 (CEACAM8), Mitotic Arrest Deficient 1 Like 1 (MAD1L1), Fc Fragment of IgA Receptor (FCAR), Myeloperoxidase (MPO), Osteomodulin (OMD), Matrix Extracellular Phosphoglycoprotein (MEPE), GDNF Family Receptor Alpha 3 (GDNFR-alpha-3), Scavenger Receptor Class F Member 2 (SCARF2), CD40 Ligand (IgM), Tumor Necrosis Factor Receptor Superfamily Member 1B (TNF-R2), Programmed Cell Death 1 Ligand (PD-L1), Notch 3 (NOTCH3), Contactin 1 (CNTN1), Oncostatin M (OSM), Transforming Growth Factor Alpha (TGF-α), Peptidoglycan Recognition Protein 1 (PGLYRP1), Nitric Oxide Synthase 3 (N053), Discoidin Domain Receptor Tyrosine Kinase 1 (DDR1), C-X-C Motif Chemokine Ligand 16 (CXCL16), CD166 antigen (ALCAM), Spondin-2 (SPON2), and Protocadherin-17 (PCDH17).

CADM3 is involved in cell-cell adhesion and interacts with any of IGSF4, NECTIN1, NECTIN 3, and EPB41L1. CADM3 is involved in the biological processes of adherens junction organization, heterophilic cell-cell adhesion, homophilic cell adhesion, and protein localization.

KLK6 is a serine protease that demonstrates activity against proteins such as alpha-synuclein, amyloid precursor protein, myelin basic protein, gelatin, casein and extracellular matrix proteins such as fibronectin, laminin, vitronectin and collagen. KLK6 is involved in the biological processes of amyloid precursor protein metabolic process, CNS development, myelination, protein autoprocessing, regulation of cell differentiation and neuron development, response to wounding, and tissue regeneration.

BCAN is a proteoglycan and is a member of the lectican protein family. BCAN is involved in the biological processes of cell adhesion, CNS development, chondroitin sulfate biosynthesis and catabolic processes, extracellular matrix organization, and axonal synapse maturation.

OMG is a cell adhesion molecules involved in the myelination of the central nervous system. OMG is involved in the biological processes of cell adhesion, regulation of axonogenesis, and neuron projection regeneration.

CD5 is a signal transducing molecule that can be expressed on the surface of cells, such as T-lymphocytes. CD5 is involved in the biological processes of apoptotic signaling pathways, cell recognition, T cell proliferation, and T cell costimulation.

CRTAM is an immunoglobulin-superfamily transmembrane protein and is involved in the biological processes of the adaptive immune response, cell recognition, detection of stimulus or cells, and regulation of immune response. CRTAM is further involved in heterophilic cell-cell adhesion which regulates the activation, differentiation and tissue retention of various T-cell subsets.

CD244 is a member of the signaling lymphocyte activation molecule expressed on natural killer cells. CD244 is involved in the biological processes of immune response (adaptive and innate), leukocyte migration, regulation of cytokine secretion, and signal transduction. CD244 modulates the activation and differentiation of a wide variety of immune cells and thus are involved in the regulation and interconnection of both innate and adaptive immune response TNFRSF9 is a member of the tumor necrosis factor receptor family and is involved in the biological processes of the TNFR signaling pathway, cell proliferation, and apoptotic processes. TNFRSF9 is expressed by activated T cells.

PRTN3 is a serine protease expressed by neutrophil granulocytes. PRTN3 is involved in the biological processes of antimicrobial humoral response, blood coagulation, neutrophil activity, proteolysis, and cytokine-mediated signaling pathways.

FSTL3 is a secreted glycoprotein of the follistatin-module-protein family. FSTL3 is involved in the biological processes of activin/fibronectin binding, organ development, osteogenesis, ossification, and regulation of cell-cell adhesion.

CXCL10 and CXCL11 are each cytokines in the CXC chemokine family. CXCL10 and CXCL11 are involved in the biological processes of immune response, inflammatory response, cell signaling, chemotaxis, T-cell recruitment, and cell proliferation.

IL-18BP is a protein that serves as an inhibitor of the proinflammatory cytokine IL18. IL-18BP is involved in the biological processes of cytokine stimulus, IL-18 mediated signaling pathway, and immune response.

MSR1 is a membrane glycoprotein expressed by macrophages. MSR1 is involved in the biological processes of endocytosis and cholesterol transport and storage and can be implicated in the pathologic deposition of cholesterol in arterial walls during atherogenesis.

CCL3 is a monokine with inflammatory and chemokinetic properties that binds to CCR1, CCR4, and CCR5. CCL3 is involved in the biological processes of cell migration (e.g., lymphocyte and macrophage chemotaxis), calcium-mediated signaling, cell-cell signaling, cytokine secretion, and inflammatory response.

TWEAK is a cytokine in the tumor necrosis factor ligand family. TWEAK is involved in the biological processes of angiogenesis, cell differentiation, immune response, signal transduction, apoptosis, and the TNF mediated signaling pathway. TWEAK further promotes proliferation and migration of endothelial cells.

TFF3 is a 6 kDa glycoprotein generally produced by goblet cells and involved in the gastrointestinal tract. TFF3 is involved in the biological processes of the maintenance and healing of gastrointestinal epithelium and regulation of glucose metabolic processes.

ENPP2 is a phosphodiesterase involved in the generation of the lipid signaling molecule lysophosphatidic acid. ENPP2 hydrolyzes lysophospholipids and is involved in the biological processes of cell motility, chemotaxis, immune response, and angiogenesis.

IGFBP-1 is a member of the insulin-like growth factor binding protein family. It binds insulin-like growth factors (IGF) I and II. IGFBP-1 is involved in the biological processes of aging, cell metabolic processes, cell growth, signal transduction, and tissue regeneration.

IL-12A is a subunit that, along with the other IL-12B subunit, together form the IL-12 heterodimer. IL-12A is involved in the biological processes of cell migration, cell proliferation, cell adhesion, cell differentiation, regulation of immune cell (e.g., T-cell, dendritic cell, natural killer cell) activation.

SEZ6L is a protein primarily located in the endoplasmic reticulum membrane and it regulates endoplasmic reticulum functions in neurons. SEZ6L is involved in the biological processes of synapse maturation, adult locomotory behavior, and regulation of protein kinase C signaling.

DPP6 is a membrane protein that is a member of the peptidase S9B family of serine proteases. DPP6 is involved in the biological processes of regulation of potassium channels and protein localization to the plasma membrane, and can influence susceptibility to amyotrophic lateral sclerosis.

NCAN is a protein that is a member of the lectican/chondroitin sulfate proteoglycan families. NCAN is involved in the biological processes of cell adhesion, CNS development, ECM organization, and synthesis of chondroitin sulfate and dermatan. NCAN is involved in neuronal adhesion and neurite growth during development by binding to neural cell adhesion molecules.

TINAGL1 is an extracellular matrix protein involved in the biological processes of cell adhesion, proliferation, migration, and differentiation. TINAGL1 further plays a role in endocytosis and endosomal transport.

CANT1 is a calcium-dependent nucleotidase with a preference of uridine diphosphate. CANT1 is involved in the biological processes of regulation of calcium ion binding, neutrophil degranulation, regulation of NF-kappa B signaling, and proteoglycan biosynthetic process. CANT1 regulates metabolism processes, such as metabolism of nucleotides.

NECTIN2 is a membrane glycoprotein serving as a component of adherens junction. NECTIN2 is involved in the biological processes of cell-cell adhesion (through adherens junction organization), cytoskeletal organization, virus receptor activity, and regulation of NK cell and T cell activities.

NPDC1 is a protein expressed primarily in brain. NPDC1 is involved in the biological processes of the regulation of immune response and neural cell development and proliferation. NPDC1 suppresses oncogenic transformation in neural and non-neural cells and down-regulates neural cell proliferation.

TNFRSF11A is a member of the TNF-receptor superfamily. TNFRSF11A is involved in the biological processes of cell-cell signaling, immune response, monocyte chemotaxis, and TNF-mediated signaling pathway. Furthermore, TNFSF11A plays a role in osteoclastogenesis.

CNTN4 is a member of the contactin family of immunoglobulins. CNTN4 is involved in the biological processes of axonal guidance and development, synaptogenesis, cell surface interactions during nervous system development, brain development, neuron cell-cell adhesion, neuron projection, neuron differentiation, and regulation of synaptic plasticity.

NTKR2 is a receptor tyrosine kinase (part of the neurotrophic tyrosine receptor kinase family) that binds to brain-derived neurotropic factor. NTKR2 is involved in the biological processes of neuron survival, proliferation, migration, differentiation, synapse formation, and synapse plasticity.

NTKR3 is a receptor tyrosine kinase (part of the neurotrophic tyrosine receptor kinase family) that binds to neurotrophin-3. NTKR3 is involved in the biological processes of regulation of GTPase and MAPK activity, regulation of astrocyte differentiation, nervous system development, and neuron migration.

CDH6 is a member of the cadherin superfamily which mediates cell-cell adhesion. CDH6 is involved in the biological processes of cell-cell adhesion (adherens junction organization), cell morphogenesis, and Notch signaling pathway. CDH6 mediates both heterotypic cell-cell contacts via its interaction with CD6, as well as homotypic cell-cell contacts. CDH6 is further involved in axon extension and axon guidance.

CEACAM8 is a cell surface glycoprotein belonging to the carcinoembryonic antigen (CEA) superfamily. CEACAM8 is involved in the biological processes of regulation of the immune response, leukocyte migration, neutrophil degranulation, and cell-cell adhesion.

MAD1L1 is a mitotic spindle assembly checkpoint protein. MAD1L1 is involved in the biological processes of cell division and mitotic cell cycle checkpoint.

FCAR is a transmembrane glycoprotein on the surface of immune cells such as neutrophils, monocytes, and macrophages. FCAR is involved in the biological processes of regulation of the immune response, neutrophil activation/degranulation, and response to cytokines (e.g., interferons, interleukins, TNF).

MPO is a heme protein (enzyme) expressed in neutrophil granulocytes. MPO is involved in the biological processes of the immune response, neutrophil degranulation, and chromatin/heme/heparin binding.

OMD is suggested to be involved in biomineralization processes and in binding osteoblasts. OMD is involved in biological processes of cell adhesion and regulation of bone mineralization.

MEPE is a calcium-binding phosphoprotein in the small integrin-binding ligand, N-linked glycoprotein (SIBLING) family. MEPE is involved in biological processes of extracellular matrix binding/regulation, biomineral tissue development, skeletal system development, and bone and cartilage mineralization. MEPE is involved in renal phosphate excretion and inhibits intestinal phosphate absorption. MEPE is further involved in dental pulp stem cell proliferation and differentiation.

GDNFR-alpha-3 is a glial cell line-derived neurotrophic factor and is a member of the GDNF receptor family and binds to artemin (ARTN). GDNFR-alpha-3 is involved in the biological processes of axon guidance, nervous system development, neuron migration, GDNF receptor activity, and signaling receptor activity and binding.

SCARF2 is a member of the scavenger receptor type F family. SCARF 2 is an adhesion protein and is involved in the biological processes of scavenger receptor activity and cell-cell adhesion.

CD40 ligand is primary expressed on activated T cells and a member of the TNF superfamily of molecules. CD40 ligand is involved in the biological processes of B cell differentiation and proliferation, inflammatory response, leukocyte cell-cell adhesion, platelet activation, T cell costimulation, and TNF-mediated signaling pathway.

TNF-R2 is a membrane receptor that binds tumor necrosis factor-alpha. TNF-R2 is involved in the biological processes of TNF-mediated signaling pathway, neutrophil degranulation, regulation of neuroinflammatory response, and cell signaling. TNF-R2 protects neurons from apoptosis by stimulating antioxidative pathways and protects neurons from apoptosis by stimulating antioxidative pathways PD-L1 is a ligand that binds to PD-1 and is an important target in cancer immunotherapy checkpoint inhibitor research. PD-L1 is involved in biological processes of immune response, interferon regulation, T cell proliferation, T cell costimulation, cell migration, and cytokine production.

NOTCH3 is a protein in the NOTCH receptor family involved in the Notch signaling pathway. NOTCH3 is involved in the biological processes of gene activation, calcium ion binding, signaling receptor activity, neuron fate commitment, and brain development. NOTCH3 further regulates cell-fate determination.

CNTN1 is a neuronal membrane protein that plays a role in cell adhesion. CNTN1 is involved in the biological processes of neuron projection development, brain development, cell adhesion, and Notch signaling.

OSM is a cytokine in the interleukin 6 cytokine family. OSM is involved in the biological processes of regulation of immune response, cell proliferation/division, inflammatory response, and cytokine activity (e.g., MAPK and STAT pathways).

TGFA is a mitogenic polypeptide and is part of the epidermal growth factor family. TGFA is involved in the biological processes of growth factor activity, signaling pathways (e.g., MAPK, EGF), cell division/proliferation, and signal transduction.

PGLYRP1 is a peptidtoglycan binding protein and is involved in the biological processes of the innate immune response, inflammatory response, neutrophil degranulation, and peptidoglycan immune receptor activity.

NOS3 regulates production of nitric oxide. NOS3 is involved in the biological processes of angiogenesis, blood vessel remodeling, endothelial cell migration, vasodilation, vascular smooth muscle relaxation, and promotion of blood clotting through the activation of platelets.

DDR1 regulates cell attachment to the extracellular matrix, remodeling of the extracellular matrix, cell migration, differentiation, and survival and cell proliferation. DDR1 further promotes smooth muscle cell migration.

CXCL166 plays a role in immune modulation and serves as a scavenger receptor on macrophages.

IL6 is a cytokine involved in differentiation of B-cells, lymphocytes, and monocytes.

ALCAM is involved in axon guidance, embryonic and induced pluripotent stem cell differentiation pathways and lineage-specific markers, as well as L1CAM interactions.

NTRK2 is involved in the development and the maturation of the central and the peripheral nervous systems through regulation of neuron survival, proliferation, migration, differentiation, and synapse formation and plasticity.

SPON2 is involved in the outgrowth of hippocampal embryonic neurons.

NTRK3 is involved in regulating the nervous system and development of the heart.

PCDH17 is involved in establishment and function of specific cell-cell connections in the brain.

VI. Assays

As shown in FIG. 1A, the system environment 100 involves implementing a marker quantification assay 120 for evaluating expression levels of one or more biomarkers. Examples of an assay (e.g., marker quantification assay 120) for one or more markers include DNA assays, microarrays, polymerase chain reaction (PCR), RT-PCR, Southern blots, Northern blots, antibody-binding assays, enzyme-linked immunosorbent assays (ELISAs), flow cytometry, protein assays, Western blots, nephelometry, turbidimetry, chromatography, mass spectrometry, immunoassays, including, by way of example, but not limitation, RIA, immunofluorescence, immunochemiluminescence, immunoelectrochemiluminescence, or competitive immunoassays, immunoprecipitation, and the assays described in the Examples section below. The information from the assay can be quantitative and sent to a computer system of the invention. The information can also be qualitative, such as observing patterns or fluorescence, which can be translated into a quantitative measure by a user or automatically by a reader or computer system.

Various immunoassays designed to quantitate markers can be used in screening including multiplex assays. Measuring the concentration of a target marker in a sample or fraction thereof can be accomplished by a variety of specific assays. For example, a conventional sandwich type assay can be used in an array, ELISA, RIA, etc. format. Other immunoassays include Ouchterlony plates that provide a simple determination of antibody binding. Additionally, Western blots can be performed on protein gels or protein spots on filters, using a detection system specific for the markers as desired, conveniently using a labeling method.

Protein based analysis, using an antibody that specifically binds to a polypeptide (e.g. marker), can be used to quantify the marker level in a test sample obtained from a subject. In various embodiments, an antibody that binds to a marker can be a monoclonal antibody. In various embodiments, an antibody that binds to a marker can be a polyclonal antibody. For multiplex analysis of markers, arrays containing one or more marker affinity reagents, e.g. antibodies can be generated. Such an array can be constructed comprising antibodies against markers. Detection can utilize one or a panel of marker affinity reagents, e.g. a panel or cocktail of affinity reagents specific for one, two, three, four, five, six, seven, eight, nine, ten, eleven, twelve, thirteen, fourteen, fifteen, sixteen, seventeen, eighteen, nineteen, twenty, twenty one, or more markers.

In various embodiments, the multiplex assay involves the use of oligonucleotide labeled antibody probes that bind to target biomarkers and allow for subsequent quantification of biomarkers. One example of a multiplex assay that involves oligonucleotide labeled antibody probes is the Proximity Extension Assay (PEA) technology (Olink Proteomics). Briefly, a pair of oligonucleotide labeled antibodies bind to a biomarker, wherein the two oligonucleotide sequences are complementary to one another. Thus, only when both antibodies bind to the target biomarker will the oligonucleotide sequences hybridize with one another. Mismatched oligonucleotide sequences (which occurs due to non-specific binding of antibodies or cross-reactivity of antibodies) will not hybridize and therefore, will not result in a readout. Hybridized oligonucleotide sequences undergo nucleic acid extension and amplification, followed by quantification using microfluidic qPCR. The quantified levels correlate to the quantitative expression values of the respective biomarkers.

In various embodiments, the multiplex assay involves the use of bead conjugated antibodies (e.g., capture antibodies) that enable the binding and detection of biomarkers. One example of a multiplex assay involving bead conjugated antibodies is Luminex's xMAP® Technology. Here, bead conjugated antibodies are added to the sample along with biotinylated detection antibodies. Both antibodies are specific to the biomarkers of interest and therefore, form an antibody-antigen sandwich. Streptavidin is further added, which binds to the biotinylated detection antibodies and enables detection of the complex. The Luminex 200™ or FlexMap® analyzer are employed to identify and quantify the amount of the biomarker in the sample. In various embodiments, the multiplex assay represents an improvement over Luminex's xMAP® technology, such as the Multi-Analyte Profile (MAP) technology by Myriad Rules Based Medicine (RBM), Inc.

In various embodiments, prior to implementation of a marker quantification assay 120 (e.g., an immunoassay), a sample obtained from a subject can be processed. In various embodiments, processing the sample enables the implementation of the marker quantification assay 120 to more accurately evaluate expression levels of one or more biomarkers in the sample.

In various embodiments, the sample from a subject can be processed to extract biomarkers from the sample. In one embodiment, the sample can undergo phase separation to separate the biomarkers from other portions of the sample. For example, the sample can undergo centrifugation (e.g., pelleting or density gradient centrifugation) to separate larger and/or more dense entities in the sample (e.g., cells and other macromolecules) from the biomarkers. Other examples include filtration (e.g., ultrafiltration) to phase separate the biomarkers from other portions of the sample.

In various embodiments, the sample from a subject can be processed to produce a sub-sample with a fraction of biomarkers that were in the sample. In various embodiments, producing a fraction of biomarkers can involve performing a protein fractionation procedure. One example of protein fractionation procedures include chromatography (e.g., gel filtration, ion exchange, hydrophobic chromatography, or affinity chromatography). In particular embodiments, the protein fractionation procedure involves affinity purification or immunoprecipitation where biomarkers are bound by specific antibodies. Such antibodies can be immobilized on a support, such as a magnetic particle or nanoparticle or a plate.

In various embodiments, the sample from the subject is processed to extract biomarkers from the sample and further processed to produce a sub-sample with a fraction of extracted biomarkers. Altogether, this enables a purified sub-sample of biomarkers that are of particular interest. Thus, implementing an assay (e.g., an immunoassay) for evaluating expression levels of the biomarkers of particular interest can be more accurate and of higher quality. In various embodiments, the biomarkers of particular can be biomarkers of a biomarker panel, embodiments of which are described herein. As an example, biomarkers of a biomarker panel can include two or more of: NEFL, MOG, CD6, CXCL9, OPG, OPN, CXCL13, GFAP, CDCP1, CCL20, IL-12B, APLP1, TNFRSF10A, COL4A1, SERPINA9, FLRT2, TNFSF13B, GH, VCAN, PRTG, and CNTN2.

VII. Therapeutic Agents and Compositions for Therapeutic Agents

In various embodiments, a therapeutic agent is provided to an individual prior to and/or subsequent to obtaining the sample from the individual and determining quantitative expression values of one or more markers in the obtained sample. As one example, a predictive model that receives the quantitative expression values predicts that an individual is to be diagnosed with multiple sclerosis and a therapeutic agent is to be provided. In another example, the predictive model predicts that a provided therapeutic agent is demonstrating therapeutic efficacy against a multiple in a previously diagnosed individual.

In various embodiments the therapeutic agent is a biologic, e.g. a cytokine, antibody, soluble cytokine receptor, anti-sense oligonucleotide, siRNA, etc. Such biologic agents encompass muteins and derivatives of the biological agent, which derivatives can include, for example, fusion proteins, PEGylated derivatives, cholesterol conjugated derivatives, and the like as known in the art. Also included are antagonists of cytokines and cytokine receptors, e.g. traps and monoclonal antagonists, e.g. IL-1Ra, IL-1 Trap, sIL-4Ra, etc. Also included are biosimilar or bioequivalent drugs to the active agents set forth herein.

Therapeutic agents for multiple sclerosis include corticosteroids, plasma exchange, ocrelizumab (Ocrevus®), IFN-β (Avonex®, Betaseron®, Rebif®, Extavia®, Plegridy®), Glatiramer acetate (Copaxone®, Glatopa®), anti-VLA4 (Tysabri, natalizumab), dimethyl fumarate (Tecfidera®, Vumerity®), teriflunomide (Aubagio®), monomethyl fumarate (Bafiertam™), ozanimod (Zeposia®), siponimod (Mayzent®), fingolimod (Gilenya®), anti-CD52 antibody (e.g., alemtuzumab (Lemtrada®), mitoxantrone (Novantrone®), methotrexate, cladribine (Mavenclad®, simvastatin, and cyclophosphamide. In addition or alternative to therapeutic agents, other treatments for multiple sclerosis include lifestyle changes such as physical therapy or a change in diet. The method also provide for combination therapy of one or more therapeutic agents and/or additional treatments, where the combination can provide for additive or synergistic benefits.

A pharmaceutical composition administered to an individual includes an active agent such as the therapeutic agent described above. The active ingredient is present in a therapeutically effective amount, i.e., an amount sufficient when administered to treat a disease or medical condition mediated thereby. The compositions can also include various other agents to enhance delivery and efficacy, e.g. to enhance delivery and stability of the active ingredients. Thus, for example, the compositions can also include, depending on the formulation desired, pharmaceutically-acceptable, non-toxic carriers or diluents, which are defined as vehicles commonly used to formulate pharmaceutical compositions for animal or human administration. The diluent is selected so as not to affect the biological activity of the combination. Examples of such diluents are distilled water, buffered water, physiological saline, PBS, Ringer's solution, dextrose solution, and Hank's solution. In addition, the pharmaceutical composition or formulation can include other carriers, adjuvants, or non-toxic, nontherapeutic, nonimmunogenic stabilizers, excipients and the like. The compositions can also include additional substances to approximate physiological conditions, such as pH adjusting and buffering agents, toxicity adjusting agents, wetting agents and detergents. The composition can also include any of a variety of stabilizing agents, such as an antioxidant.

The pharmaceutical compositions described herein can be administered in a variety of different ways. Examples include administering a composition containing a pharmaceutically acceptable carrier via oral, intranasal, rectal, topical, intraperitoneal, intravenous, intramuscular, subcutaneous, subdermal, transdermal, intrathecal, or intracranial method.

Such a pharmaceutical composition may be administered for prophylactic (e.g., before diagnosis of a patient with multiple sclerosis) or for treatment (e.g., after diagnosis of a patient with multiple sclerosis) purposes. Preventing, prophylaxis or prevention of a disease or disorder as used in the context of this invention refers to the administration of a composition to prevent the occurrence or onset of multiple sclerosis or some or all of the symptoms of multiple sclerosis or to lessen the likelihood of the onset of a disease or disorder. Treating, treatment, or therapy of multiple sclerosis shall mean slowing, stopping or reversing the disease's progression by administration of treatment according to the present invention. In the preferred embodiment, treating multiple sclerosis means reversing the disease's progression, ideally to the point of eliminating the disease itself.

VIII. Disease Activity in a Subject

Methods described herein focus on assessing disease activity in a subject by applying quantitative expression levels of biomarkers as input to a predictive model. In various embodiments, the subject is classified in a category based on the predicted assessment of the disease activity. To classify the subject, the prediction for the subject may be compared to results of individuals that have been previously classified in a clinically diagnosed category. For example, individuals may be clinically categorized in one of a diagnosis of MS (e.g., presence of MS), a categorization in a quiescent or exacerbated state, a categorization in a level of disability according to the expanded disability status scale (EDSS), an identified clinical response to a therapy, and a clinical identification of a risk of developing MS. Clinical categories can also be determined using any of a MS functional composite (MSFC), timed 25-foot walk (T25Fw), 9-hole peg test (9HPT), or PDDS/MSSS (patient-derived disability status scale). Individuals may be clinically categorized based on a measurable for MS disease activity, such as a particular number of gadolinium enhancing lesions (e.g., subtle disease activity) or the presence of at least one gadolinium enhancing lesion (e.g., general disease activity). Clinical categorization can also occur based on other radiographic measures including T2 lesions (new or enlarging), slowly expanding lesions, rim-expanding lesions, Brain Parenchymal Fraction (BPF) & percentage change, Gray matter fraction, White matter fraction, Thalamic volume, Cortical gray matter volume, Deep gray matter volume, or Radiologist notes of auxiliary features (e.g. Dawson's Fingers). Categorization of previously individuals may occur based on clinical standards.

Clinical diagnosis of MS can occur through various methods. As an example, a clinical diagnosis of MS can be made through magnetic resonance imaging (MRI) of the brain and spinal cord to identify lesions or plaques that form as a result of MS. The McDonald criteria can be employed in making the diagnosis. Clinical diagnosis of MS can also occur through a lumbar puncture (spinal tap) that observes abnormalities in antibody concentrations in the spinal fluid due to the presence of MS. Clinical diagnosis of MS can also occur through evoked potential tests, where electrical signals produced by neurons of the nervous system are recorded in response to a stimulus. An impaired transmission is indicative of the presence of MS.

Clinical categorization of a patient previously diagnosed with MS in a quiescent state versus an exacerbated state can depend on a variety of factors. Namely, a patient can be clinically categorized in an exacerbated state after presenting with a new disease that is related to MS (e.g., a comorbidity or symptom such as clinical depression or optic neuritis). As another example, a patient is clinically categorized in an exacerbated state if the patient presents with significant worsening of symptoms. Examples may include a worsening of balance and/or mobility, vision, pain in the eye, fatigue, and/or heart-related problems. Patients previously diagnosed with MS can be clinically categorized in a quiescent state if the patient does not present with a new disease or a change or worsening of symptoms.

Determination that a patient previously diagnosed with MS is responding to a therapy can be dependent on a variety of clinical variables. For example, a response to therapy can be determined based on the occurrence or lack of a relapse. A patient can be deemed responsive to a therapy if relapses do not occur. A response to therapy can also be determined based on a total number of relapses, a time to a first relapse, the patient's EDSS score, a change in the patient's EDSS score (e.g., an increase in the score corresponds to a lack of response to therapy), a change in MRI status (e.g., the development of additional lesions or plaques corresponds to a lack of response to therapy).

Patients can be clinically categorized in a level of disability, which can be a measure of disease progression. For example, the EDSS can be used to determine a severity of MS in a patient. Therefore, patients are categorized in categories that correspond to an EDSS score between 1.0 and 10.0 in 0.5 point intervals. Generally, EDSS scores of 1.0 to 4.5 refer to patients with MS who are able to walk without any aid. EDSS scores of 5.0 to 9.5 refer to patients with MS whose ability to walk is impaired, with a higher score corresponding to a higher degree of impairment.

IX. Computer Implementation

The methods of the invention, including the methods of assessing multiple sclerosis activity in an individual, are, in some embodiments, performed on one or more computers.

For example, the building and deployment of a predictive model and database storage can be implemented in hardware or software, or a combination of both. In one embodiment of the invention, a machine-readable storage medium is provided, the medium comprising a data storage material encoded with machine readable data which, when using a machine programmed with instructions for using said data, is capable of displaying any of the datasets and execution and results of a predictive model of this invention. Such data can be used for a variety of purposes, such as patient monitoring, treatment considerations, and the like. The invention can be implemented in computer programs executing on programmable computers, comprising a processor, a data storage system (including volatile and non-volatile memory and/or storage elements), a graphics adapter, a pointing device, a network adapter, at least one input device, and at least one output device. A display is coupled to the graphics adapter. Program code is applied to input data to perform the functions described above and generate output information. The output information is applied to one or more output devices, in known fashion. The computer can be, for example, a personal computer, microcomputer, or workstation of conventional design.

Each program can be implemented in a high level procedural or object oriented programming language to communicate with a computer system. However, the programs can be implemented in assembly or machine language, if desired. In any case, the language can be a compiled or interpreted language. Each such computer program is preferably stored on a storage media or device (e.g., ROM or magnetic diskette) readable by a general or special purpose programmable computer, for configuring and operating the computer when the storage media or device is read by the computer to perform the procedures described herein. The system can also be considered to be implemented as a computer-readable storage medium, configured with a computer program, where the storage medium so configured causes a computer to operate in a specific and predefined manner to perform the functions described herein.

The signature patterns and databases thereof can be provided in a variety of media to facilitate their use. "Media" refers to a manufacture that contains the signature pattern information of the present invention. The databases of the present invention can be recorded on computer readable media, e.g. any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; and hybrids of these categories such as magnetic/optical storage media. One of skill in the art can readily appreciate how any of the presently known computer readable mediums can be used to create a manufacture comprising a recording of the present database information. "Recorded" refers to a process for storing information on computer readable medium, using any such methods as known in the art. Any convenient data storage structure can be chosen, based on the means used to access the stored information. A variety of data processor programs and formats can be used for storage, e.g. word processing text file, database format, etc.

In some embodiments, the methods of the invention, including the methods of assessing multiple sclerosis activity in an individual, are performed on one or more computers in a distributed computing system environment (e.g., in a cloud computing environment). In this description, "cloud computing" is defined as a model for enabling on-demand network access to a shared set of configurable computing resources. Cloud computing can be employed to offer on-demand access to the shared set of configurable computing resources. The shared set of configurable computing resources can be rapidly provisioned via virtualization and released with low management effort or service provider interaction, and then scaled accordingly. A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

VIII.A. Example Computer

Figure 8:
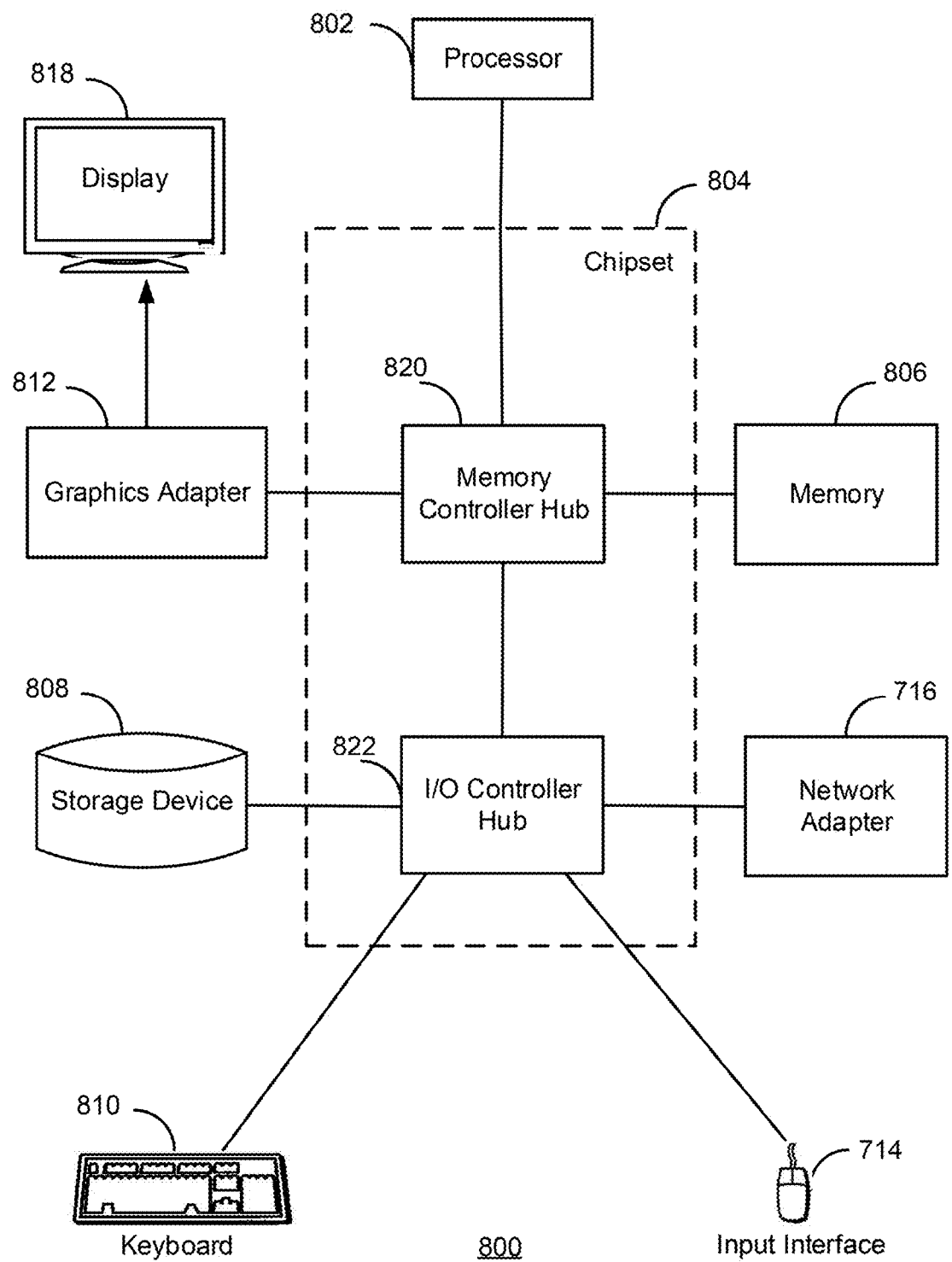
FIG. 8 illustrates an example computer for implementing the entities shown in FIGS. 1A, 1B, and 1C.

FIG. 8 illustrates an example computer 800 for implementing the entities shown in FIGS. 1 and 3. The computer 800 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, an input device 814, and network adapter 816 are coupled to the I/O controller hub 822. Other embodiments of the computer 800 have different architectures.

The storage device 808 is a non-transitory computer-readable storage medium such as a hard drive, compact disk read-only memory (CD-ROM), DVD, or a solid-state memory device. The memory 806 holds instructions and data used by the processor 802. The input interface 814 is a touch-screen interface, a mouse, track ball, or other type of pointing device, a keyboard, or some combination thereof, and is used to input data into the computer 800. In some embodiments, the computer 800 may be configured to receive input (e.g., commands) from the input interface 814 via gestures from the user. The graphics adapter 812 displays images and other information on the display 818. The network adapter 816 couples the computer 800 to one or more computer networks.

The computer 800 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 808, loaded into the memory 806, and executed by the processor 802.

The types of computers 800 used by the entities of FIG. 1 can vary depending upon the embodiment and the processing power required by the entity. For example, the activity prediction system 130 can run in a single computer 800 or multiple computers 800 communicating with each other through a network such as in a server farm. The computers 800 can lack some of the components described above, such as graphics adapters 812, and displays 818.

X. Kit Implementation

Also disclosed herein are kits for assessing disease activity (e.g., multiple sclerosis activity) in an individual. Such kits can include reagents for detecting expression levels of one or biomarkers and instructions for assessing disease activity based on the detected expression levels.

The detection reagents can be provided as part of a kit. Thus, the invention further provides kits for detecting the presence of a panel of biomarkers of interest in a biological test sample. A kit can comprise a set of reagents for generating a dataset via at least one protein detection assay (e.g., immunoassay) that analyzes the test sample from the subject. In various embodiments, the set of reagents enable detection of quantitative expression levels of biomarkers from any one of Tables 8-10. In particular embodiments, the set of reagents enable detection of quantitative expression levels of biomarkers categorized as Tier A, Tier B, or Tier C biomarkers in Table 1. In particular embodiments, the set of reagents enable detection of quantitative expression levels of biomarkers categorized as Tier 1, Tier 2, or Tier 3 biomarkers in Table 2. In certain aspects, the reagents include one or more antibodies that bind to one or more of the markers. The antibodies may be monoclonal antibodies or polyclonal antibodies. In some aspects, the reagents can include reagents for performing ELISA including buffers and detection agents.

A kit can include instructions for use of a set of reagents. For example, a kit can include instructions for performing at least one biomarker detection assay such as an immunoassay, a protein-binding assay, an antibody-based assay, an antigen-binding protein-based assay, a protein-based array, an enzyme-linked immunosorbent assay (ELISA), flow cytometry, a protein array, a blot, a Western blot, nephelometry, turbidimetry, chromatography, mass spectrometry, enzymatic activity, proximity extension assay, and an immunoassay selected from RIA, immunofluorescence, immunochemiluminescence, immunoelectrochemiluminescence, immunoelectrophoretic, a competitive immunoassay, and immunoprecipitation.

In various embodiments, the kits include instructions for practicing the methods disclosed herein (e.g., methods for training or deploying a predictive model to predict an assessment of disease activity). These instructions can be present in the subject kits in a variety of forms, one or more of which can be present in the kit. One form in which these instructions can be present is as printed information on a suitable medium or substrate, e.g., a piece or pieces of paper on which the information is printed, in the packaging of the kit, in a package insert, etc. Yet another means would be a computer readable medium, e.g., diskette, CD, hard-drive, network data storage, etc., on which the information has been recorded. Yet another means that can be present is a website address which can be used via the internet to access the information at a removed site. Any convenient means can be present in the kits.

XI. Systems

Further disclosed herein are system for analyzing quantitative expression levels of biomarkers for assessing disease activity. In various embodiments, such a system can include a set of reagents for detecting expression levels of biomarkers in the biomarker panel, an apparatus configured to receive a mixture of the set of reagents and a test sample obtained from a subject to measure the expression levels of the soluble mediators, and a computer system communicatively coupled to the apparatus to obtain the measured expression levels and to implement the predictive model to assess the disease activity.

The set of reagents enable the detection of quantitative expression levels of the biomarkers in the biomarker panel. In various embodiments, the set of reagents involve reagents used to perform an assay, such as an assay or immunoassay as described above. For example, the reagents include one or more antibodies that bind to one or more of the biomarkers. The antibodies may be monoclonal antibodies or polyclonal antibodies. As another example, the reagents can include reagents for performing ELISA including buffers and detection agents.

The apparatus is configured to detect expression levels of biomarkers in a mixture of a reagent and test sample. For example, the apparatus can determine quantitative expression levels of biomarkers through an immunologic assay or assay for nucleic acid detection. The mixture of the reagent and test sample may be presented to the apparatus through various conduits, examples of which include wells of a well plate (e.g., 96 well plate), a vial, a tube, and integrated fluidic circuits. As such, the apparatus may have an opening (e.g., a slot, a cavity, an opening, a sliding tray) that can receive the container including the reagent test sample mixture and perform a reading to generate quantitative expression values of biomarkers. Examples of an apparatus include a plate reader (e.g., a luminescent plate reader, absorbance plate reader, fluorescence plate reader), a spectrometer, and a spectrophotometer.

The computer system, such as example computer 800 described in FIG. 8, communicates with the apparatus to receive the quantitative expression values of biomarkers. The computer system implements, in silico, a predictive model to analyze the quantitative expression values of the biomarkers to predict an assessment of the disease activity.

EXAMPLES

Below are examples of specific embodiments for carrying out the present invention. The examples are offered for illustrative purposes only and are not intended to limit the scope of the present invention in any way. Efforts have been made to ensure accuracy with respect to numbers used (e.g., amounts, temperatures, etc.), but some experimental error and deviation should be allowed for.

Example 1: Human Clinical Studies

Multiple human clinical studies were used for the development of this biomarker panel including: ACP=Accelerated Cure Project (study code: F2), CLIMB=Comprehensive Longitudinal Investigation of Multiple Sclerosis at Brigham and Women's Hospital (study code: F3A, F3B, F3C, and F4), EPIC=Expression, Proteomics, Imaging, Clinical at UCSF (study code: F5), and UHBC=University Hospital Basel Cohort (study code: F6). ACP (n=124) focuses on clinically-defined exacerbation events and AIM1 (n=60) and F4 Unpaired (n=326) focus on annualized relapse rate (ARR). AIM3 Unpaired (n=58), F4 Unpaired (n=326) and F5 EPIC (n=180) focus on the cross-sectional perspective of the Gadolinium (Gd) enhanced MRI lesion endpoint, while AIM3 Paired (n=58), F4 Paired (n=196), and F6 (n=205) do the same through a longitudinal analysis (e.g., consider patient pairs to establish a baseline normal). Additionally, in some scenarios, samples from different studies with the same end point were combined to conduct biomarker analyses. For example, study code F4 and study code F5, with a common endpoint of presence or absence of Gadolinium enhancing lesion, were combined to conduct biomarker analyses. For each of the three broad categories, each sample was given equal weighting across the 7 study paradigms (i.e. studies with more samples had more weight proportionally). The study codes and other information for the analyses are documented below in Tables 8A and 8B. Altogether, over 1300 proteins across more than 1000 individual samples were screened using 2 immunoassay platforms (Rules Based Medicine (RBM) and Olink biomarker panel). Multiple endpoints were investigated including presence/absence of gadolinium enhancing lesions, clinical relapse status, EDSS, annualized relapse rate, and T2 volume.

Example 2: Univariate Analysis

Three different statistical measures were calculated for univariate analysis of individual biomarkers.
1) Univariate population—p-values from standard statistical tests
   P-values were converted back to their t-statistic using the conventional inverse norm function, and then Stauffer's method was used to combine the statistics based on their respective sample sizes. The final p-value/test-statistic reflecting the cumulative power was then normalized to be on a scale of [0,1].
2) Univariate separation—AUC values from integration across the true positive rate and false positive rate on the ROC curve
   AUC's were computed for each individual marker on the selected dataset. They were then normalized to a scale of [0,1] and then the weighted sum of them (based on the sample sizes below) was used to convert the cumulative separation power into a single value between 0 and 1.
3) Univariate regression—adjusted r-squared values from OLS between lesion burden—clipped at an upper lesion count (e.g., 5 lesions) to exclude outliers—and the distribution of normalized protein expression values This was conducted on each cohort independently, in addition to the blended cohorts in a train/test split.

Example 3: Multivariate Analysis

The following was conducted for multivariate biomarker analysis:
1) Multivariate biomarker ranking—the accuracy-weighted aggregated importance across millions of simulated support vector machines, logistic regression, random forest, linear discriminant analysis, and stochastic gradient descent models of various feature sizes were combined). Hyperparameter-tuning (e.g. regularization or choice of numerical solver technique) was exhausted in a grid search. Forward selection multivariate model building was simulated through many thousands of times to then add up in aggregate the biomarkers that were most commonly selected on different cross-validated slicings of the dataset. Forward selection iteratively incorporated features according to an optimization metric (e.g. AUC, F1 in classification and Adj-R 2, RMSE in regression). Since multiple data cohorts are involved, the importance of each study was weighted by sample size and rank Gd as the primary endpoint to then finalize the spatially constrained 21-plex. Next, certain features were sequentially removed, wherein after removing the features, the remaining features still have predictive power for each endpoint/study. Cross-validation and bootstrapping was used to reduce overfitting. A test holdout set was used when possible.
2) Bivariate (2-feature) models to investigate improvement of orthogonal signal
3) Interacting terms (product, ratio, quadratic terms)

To ensure replicability of results:
The models were trained on the CLIMB dataset and tested on the EPIC dataset (before/after batch normalization and demographic adjustment)
Paired Samples (Baseline-Normalized Signal) between AIM3 and F4

Example 4: Univariate APLP1 Biomarker Anlaysis for Predicting Multiple Sclerosis Disease Activity Univariate analysis of APLP1 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.509 | 0.530 | 0.668 | 0.549 | 0.543 | 0.659 | 0.567 |
| P-value | 0.426 | 0.479 | 0.041 | 0.067 | 0.243 | 4.10E−4 | 0.006 |
| R-squared | NA | NA | 0.069 | 0.005 | 0.001 | 0.002 | 2.80E−04 |

Example 5: Univariate CCL20 Biomarker Anlaysis for Predicting Multiple Sclerosis Disease Activity Univariate analysis of CCL20 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.612 | 0.526 | 0.613 | 0.620 | 0.660 | 0.653 | 0.522 |
| P-value | 0.028 | 0.212 | 0.053 | 2.60E−4 | 0.004 | 0.002 | 0.131 |
| R-squared | NA | NA | 0.061 | 0.044 | 0.094 | 0.003 | 0.003 |

Example 6: Univariate CD6 Biomarker Anlaysis for Predicting Multiple Sclerosis Disease Activity Univariate analysis of CD6 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.502 | 0.760 | 0.581 | 0.559 | 0.675 | 0.663 | 0.507 |
| P-value | 0.459 | 2.00E−4 | 0.218 | 0.061 | 0.001 | 2.91E−4 | 0.394 |
| R-squared | NA | NA | 0.057 | 0.005 | 0.140 | 4.45E−4 | 0.003 |

Example 7: Univariate CDCP1 Biomarker Anlaysis for Predicting Multiple Sclerosis Disease Activity Univariate analysis of CDCP1 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.634 | 0.563 | 0.513 | 0.622 | 0.607 | 0.545 | 0.528 |
| P-value | 0.008 | 0.130 | 0.281 | 1.40E−4 | 0.012 | 0.253 | 0.086 |
| R-squared | NA | NA | 0.036 | 4.13E−2 | 8.82E−2 | 0.002 | 0.004 |

Example 8: Univariate CNTN2 Biomarker Anlaysis for Predicting Multiple Sclerosis Disease Activity Univariate analysis of CNTN2 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.505 | 0.645 | 0.622 | 0.533 | 0.590 | 0.537 | 0.501 |
| P-value | 0.416 | 0.020 | 0.247 | 0.131 | 0.061 | 0.326 | 0.266 |
| R-squared | NA | NA | 0.035 | 5.40E−3 | 4.39E−2 | 0.002 | 0.001 |

Example 9: Univariate COL4A1 Biomarker Anlaysis for Predicting Multiple Sclerosis Disease Activity Univariate analysis of COL4A1 was conducted across the 5 different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.565 | 0.679 | 0.544 | 0.523 | 0.628 | 0.505 | 0.516 |
| P-value | 0.137 | 0.002 | 0.196 | 0.187 | 0.008 | 0.259 | 0.269 |
| R-squared | NA | NA | 0.001 | 2.84E−3 | 6.95E−3 | 2.61E−4 | 0.002 |

Example 10: Univariate CXCL9 Biomarker Anlaysis for Predicting Multiple Sclerosis Disease Activity Univariate analysis of CXCL9 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.508 | 0.591 | 0.763 | 0.627 | 0.651 | 0.595 | 0.526 |
| P-value | 0.186 | 0.123 | 0.018 | 2.50E−4 | 0.003 | 0.019 | 0.182 |
| R-squared | NA | NA | 0.349 | 0.003 | 0.005 | 4.56E−5 | 0.001 |

Example 11: Univariate FLRT2 Biomarker Anlaysis for Predicting Multiple Sclerosis Disease Activity Univariate analysis of CDCP1 was conducted across the 40 different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.633 | 0.668 | 0.528 | 0.506 | 0.550 | 0.744 | 0.569 |
| P-value | 0.003 | 0.004 | 0.356 | 0.495 | 0.269 | 4.00E−7 | 0.047 |
| R-squared | NA | NA | 0.051 | 0.001 | 8.24E−3 | 0.008 | 2.22E−4 |

Example 12: Univariate Growth Hormone Biomarker Anlaysis for Predicting Multiple Sclerosis Disease Activity Univariate analysis of Growth Hormone (GH) was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.649 | 0.602 | 0.594 | 0.535 | 0.532 | 0.578 | 0.507 |
| P-value | 0.002 | 0.052 | 0.335 | 0.152 | 0.294 | 0.076 | 0.342 |
| R-squared | NA | NA | 0.001 | 0.002 | 2.46E−3 | 0.014 | 0.004 |

Example 13: Univariate IFI30 Biomarker Anlaysis for Predicting Multiple Sclerosis Disease Activity Univariate analysis of IFI30 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.520 | 0.507 | 0.600 | 0.618 | 0.550 | 0.658 | 0.519 |
| P-value | 0.141 | 0.493 | 0.206 | 0.001 | 0.197 | 0.002 | 0.247 |
| R-squared | NA | NA | 0.028 | 0.017 | 0.000 | 3.56E−04 | 0.002 |

Example 15: Univariate MOG Biomarker Anlaysis for Predicting Multiple Sclerosis Disease Activity Univariate analysis of MOG was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.530 | 0.636 | 0.572 | 0.589 | 0.604 | 0.738 | 0.620 |
| P-value | 0.300 | 0.036 | 0.090 | 0.005 | 0.080 | 4.61E−07 | 1.45E−04 |
| R-squared | NA | NA | 0.056 | 0.031 | 0.062 | 0.048 | 0.022 |

Example 16: Univariate NEFL Biomarker Anlaysis for Predicting Multiple Sclerosis Disease Activity Univariate analysis of NEFL was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.717 | 0.611 | 0.876 | 0.746 | 0.859 | 0.834 | 0.759 |
| P-value | 2.51E−05 | 0.0316 | 1.80E−04 | 6.06E−15 | 4.84E−09 | 7.46E−12 | 1.47E−16 |
| R-squared | NA | NA | 0.415 | 0.189 | 0.321 | 0.213 | 0.147 |

Example 17: Univariate OPG Biomarker Anlaysis for Predicting Multiple Sclerosis Disease Activity Univariate analysis of OPG was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.509 | 0.517 | 0.531 | 0.604 | 0.638 | 0.632 | 0.514 |
| P-value | 0.494 | 0.373 | 0.432 | 0.005 | 0.012 | 0.004 | 0.269 |
| R-squared | NA | NA | 0.001 | 0.012 | 0.072 | 0.001 | 0.001 |

Example 18: Univariate OPN Biomarker Anlaysis for Predicting Multiple Sclerosis Disease Activity Univariate analysis of OPN was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.509 | 0.500 | 0.512 | 0.549 | 0.598 | 0.603 | 0.557 |
| P-value | 0.446 | 0.454 | 0.149 | 0.082 | 0.060 | 0.018 | 0.012 |
| R-squared | NA | NA | 2.97E−05 | 3.84E−03 | 0.003 | 0.001 | 0.003 |

Example 19: Univariate PRTG Biomarker Anlaysis for Predicting Multiple Sclerosis Disease Activity Univariate analysis of PRTG was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.619 | 0.664 | 0.617 | 0.542 | 0.628 | 0.630 | 0.512 |
| P-value | 0.021 | 0.031 | 0.102 | 0.079 | 0.013 | 0.006 | 0.487 |
| R-squared | NA | NA | 0.099 | 0.002 | 0.032 | 0.005 | 0.001 |

Example 20: Univariate SERPINA9 Biomarker Anlaysis for Predicting Multiple Sclerosis Disease Activity Univariate analysis of SERPINA9 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.603 | 0.689 | 0.667 | 0.558 | 0.608 | 0.535 | 0.525 |
| P-value | 0.002 | 0.031 | 0.059 | 0.013 | 0.115 | 0.180 | 0.079 |
| R-squared | NA | NA | 0.082 | 0.006 | 0.075 | 0.002 | 0.002 |

Example 21: Univariate TNFRSF10A Biomarker Anlaysis for Predicting Multiple Sclerosis Disease Activity Univariate analysis of TNFRSF10A was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.587 | 0.542 | 0.688 | 0.582 | 0.667 | 0.545 | 0.545 |
| P-value | 0.036 | 0.305 | 0.058 | 0.006 | 0.002 | 0.296 | 0.024 |
| R-squared | NA | NA | 0.040 | 0.001 | 0.033 | 0.002 | 4.42E−04 |

Example 22: Univariate VCAN Biomarker Anlaysis for Predicting Multiple Sclerosis Disease Activity Univariate analysis of VCAN was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.511 | 0.562 | 0.637 | 0.549 | 0.623 | 0.658 | 0.567 |
| P-value | 0.421 | 0.085 | 0.027 | 0.061 | 0.034 | 0.002 | 0.014 |
| R-squared | NA | NA | 0.055 | 0.001 | 0.006 | 0.003 | 3.63E−04 |

Example 23: Univariate CHI3L1 Biomarker Anlaysis for Predicting Multiple Sclerosis Disease Activity Univariate analysis of CHI3L1 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.501 | 0.641 | 0.606 | 0.575 | 0.564 | 0.528 | 0.533 |
| P-value | 0.409 | 0.029 | 0.091 | 0.027 | 0.131 | 0.324 | 0.117 |
| R-squared | NA | NA | 0.083 | 0.005 | 0.008 | 0.001 | 0.001 |

Example 24: Univariate CXCL13 Biomarker Anlaysis for Predicting Multiple Sclerosis Disease Activity Univariate analysis of CXCL13 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.506 | 0.502 | 0.539 | 0.527 | 0.511 | 0.656 | 0.538 |
| P-value | 0.311 | 0.496 | 0.486 | 0.245 | 0.234 | 0.002 | 0.215 |
| R-squared | NA | NA | 0.002 | 1.82E−04 | 2.24E−03 | 0.035 | 0.004 |

Example 25: Univariate Growth Hormone 2 Biomarker Anlaysis for Predicting Multiple Sclerosis Disease Activity Univariate analysis of Growth Hormone 2 (GH2) was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.582 | 0.502 | 0.694 | 0.560 | 0.703 | 0.521 | 0.530 |
| P-value | 0.018 | 0.469 | 0.087 | 0.093 | 0.003 | 0.239 | 0.165 |
| R-squared | NA | NA | 0.166 | 0.011 | 0.061 | 0.023 | 0.011 |

Example 26: Univariate IL-12B Biomarker Anlaysis for Predicting Multiple Sclerosis Disease Activity Univariate analysis of IL-12B was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.506 | 0.548 | 0.519 | 0.526 | 0.607 | 0.562 | 0.506 |
| P-value | 0.495 | 0.281 | 0.389 | 0.047 | 0.021 | 0.113 | 0.208 |
| R-squared | NA | NA | 0.024 | 0.048 | 0.168 | 1.75E−04 | 0.008 |

Example 27: Univariate IL18 Biomarker Anlaysis for Predicting Multiple Sclerosis Disease Activity Univariate analysis of IL18 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.643 | 0.592 | 0.519 | 0.569 | 0.616 | 0.548 | 0.520 |
| P-value | 0.004 | 0.077 | 0.219 | 0.014 | 0.038 | 0.168 | 0.237 |
| R-squared | NA | NA | 0.041 | 0.020 | 0.068 | 2.70E−06 | 0.001 |

Example 28: Univariate MMP-2 Biomarker Anlaysis for Predicting Multiple Sclerosis Disease Activity Univariate analysis of MMP-2 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.561 | 0.617 | 0.547 | 0.504 | 0.513 | 0.702 | 0.564 |
| P-value | 0.087 | 0.035 | 0.412 | 0.319 | 0.399 | 3.21E−05 | 0.025 |
| R-squared | NA | NA | 0.036 | 1.07E−04 | 4.16E−04 | 0.004 | 0.002 |

Example 29: Univariate MMP-9 Biomarker Anlaysis for Predicting Multiple Sclerosis Disease Activity Univariate analysis of MMP-9 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.503 | 0.623 | 0.618 | 0.508 | 0.561 | 0.721 | 0.550 |
| P-value | 0.461 | 0.027 | 0.043 | 0.434 | 0.083 | 9.30E−07 | 0.034 |
| R-squared | NA | NA | 0.087 | 0.004 | 0.037 | 0.007 | 0.001 |

Example 30: Univariate VCAM-1 Biomarker Anlaysis for Predicting Multiple Sclerosis Disease Activity Univariate analysis of VCAM-1 was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Unpaired (n = 326) | F4 Paired (n = 196) | F5 EPIC (n = 180) | F4 + F5 (Gd. Endpoint) (n = 506) |
|---|---|---|---|---|---|---|---|
| AUC | 0.637 | 0.556 | 0.600 | 0.524 | 0.589 | 0.544 | 0.546 |
| P-value | 0.001 | 0.208 | 0.261 | 0.257 | 0.106 | 1.23E-01 | 0.064 |
| R-squared | NA | NA | 0.063 | 9.04E-05 | 0.001 | 1.20E-05 | 0.001 |

Example 31: Univariate TNFSF13B Biomarker Anlaysis for Predicting Multiple Sclerosis Disease Activity Univariate analysis of TNFSF13B was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Un-paired (n = 326) | F4 Paired (n = 196) | F5 EPIC (n = 180) | F4 + F5 (Gd. Endpoint) (n = 506) |
|---|---|---|---|---|---|---|---|
| AUC | 0.587 | 0.504 | 0.618 | 0.524 | 0.582 | 0.599 | 0.516 |
| P-value | 0.131 | 0.426 | 0.126 | 0.106 | 0.086 | 0.051 | 0.429 |
| R-squared | NA | NA | 0.149 | 0.05 | 0.075 | 0.006 | 7.98E-03 |

Example 32: Univariate GFAP Biomarker Anlaysis for Predicting Multiple Sclerosis Disease Activity Univariate analysis of GFAP was conducted across the different human clinical studies according to the methods described in Example 2. The statistical measures of the univariate analysis (p-value, area under the curve (AUC) and correlation values (R-squared)) are shown below.

| Study | ACP (n = 124) | AIM1 (n = 60) | AIM3 Paired (n = 58) | F4 Un-paired (n = 326) | F4 Paired (n = 196) | F5 EPIC (n = 180) | F4 + F5 (Gd. Endpoint) (n = 506) |
|---|---|---|---|---|---|---|---|
| AUC | NA | NA | NA | 0.558 | 0.541 | 0.646 | 0.633 |
| P-value | NA | NA | NA | 0.069 | 0.073 | 0.112 | 0.044 |
| R-squared | NA | NA | NA | 0.025 | 0.003 | 0.039 | 0.008 |

Example 33: Univariate Biomarker Anlaysis for Predicting Different Types of Multiple Sclerosis Disease Activity Univariate analysis of various biomarkers was conducted across the different human clinical studies according to the methods described in Example 2. Statistical p-values and $R^2$ values are shown for each of the individual biomarkers in relation to the different MS disease activity endpoints.

| Protein Biomarker | Gad presence p-value (n = 155) | EDSS $R^2$ (n = 205) | Relapse p-value (n = 205) | ARR p-value (n = 144) | T2-weighted Volume $R^2$ (n = 128) |
|---|---|---|---|---|---|
| APLP1 | 0.228 | 3.40E-04 | 0.084 | 0.937 | 0.012 |
| CCL20 | 0.326 | 0.038 | 0.107 | 0.609 | 0.038 |
| CD6 | 0.012 | 0.001 | 0.463 | 0.511 | 0.001 |
| CDCP1 | 0.010 | 0.087 | 0.306 | 0.046 | 2.22E-03 |
| CNTN2 | 0.050 | 0.006 | 0.514 | 0.141 | 0.022 |
| COL4A1 | 0.248 | 0.006 | 0.250 | 0.208 | 0.007 |
| CXCL13 | 0.699 | 0.008 | 0.093 | 0.750 | 4.36E-04 |
| CXCL9 | 0.010 | 0.017 | 0.028 | 0.001 | 0.026 |
| FLRT2 | 0.292 | 0.003 | 0.435 | 0.825 | 0.007 |
| GFAP | 0.582 | 0.161 | 0.221 | 0.453 | 0.122 |
| GH | 0.197 | 1.30E-03 | 0.665 | 0.381 | 0.019 |
| IL-12B | 0.007 | 0.007 | 0.068 | 0.238 | 0.014 |
| MOG | 0.646 | 4.03E-04 | 0.062 | 0.599 | 0.025 |
| NEFL | 0.001 | 0.090 | 2.50E-05 | 0.042 | 0.125 |
| OPG | 0.652 | 0.152 | 0.612 | 0.634 | 0.044 |
| OPN | 0.178 | 0.046 | 0.086 | 0.436 | 0.044 |
| PRTG | 0.236 | 0.004 | 0.400 | 0.272 | 2.22E-03 |
| SERPINA9 | 0.081 | 0.010 | 0.936 | 0.076 | 8.75E-04 |
| TNFRSF10A | 0.348 | 0.033 | 0.984 | 0.012 | 0.016 |
| TNFSF13B | 7.63E-05 | 0.038 | 0.335 | 0.816 | 0.018 |
| VCAN | 0.198 | 0.043 | 0.045 | 0.911 | 0.018 |

Example 34: Model Training and Validation—Baseline Normalization Shifts

A linear regression model (L2 Ridge Regularization) was trained to predict baseline-normalization shifts of Gd Analysis on two different populations (F4 and F6). Here, the model was trained to classify sample pairs with and without a Gd-enhancing MRI lesion that manifests relative to a baseline (both serum drawn in proximity to MRI).

A logistic regression classification algorithm was applied to positive versus negative shifts in Gd count. Since the predictors are shifts in biomarker protein levels (from a baseline sample without Gd activity in corresponding MRI), no demographic correction is necessary since intra-patient variation is accounted for. The dataset was split into training and 5-fold cross validation sets and the parameters of the model have been hypertuned to optimize the model; all biomarkers from the custom assay panel (Tiers 1, 2, and 3 in Table 2 below) were included as features in the model. The Area under the Receiver-Operating Characteristic Curve (AUROC) resulting from the 5-fold cross validation for classifying Gd shifts is 0.958+/−0.034.

Figure 2A:
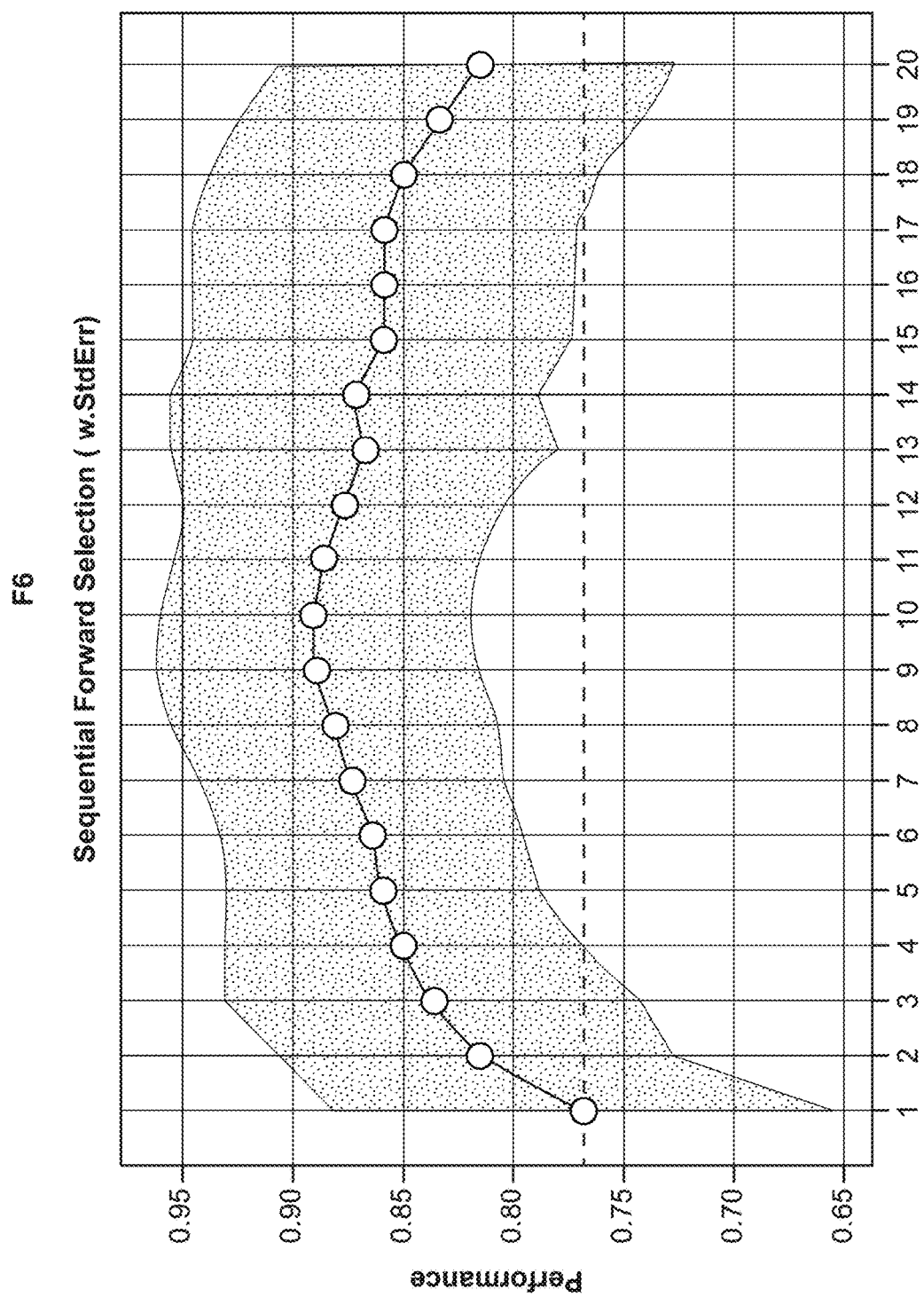
FIG. 2A depicts the sequential forward selection of features using samples from the F6 study.
Figure 2B:
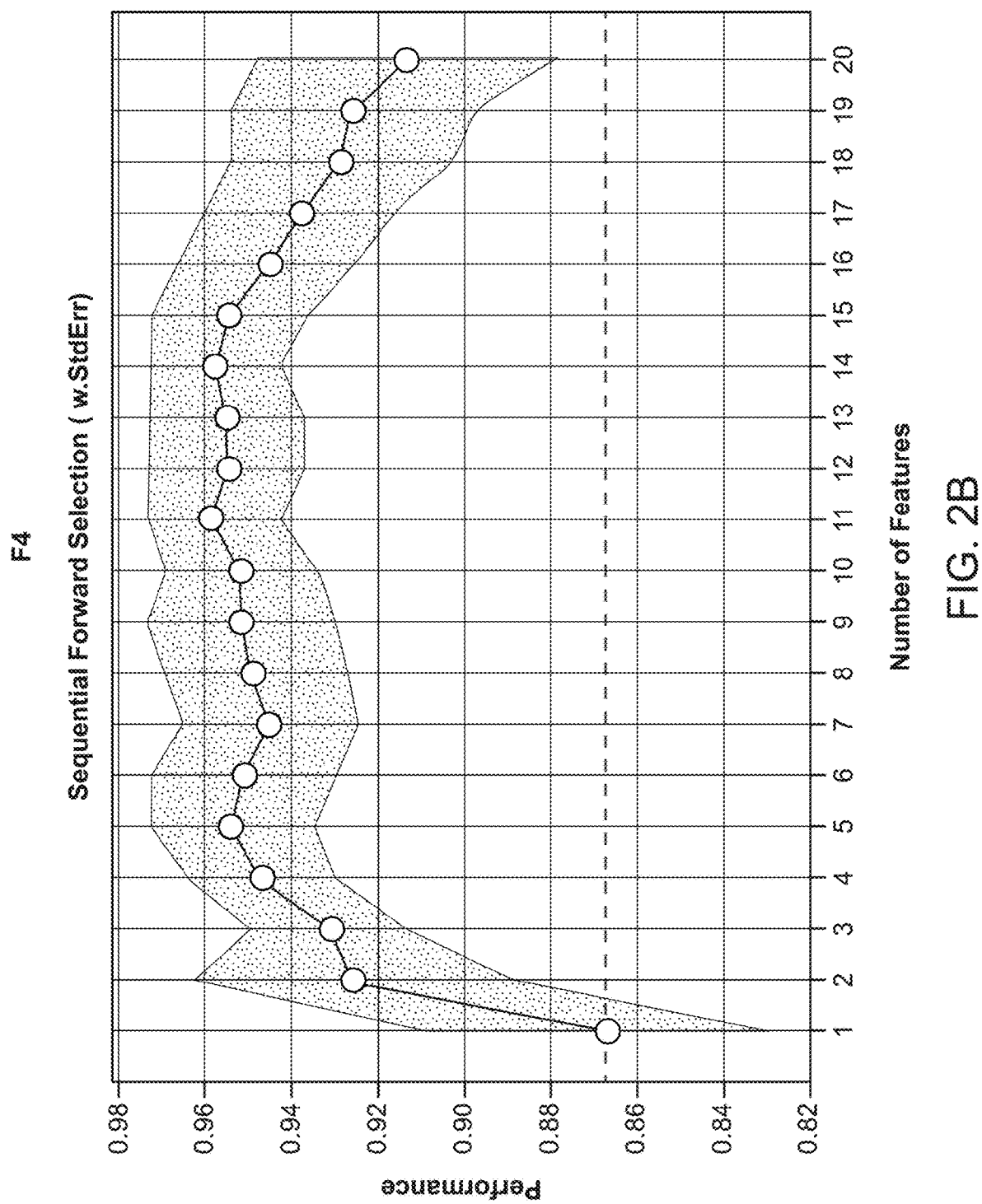
FIG. 2B depicts the sequential forward selection of features using samples from the F4 study.

FIG. 2A and FIG. 2B depict sequential forward selection performance profiles for the F6 and F4 study, respectively.

Figure 3A:
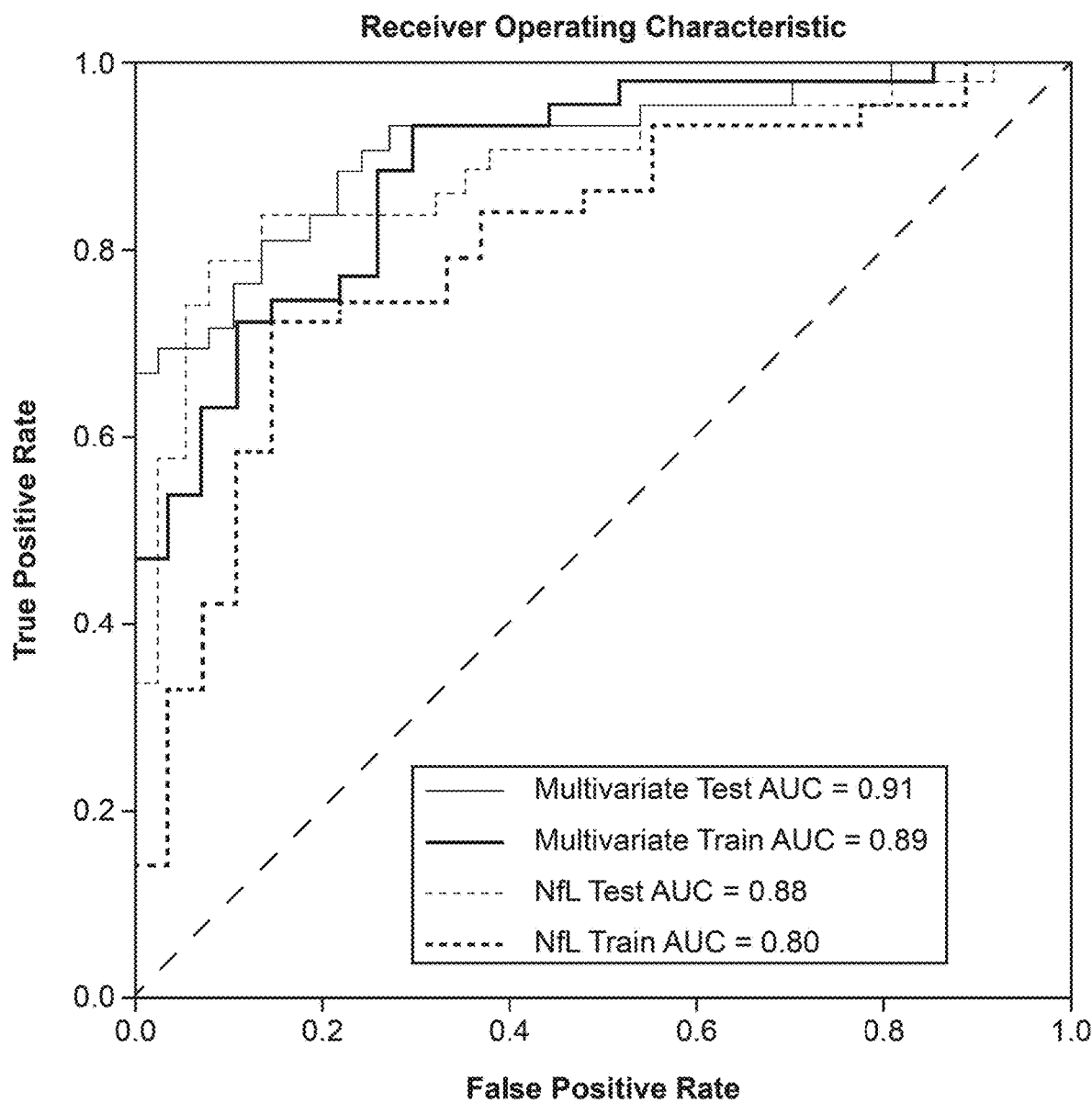
FIG. 3A depicts the ROC curve for a multivariate model (train and test) in comparison to a univariate model using neurofilament light as the single feature.
Figure 3B:
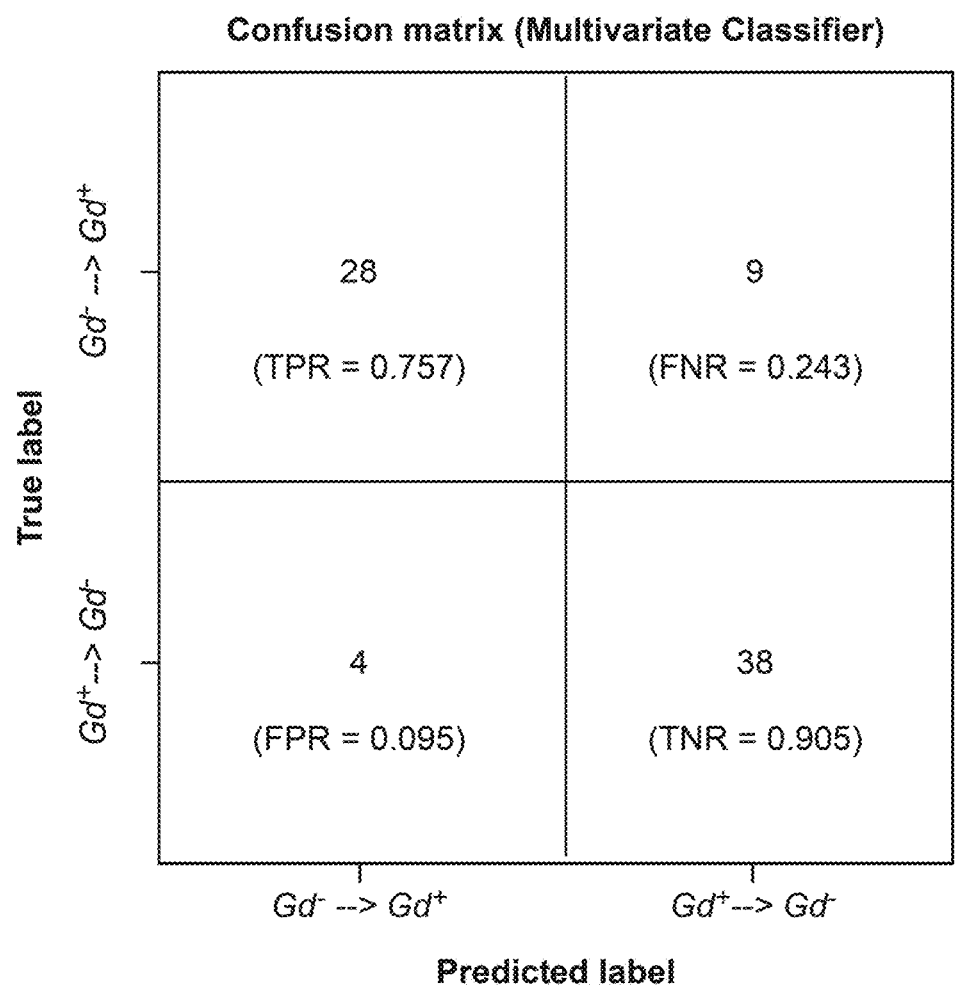
FIG. 3B depicts a confusion matrix for the multivariate model.

Next, an independent Train/Test Holdout of a 4-feature Model was trained and tested. Here, a logistic regression (L1 regularization) model was trained on F6 data and tested on F4 data. The model feature space is restricted to the top 4 features from the analysis. A logistic regression classification algorithm was applied to positive versus negative shifts in Gd count. Since the predictors are shifts in biomarker protein levels (from a baseline without Gd activity), no demographic correction is necessary since intra-patient variation is accounted for. Bridge normalization was applied to the dataset, using an overlapping set of samples that were re-run, to utilize the same model coefficients for both the training and test sets. The parameters of the model were hypertuned to optimize the model; all biomarkers from the custom assay panel have been included as features in the model. This analysis was done to assess the multivariate predictive performance (relative to the univariate performance of serum Neurofilament Light Chain, or sNfL), which is shown in FIG. 3A. The model exhibited a performance of AUROC: 0.91 (sNfL—0.88), Accuracy: 0.84 (sNfL—0.77), Sensitivity: 0.76 (sNfL—0.70), Specificity: 0.91 (sNfL—0.83), and Youden's Statistic=0.67 (sNfL—0.53). FIG. 3B depicts the corresponding confusion matrix of the multivariate classifier, which establishes the high true positive rate (TPR)=0.757 and high true negative rate (TNR)=0.905.

Figure 4A:
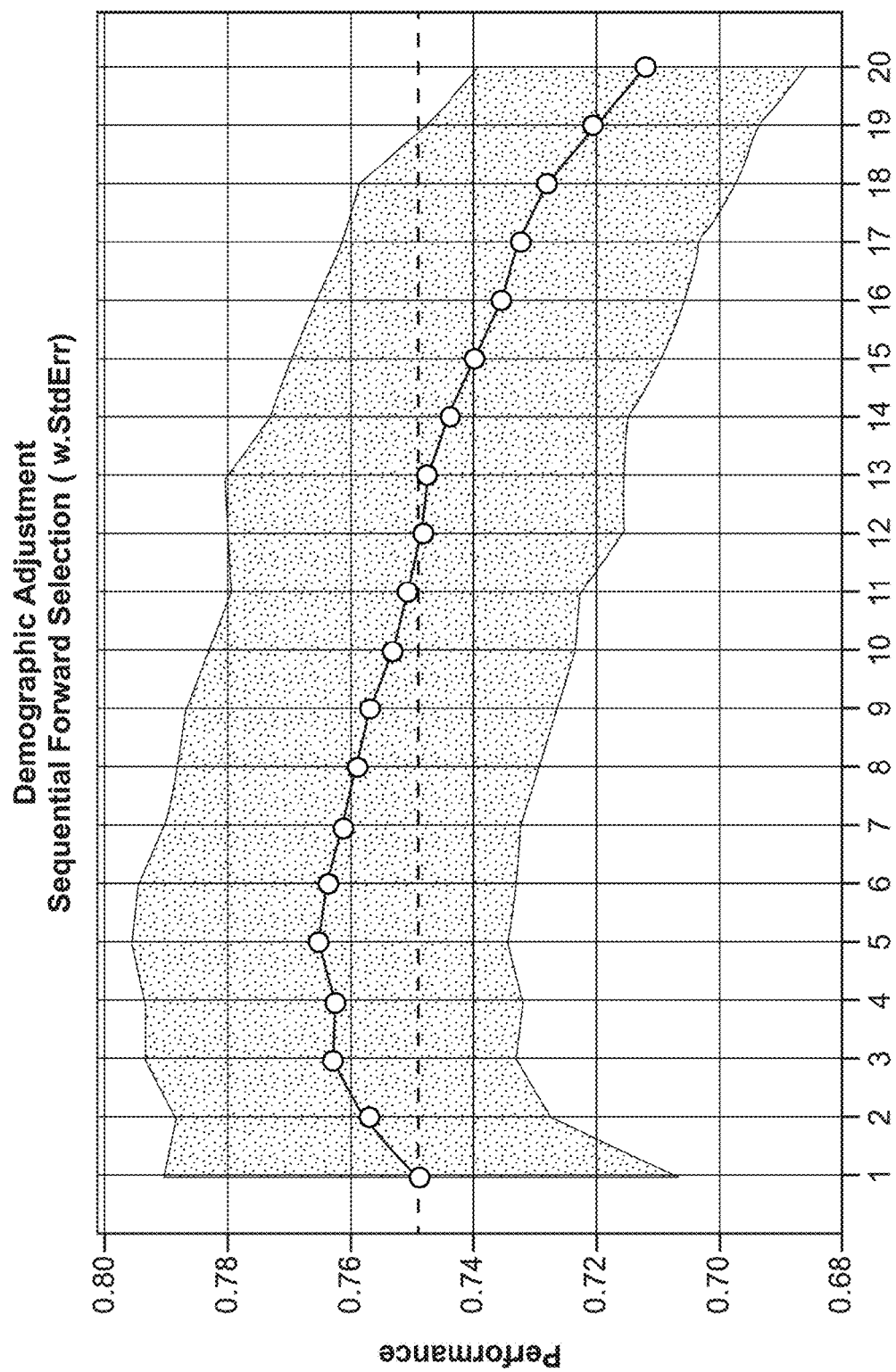
FIG. 4A depicts the sequential forward selection of biomarkers for the cross-sectional classification of the presence/absence of radiographically-defined disease activity.

Example 35: Model Training and Validation—Cross-Sectional Classification of Presence/Absence of Disease A logistic regression model (L1 regularization) was trained to predict presence/absence of disease based on Gd count. Specifically, the model was trained to predict either: subtle disease (corresponds to having or not 1 lesion per MRI), general disease (corresponds to having or not having a lesion), and extreme disease (corresponds to having or not having more than three lesions. The model was built using 321 samples from F4, 180 samples from F5, and 155 samples from F6. FIG. 4A depicts the sequential forward selection performance profile.

To build the models, bridge normalization and demographic correction were applied to the dataset resulting from merging the three studies. The dataset has been split into training and 5-fold cross validation sets and the parameters of the model were hypertuned to optimize the model; all biomarkers from the custom assay panel have been included as features in the model. FIG. 4B depicts the ROC curves for the three models. Specifically, the AUROC resulting from the 5-fold cross validation is 0.741±0.017 for the subtle model; 0.785±0.004 for the general model and 0.903±0.009 for the extreme model.

Figure 4C:
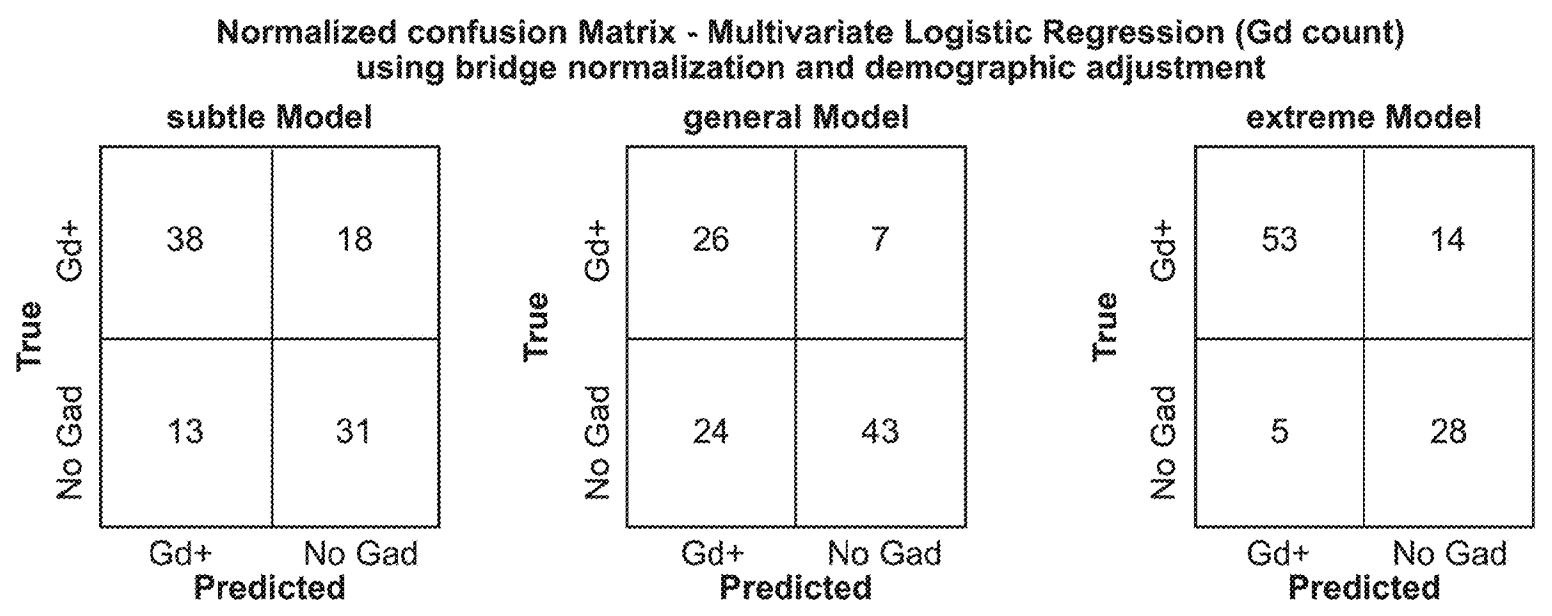

Furthermore, FIG. 4C depicts the normalized confusion matrix for each model. Gd+ classification comparison is shown below using 1) univariate NFL model, 2) multivariate model including NFL, and 3) multivariate model excluding NFL.

| | Gd + Classification Comparison | | | |
|---|---|---|---|---|
| | Subtle (AUROC) | General (AUROC) | Extreme (AUROC) | Regression ($R^2$) |
| Univariate NFL | 0.697 ± 0.085 | 0.791 ± 0.046 | 0.890 ± 0.037 | 0.251 ± 0.020 |
| Multivariate Model (best features) | 0.732 ± 0.079 | 0.821 ± 0.037 | 0.914 ± 0.052 | 0.279 ± 0.022 |
| Multivariate Model (without NFL) | 0.701 ± 0.055 | 0.645 ± 0.075 | 0.734 ± 0.130 | 0.071 ± 0.018 |

Figure 4D:
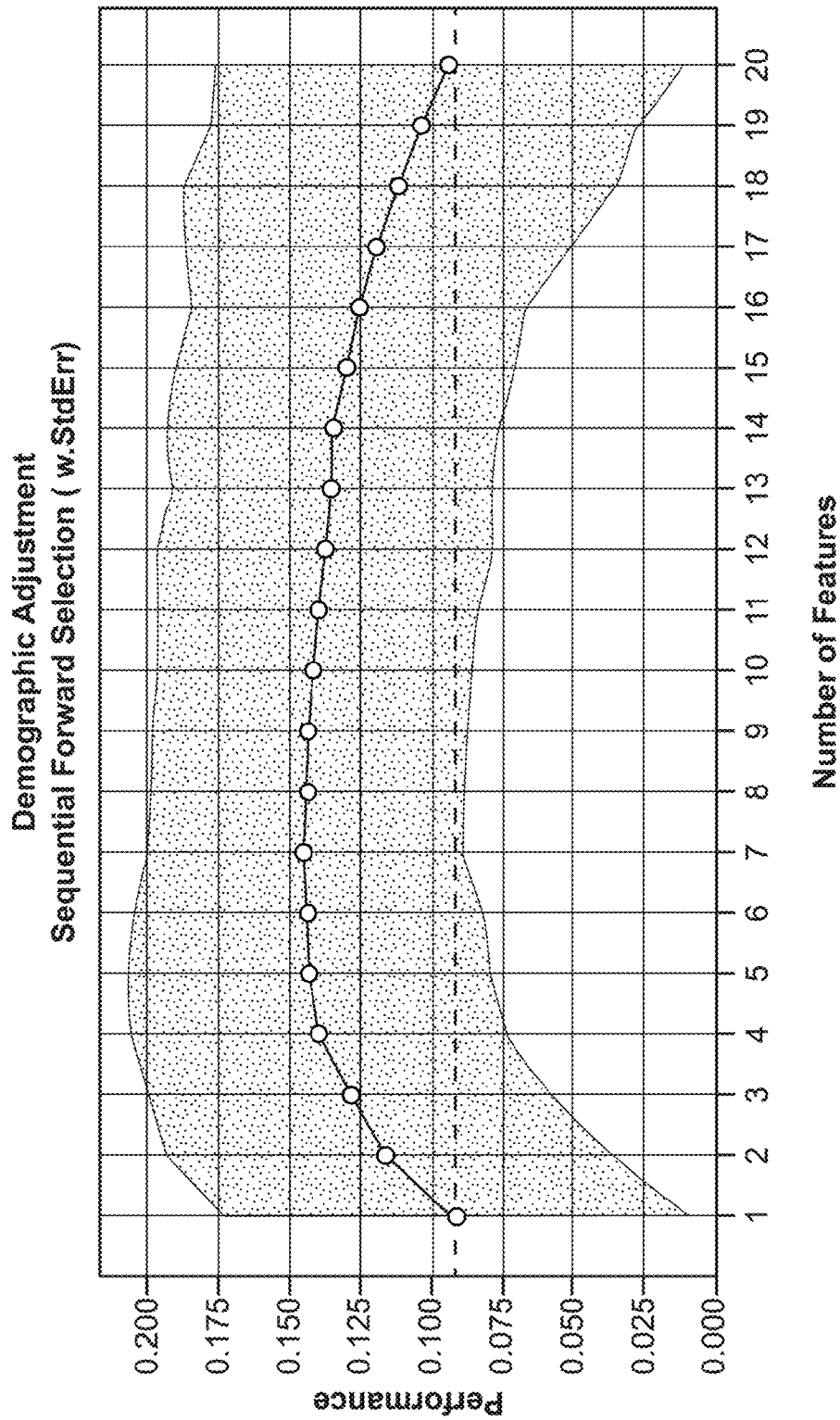
FIG. 4D depicts the sequential forward selection of biomarkers for predicting the disease severity according to a predicted number of lesions.

Example 36: Model Training and Validation—Predicting Severity of Disease by Predicting the Number of Lesions A linear regression model (L2 regularization) was trained and tested using 321 samples from F4, 180 samples from F5, and 155 samples from F6. A Ridge regression algorithm was applied to the Gd count. Bridge normalization and demographic correction was applied to the dataset resulting from merging the three studies. The dataset was split into training and 5-fold cross validation sets; all biomarkers from the custom assay panel have been included as features in the model and a forward fitting procedure has been applied to estimate which combination of features results in a higher model performance. FIG. 4D depicts the sequential forward selection of features. A corresponding best regression plot of predicted vs. actual Gd lesion count (i.e. proxy for MS disease activity burden in this analysis) was generated. The best performance, based on $R^2$ is obtained using 7 features (NEFL, MOG, CDCP1, OPG, APLP1 and COL4A1): 0.219±0.050. Looking into the Spearman r score, the best model is obtained from 4 features (NEFL, CDCP1, APLP1 and TNFSF13B), obtaining a Spearman r score of 0.496±0.038.

Figure 5A:
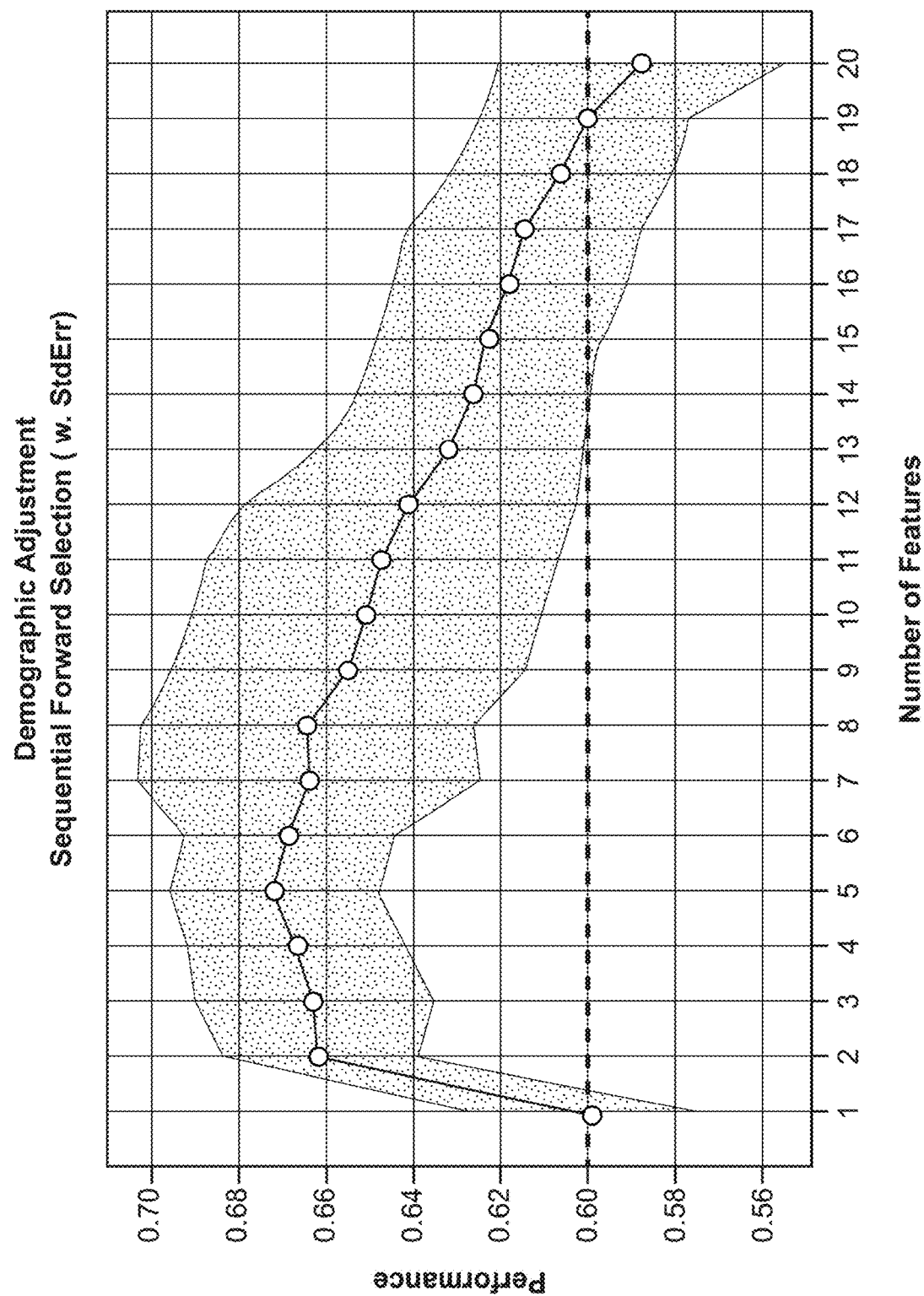
FIG. 5A depicts the sequential forward selection of features for building a model for predicting annualized relapse rate (ARR).
Figure 5B:
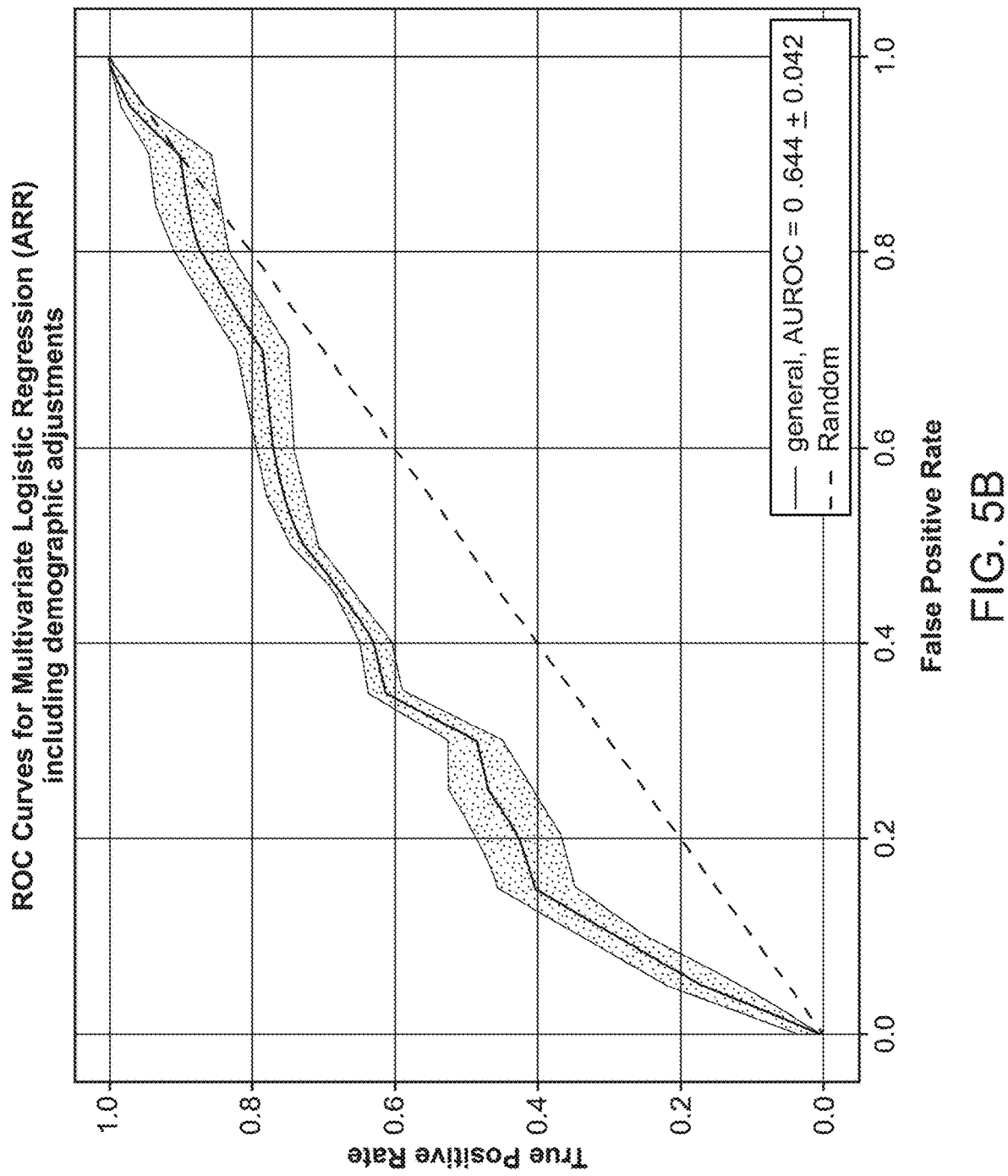
FIG. 5B depicts the ROC curve of the trained model for predicting annualized relapse rate as HIGH ($>=0.8$) or LOW ($<0.3$).

Example 37: Model Training and Validation—Predicting Annualized Relapse Rate A logistic regression model (Elasticnet 0.2) was trained and tested on 282 samples with 161 LOW samples <0.3 ARR and 121 HIGH samples >0.8 ARR. FIG. 5A depicts the sequential forward selection of features. Applying a logistic regression classification algorithm, after forward fitting the features and hypertuning the parameters, the best model exhibits an AUROC of 0.672+/−0.053 with the following 5 features: NEFL, MOG, CDCP1, IL-12B, and TNFRSF10A. FIG. 5B depicts a ROC curve for predicting ARR.

Example 38: Model Training and Validation—Predicting Clinically-Defined Relapse A logistic regression model was built using LBFGS solver with L2 regularization (C=1.0) and balanced class weight. Relapse status is set by a clinically defined criterion in the ACP study ("Exacerbated" vs. "Quiescent") and in F6 by whether the patient has had a relapse within 90 days of the blood draw. Because there are no bridging samples between ACP and F6, two independent analyses of the two studies were performed. The NPX values from both studies were demographically corrected and the studies in F6 that were taken more than 30 days from the MRI were dropped (for consistency with the Gd studies).

Figure 6A:
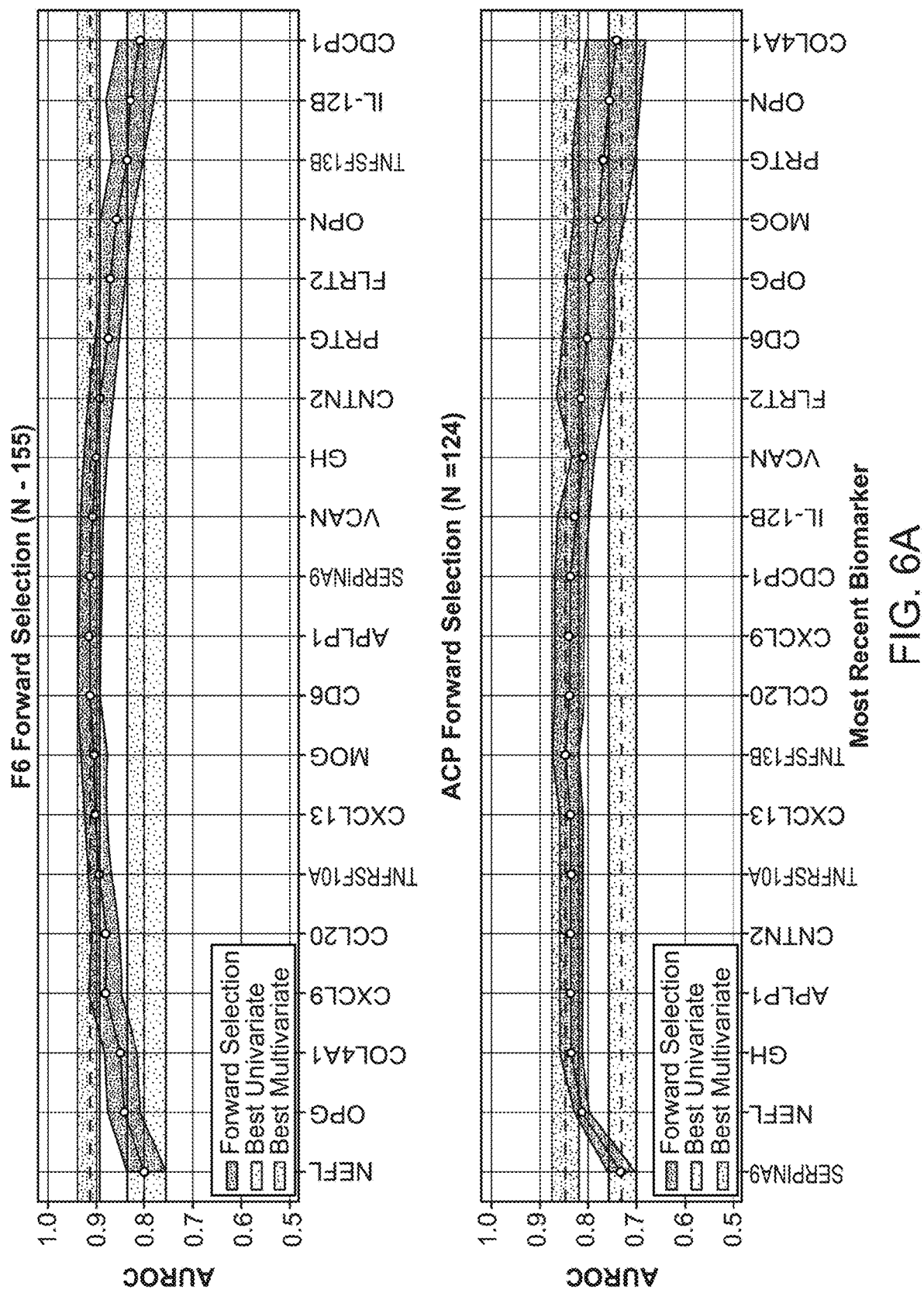
FIG. 6A depicts the sequential forward selection of features for building a model for classifying exacerbation versus quiescent disease state on two separate patient cohorts.
Figure 6B:
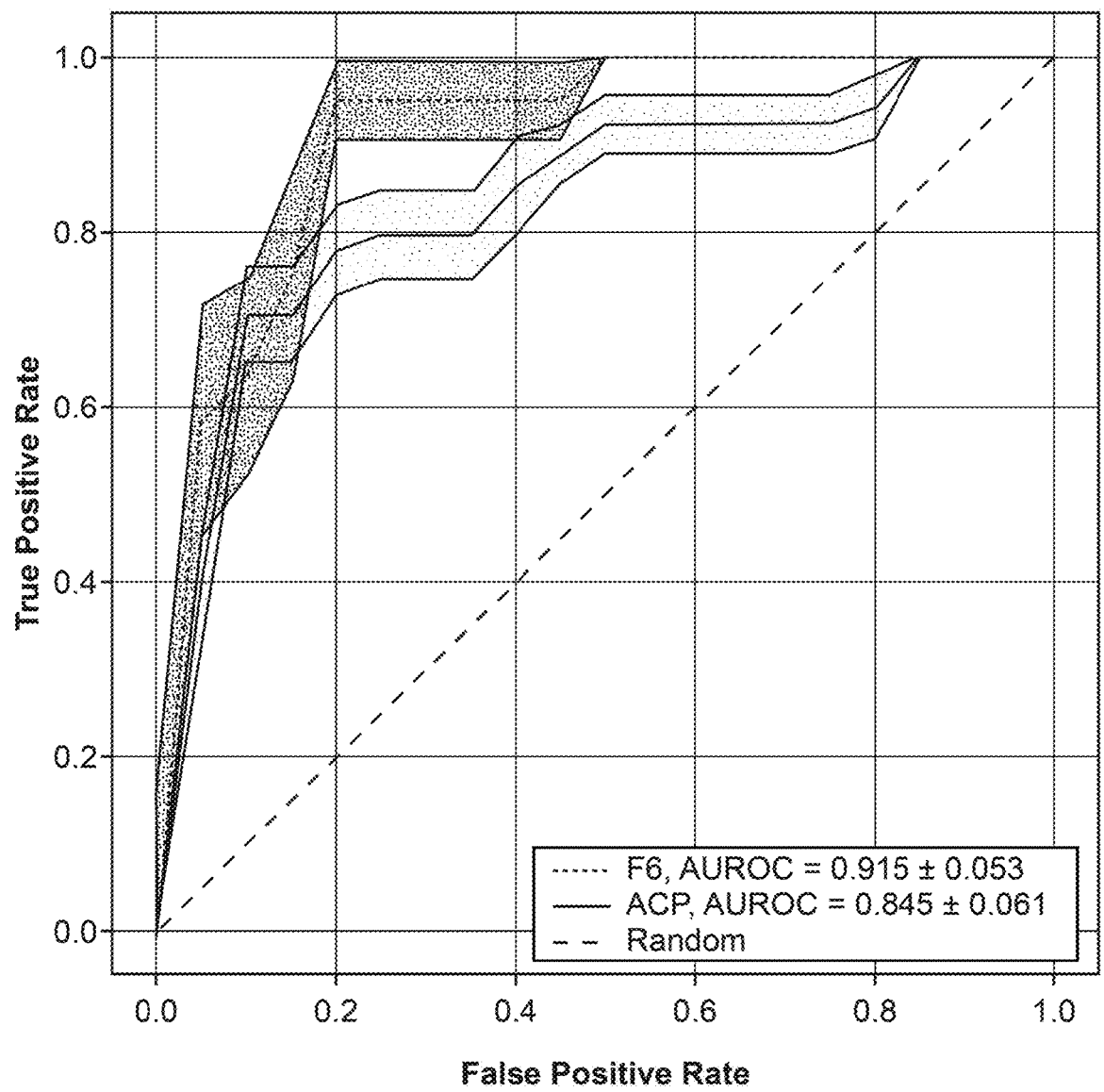
FIG. 6B depicts the ROC curves for trained models for predicting clinically-defined disease as exacerbation v. quiescent.

FIG. 6A depicts the sequential forward selection of features using the F6 study (n=155, 136 patients with no relapses, 19 with relapses in the previous 90 days) and ACP study (n=124, 64 Quiescent MS samples, 60 Exacerbation MS samples). New features are added cumulatively to the total as the plot moves from left to right. FIG. 6B depicts the performance of the respective models. Specifically, the model trained on the F6 study exhibited a AUROC of 0.915±0.053 and the model trained on the ACP study exhibited a AUROC of 0.845±0.061.

Example 39: Model Training and Validation—Predicting Disease Progression

Figure 7:
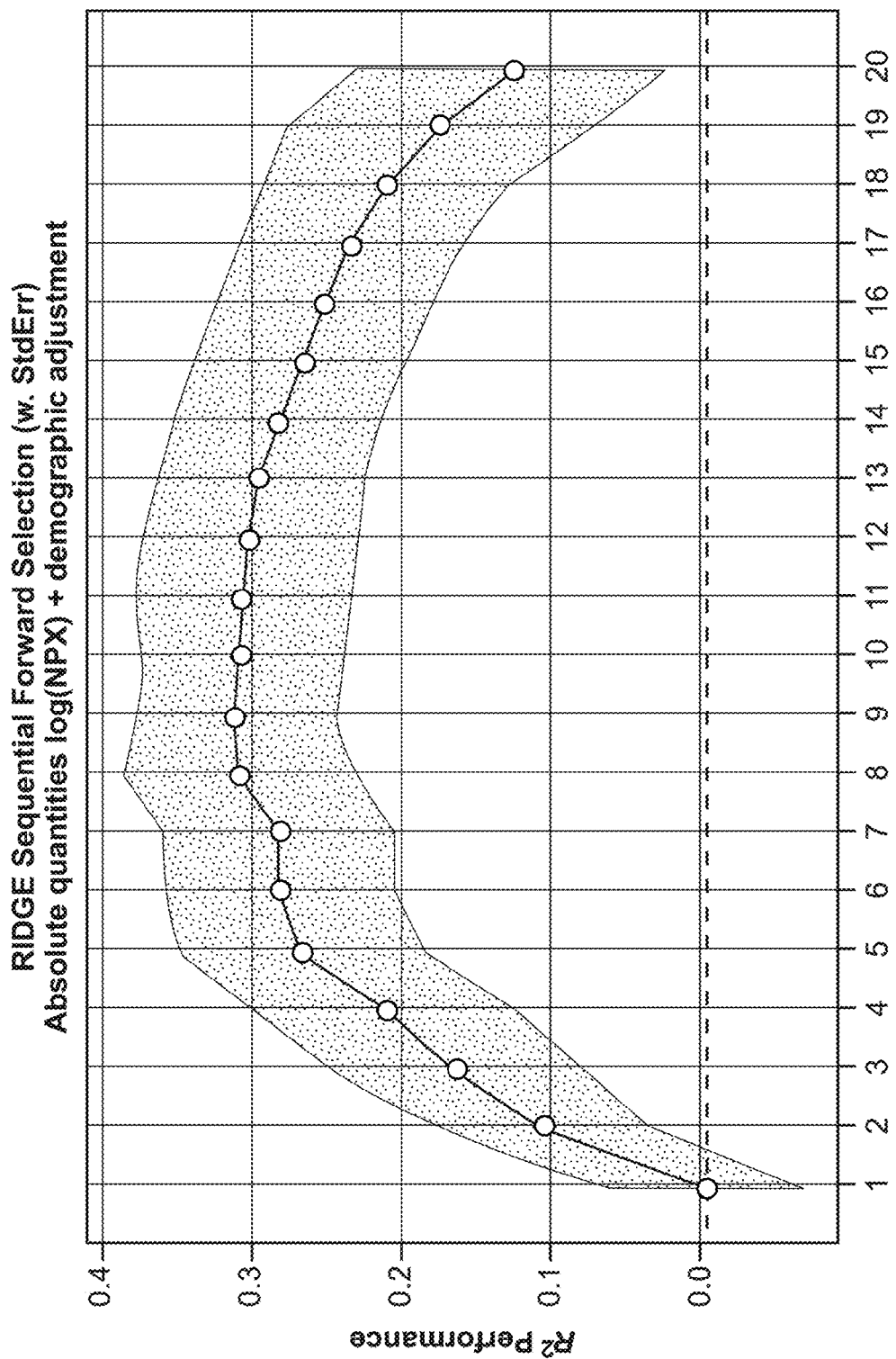
FIG. 7 depicts the sequential forward selection of features on absolute quantitation data according to the expanded disability status scale (EDSS).

FIG. 7 depicts the sequential forward selection of features on absolute quantitation data according to the expanded disability status scale (EDSS). Here, biomarkers and their absolute quantitation measurements for 163 samples where all data is available were considered. Samples were from the F6 (University of Basel) study cohort. For each protein, the serum measurements were directly correlated to the respective endpoint (EDSS, T2-weighted lesion volume). Only serum draws which fell within 30 days of MRI were considered for the radiographic endpoint (i.e. T2-weighted lesion volume). A 5-fold cross-validation was used to train and test a logistic model (L2 regularization) and evaluate the performance. The optimization metric used was $R^2$ (square of the Pearson's R correlation) and standardized coefficients are shown. Values below show the EDSS $R^2$ for different biomarkers. Of note, raw serum GFAP correlates to EDSS with a $R^2$ value of 0.201 and raw serum OPG correlates to EDSS with a $R^2$ value of 0.204.

| Biomarker | EDSS $R^2$ | T2-weighted Volume $R^2$ |
|---|---|---|
| APLP1 | 0.000227 | 0.037332 |
| CCL20 | 0.041031 | 0.091351 |
| CD6 | 0.004626 | 0.07696 |
| CDCP1 | 0.03931 | 0.001367 |
| CNTN2 | 0.001594 | 0.023916 |
| COL4A1 | 0.00246 | 0.011448 |
| CXCL13 | 0.02188 | 0.053104 |
| CXCL9 | 0.019516 | 0.113253 |
| FLRT2 | 0.00237 | 0.042253 |
| GFAP | 0.201107 | 0.176669 |
| GH | 0.001453 | 0.005613 |
| IL12B | 0.004874 | 0.000005 |
| MOG | 0.001258 | 0.016593 |
| NEFL | 0.054577 | 0.077404 |
| OPG | 0.204099 | 0.081336 |
| OPN | 0.052497 | 0.055554 |
| PRTG | 0.00736 | 0.001347 |
| SERPINA9 | 0.015369 | 0.000716 |
| TNFRSF10A | 0.038961 | 0.026022 |
| TNFSF13B | 0.046195 | 0.063893 |
| VCAN | 0.043875 | 0.030339 |

The values shown below represent absolute quantitation (log-transform of pg/mL) vs. the relative quantitation (normalized protein expression, or NPX) data for the n=205 samples in the F6 Basel cohort. AvN1 represents the Pearson's $R^2$ value corresponding to the correlation between the absolute quantitation and the NPX values measured on the exploratory panels to guide initial research and development. N2vN1 represents the same metric between the relative NPX underlying the absolute quantitation (before a standard curve is fit to map the values to concentrations) and the exploratory panel NPX measured before. *GFAP does not have a corresponding relative quantitation measurement since no exploratory assay existed at the time. This example serves to show that quantitative information from the markers on the panel, regardless of the source format, may be used to predict MS disease activity

| Biomarker | AvN1 $R^2$ | N2vN1 $R^2$ |
|---|---|---|
| APLP1 | 0.616 | 0.618 |
| CCL20 | 0.950 | 0.951 |
| CD6 | 0.792 | 0.793 |
| CDCP1 | 0.847 | 0.525 |
| CNTN2 | 0.751 | 0.751 |
| COL4A1 | 0.537 | 0.538 |
| CXCL13 | 0.811 | 0.811 |
| CXCL9 | 0.915 | 0.916 |
| FLRT2 | 0.349 | 0.346 |
| GFAP | 0.999 | N/A |
| GH | 0.909 | 0.915 |
| IL12B | 0.786 | 0.788 |
| MOG | 0.802 | 0.802 |
| NEFL | 0.808 | 0.813 |
| OPG | 0.718 | 0.718 |
| OPN | 0.713 | 0.710 |
| PRTG | 0.479 | 0.478 |
| SERPINA9 | 0.885 | 0.892 |
| TNFRSF10A | 0.695 | 0.695 |
| TNFSF13B | 0.733 | 0.732 |
| VCAN | 0.398 | 0.398 |

Example 40: Multivariate Biomarker Panel for Predicting Multiple Sclerosis Disease Activity (Tier A, Tier B, Tier C Biomarkers)

Biomarkers were selected for a multivariate custom panel according to their correlation with the various endpoints (e.g., subtle disease (e.g., between 0 and 1 Gd enhancing lesion), general disease (e.g., between 0 and at least 1 Gd enhancing lesion), annualized relapse rate, and exacerbation v. quiescent).

Multivariate analyses of biomarker panels were conducted across the different human clinical studies according to the methods described in Example 3. In particular biomarkers were categorized into different tiers (e.g., Tier A, Tier B, and Tier C). Biomarker panels were constructed from one or more tiers (e.g., Tier A alone, tier B alone, tier C alone, tiers A+B, or tiers A+B+C). The 21 total biomarkers evaluated through this multivariate example are:

TABLE 1

21 biomarker panel grouped in tiers A, B, and C.

| Tier | Biomarker Name | Biomarker Symbol | Accession Number (Uniprot Database) |
|---|---|---|---|
| A | Neurofilament Light Polypeptide Chain | NEFL | P07196 |
| A | Myelin Oligodendrocyte Glycoprotein | MOG | Q16653 |
| A | Cluster of Differentiation 6 | CD6 | P30203 |
| A | Chemokine (C-X-C motif) ligand 9 | CXCL9 | Q07325 |
| A | Osteoprotegerin | OPG | O00300 |
| A | Osteopontin | OPN | P10451 |
| A | Matrix Metallopeptidase 9 | MMP-9 | P14780 |
| A | Glial Fibrillary Acidic Protein | GFAP | O43155 |
| B | CUB domain-containing protein 1 | CDCP1 | Q9H5V8 |
| B | C-C Motif Chemokine Ligand 20 | CCL20/ MIP 3-α | P78556 |
| B | Interleukin-12 subunit beta | IL-12B | P29460 |
| B | Amyloid Beta Precursor Like Protein 1 | APLP1 | P51693 |
| B | Tumor Necrosis Factor Receptor Superfamily Member 10A | TNFRSF10A | O00220 |
| B | Collagen, type IV, alpha 1 | COL4A1 | P02462 |
| B | Serpin Family A Member 9 | SERPINA9 | Q86WD7 |
| B | Fibronectin Leucine Rich Transmembrane Protein 2 | FLRT2 | O43155 |
| B | Chemokine (C-X-C motif) ligand 13 | CXCL13 | O43927 |
| C | Growth Hormone | GH | P01241 |
| C | Versican core protein | VCAN | P13611 |
| C | Protogenin | PRTG | Q2VWP7 |
| C | Contactin-2 | CNTN2 | Q02246 |

Linear regression models (L1 regularization) were trained and cross-validated on each dataset (AIM1-ARR, ACP-E vs. Q, independently (with the exception of F4+F5 which was blended through normalization with bridging samples for the primary endpoint Gd). Disease activity was split into subtle (0 vs. 1 Gd lesions), General (0 vs. any Gd lesions), and Extreme (0 vs. 3+ lesions) when possible for the classification problem. The same model-building strategy was re-deployed on progressively larger subsets/tiers of markers on the panel to report AUC/PPV. Statistical measures of the multivariate analysis (area under the curve (AUC) and positive predictive value (PPV)) are shown below.

Generally, biomarker panels that employed biomarkers from each of tier A, tier B, and tier C (21 total biomarkers) corresponded to predictive models that exhibited improved predictive capacity across the different disease activity endpoints (e.g., subtle disease activity, general disease activity, extreme disease activity, annualized relapse rate, or disease state). Specifically, the AUC across these different disease activity endpoints ranged from 0.771 up to 0.961, whereas the PPV ranged from 0.687 up to 0.895. Biomarker panels employing biomarkers from tiers A and B (17 total biomarkers) achieved AUC values across the different disease endpoints that ranged from 0.737 up to 0.968, whereas the PPV ranged from 0.620 up to 0.896. Biomarker panels employing biomarkers from only tier A (8 total biomarkers) achieved AUC values across the different disease endpoints that ranged from 0.763 up to 0.880, whereas the PPV ranged from 0.716 up to 0.871. Biomarker panels employing biomarkers solely from tier B or biomarkers solely from tier C remained predictive, but noticeably were less predictive than the biomarker panels employing tier A biomarkers or combinations of tier A+A or tier A+B+C. Specifically, biomarker panels employing biomarkers solely from tier B achieved AUC values across the different disease endpoints that ranged from 0.562 up to 0.841, whereas the PPV ranged from 0.462 up to 0.999. Biomarker panels employing biomarkers solely from tier C achieved AUC values across the different disease endpoints that ranged from 0.589 up to 0.779, whereas the PPV ranged from 0.410 up to 0.781.

| Study | F4 Paired-Subtle DA | F4 Paired-General DA | F4 + F5 (Gd presence)-Subtle DA | F4 + F5 (Gd presence)-General DA | F4 + F5 (Gd presence)-Extreme DA | AIM1 (annualized relapse rate) | ACP (exacerbation vs. quiescence) |
|---|---|---|---|---|---|---|---|
| Tiers A + B + C | | | | | | | |
| AUC | 0.890 | 0.961 | 0.771 | 0.834 | 0.890 | 0.925 | 0.802 |
| PPV | 0.810 | 0.890 | 0.687 | 0.867 | 0.765 | 0.895 | 0.846 |

| Study | F4 Baseline-Normalized (Gd pairs)-Subtle DA | F4 Baseline-Normalized (Gd pairs)-General DA | F4 + F5 (Gd presence)-Subtle DA | F4 + F5 (Gd presence)-General DA | F4 + F5 (Gd presence)-Extreme DA | AIM1 (annualized relapse rate) | ACP (exacerbation vs. quiescence) |
|---|---|---|---|---|---|---|---|
| Tiers A + B | | | | | | | |
| AUC | 0.890 | 0.968 | 0.737 | 0.785 | 0.888 | 0.923 | 0.783 |
| PPV | 0.810 | 0.896 | 0.620 | 0.854 | 0.775 | 0.821 | 0.828 |
| Tier A | | | | | | | |
| AUC | 0.869 | 0.876 | 0.763 | 0.790 | 0.880 | 0.869 | 0.778 |
| PPV | 0.792 | 0.781 | 0.716 | 0.868 | 0.820 | 0.871 | 0.802 |
| Tier B | | | | | | | |
| AUC | 0.745 | 0.750 | 0.633 | 0.674 | 0.562 | 0.841 | 0.732 |
| PPV | 0.578 | 0.735 | 0.609 | 0.817 | 0.462 | 0.770 | 0.999 |
| Tier C | | | | | | | |
| AUC | 0.710 | 0.605 | 0.660 | 0.615 | 0.589 | 0.779 | 0.631 |
| PPV | 0.410 | 0.577 | 0.610 | 0.781 | 0.439 | 0.774 | 0.553 |

Example 41: Multivariate Biomarker Panel for Predicting Multiple Sclerosis Disease Activity Multivariate analyses of biomarker panels were conducted across the different human clinical studies according to the methods described in Example 3. In particular biomarkers were categorized into different tiers (e.g., Tier 1, Tier 2, and Tier 3). Biomarker panels were constructed from one or more tiers (e.g., Tier 1 alone, tier 2 alone, tier 3 alone, tiers 1+2, or tiers 1+2+3). The 21 total biomarkers evaluated through this multivariate example are the 21 biomarkers shown in Table 2. Additional backup biomarkers that can be used to substitute in for any of the 21 biomarkers are identified as tier 4 biomarkers in Table 2.

TABLE 2

Tiered biomarkers for use in predicting multiple sclerosis disease activity.

| Tier | Biomarker Name | Biomarker Symbol | Accession Number (Uniprot Database) |
|---|---|---|---|
| 1 | Neurofilament Light Polypeptide Chain | NEFL | P07196 |
| 1 | Myelin Oligodendrocyte Glycoprotein | MOG | Q16653 |
| 1 | Cluster of Differentiation 6 | CD6 | P30203 |
| 1 | Chemokine (C-X-C motif) ligand 9 | CXCL9 | Q07325 |
| 1 | Osteoprotegerin | OPG | O00300 |
| 1 | Osteopontin | OPN | P10451 |
| 1 | Chemokine (C-X-C motif) ligand 13 | CXCL13 | O43927 |
| 1 | Glial Fibrillary Acidic Protein | GFAP | O43155 |
| 2 | CUB domain-containing protein 1 | CDCP1 | Q9H5V8 |
| 2 | C-C Motif Chemokine Ligand 20 | CCL20/ MIP 3-α | P78556 |
| 2 | Interleukin-12 subunit beta | IL-12B | P29460 |
| 2 | Amyloid Beta Precursor Like Protein 1 | APLP1 | P51693 |
| 2 | Tumor Necrosis Factor Receptor Superfamily Member 10A | TNFRSF10A | O00220 |
| 2 | Collagen, type IV, alpha 1 | COL4A1 | P02462 |
| 2 | Serpin Family A Member 9 | SERPINA9 | Q86WD7 |
| 2 | Fibronectin Leucine Rich Transmembrane Protein 2 | FLRT2 | O43155 |
| 2 | Tumor necrosis factor ligand superfamily member 13B | TNFSF13B | Q9Y275 |
| 3 | Growth Hormone | GH | P01241 |
| 3 | Versican core protein | VCAN | P13611 |
| 3 | Protogenin | PRTG | Q2VWP7 |
| 3 | Contactin-2 | CNTN2 | Q02246 |
| 4 | Growth Hormone 2 | GH2 | P01242 |
| 4 | Interleukin-18 | IL18 | Q14116 |
| 4 | Matrix Metalloproteinase-2 | MMP-2 | P08253 |
| 4 | Gamma-Interferon-Inducible Lysosomal Thiol Reductase | IFI30 | P13284 |
| 4 | Chitinase-3-like protein 1 | CHI3L1/ YkL40 | P36222 |

Linear regression models (L1 regularization) were trained and cross-validated on each dataset (AIM1-ARR, ACP-E vs. Q, independently (with the exception of F4+F5 which was blended through normalization with bridging samples for the primary endpoint Gd). Disease activity was split into subtle (0 vs. 1 Gd lesions), General (0 vs. any Gd lesions), and Extreme (0 vs. 3+ lesions) when possible for the classification problem. The same model-building strategy was redeployed on progressively larger subsets/tiers of markers on the panel to report AUC/PPV. Statistical measures of the multivariate analysis (area under the curve (AUC) and positive predictive value (PPV)) are shown below.

Generally, biomarker panels that employed biomarkers from each of tier 1, tier 2, and tier 3 (21 total biomarkers) corresponded to predictive models that exhibited improved predictive capacity across the different disease activity endpoints (e.g., subtle disease activity, general disease activity, extreme disease activity, annualized relapse rate, or disease state). Specifically, the AUC across these different disease activity endpoints ranged from 0.686 up to 0.889, whereas the PPV ranged from 0.648 up to 0.835. Biomarker panels employing biomarkers from tiers 1 and 2 (17 total biomarkers) achieved AUC values across the different disease endpoints that ranged from 0.693 up to 0.892, whereas the PPV ranged from 0.613 up to 0.843. Biomarker panels employing biomarkers from only tier 1 (8 total biomarkers) achieved AUC values across the different disease endpoints that ranged from 0.667 up to 0.869, whereas the PPV ranged from 0.617 up to 0.861. Biomarker panels employing biomarkers solely from tier 2 or biomarkers solely from tier 3 remained predictive, but noticeably were less predictive than the biomarker panels employing tier 1 biomarkers or combinations of tier 1+2 or tier 1+2+3. Specifically, biomarker panels employing biomarkers solely from tier 2 achieved AUC values across the different disease endpoints that ranged from 0.595 up to 0.761, whereas the PPV ranged from 0.462 up to 0.769. Biomarker panels employing biomarkers solely from tier 3 achieved AUC values across the different disease endpoints that ranged from 0.566 up to 0.626, whereas the PPV ranged from 0.370 up to 0.634.

| | | | | Tiers 1 + 2 + 3 | | | |
|---|---|---|---|---|---|---|---|
| Study | F4 Paired- Subtle DA | F4 Paired- General DA | F4 + F5 (Gd presence)- Subtle DA | F4 + F5 (Gd presence)- General DA | F4 + F5 (Gd presence)- Extreme DA | AIM1 (annualized relapse rate) | ACP (exacerbation vs. quiescence) |
| AUC | 0.825 +/− 0.086 | 0.889 +/− 0.055 | 0.718 +/− 0.052 | 0.754 +/− 0.043 | 0.882 +/− 0.024 | 0.816 +/− 0.091 | 0.686 +/− 0.101 |
| PPV | 0.670 +/− 0.140 | 0.748 +/− 0.142 | 0.648 +/− 0.047 | 0.835 +/− 0.043 | 0.725 +/− 0.057 | 0.760 +/− 0.077 | 0.675 +/− 0.131 |
| Study | F4 Baseline- Normalized (Gd pairs)- Subtle DA | F4 Baseline- Normalized (Gd pairs)- General DA | F4 + F5 (Gd presence)- Subtle DA | F4 + F5 (Gd presence)- General DA | F4 + F5 (Gd presence)- Extreme DA | AIM1 (annualized relapse rate) | ACP (exacerbation vs. quiescence) |

-continued

| | Tiers 1 + 2 | | | | | | | |
|---|---|---|---|---|---|---|---|---|
| AUC | 0.825 +/- 0.086 | 0.892 +/- 0.051 | 0.693 +/- 0.024 | 0.756 +/- 0.033 | 0.880 +/- 0.031 | 0.860 +/- 0.073 | 0.726 +/- 0.081 | |
| PPV | 0.670 +/- 0.140 | 0.748 +/- 0.142 | 0.613 +/- 0.044 | 0.843 +/- 0.031 | 0.696 +/- 0.045 | 0.720 +/- 0.142 | 0.733 +/- 0.111 | |

| | Tier 1 | | | | | | | |
|---|---|---|---|---|---|---|---|---|
| AUC | 0.767 +/- 0.113 | 0.825 +/- 0.064 | 0.667 +/- 0.079 | 0.761 +/- 0.035 | 0.869 +/- 0.022 | 0.756 +/- 0.107 | 0.693 +/- 0.121 | |
| PPV | 0.632 +/- 0.160 | 0.661 +/- 0.056 | 0.617 +/- 0.112 | 0.861 +/- 0.035 | 0.746 +/- 0.048 | 0.620 +/- 0.065 | 0.663 +/- 0.095 | |

| | Tier 2 | | | | | | | |
|---|---|---|---|---|---|---|---|---|
| AUC | 0.655 +/- 0.100 | 0.657 +/- 0.052 | 0.627 +/- 0.027 | 0.595 +/- 0.081 | 0.604 +/- 0.063 | 0.761 +/- 0.052 | 0.658 +/- 0.096 | |
| PPV | 0.559 +/- 0.081 | 0.523 +/- 0.141 | 0.543 +/- 0.025 | 0.769 +/- 0.051 | 0.462 +/- 0.093 | 0.667 +/- 0.052 | 0.669 +/- 0.108 | |

| | Tier 3 | | | | | | | |
|---|---|---|---|---|---|---|---|---|
| AUC | 0.644 +/- 0.102 | 0.582 +/- 0.041 | 0.626 +/- 0.048 | 0.566 +/- 0.049 | 0.578 +/- 0.024 | 0.624 +/- 0.121 | 0.612 +/- 0.061 | |
| PPV | 0.370 +/- 0.074 | 0.530 +/- 0.140 | 0.557 +/- 0.040 | 0.742 +/- 0.039 | 0.382 +/- 0.050 | 0.634 +/- 0.112 | 0.060 +/- 0.120 | |

Example 42: Additional Multivariate (Pairs, Triplets, and Quadruplets) Biomarker Panel for Predicting Directional Shift of Multiple Sclerosis Disease Activity Multivariate analyses of minimal sets of biomarkers (e.g., pairs, triplicates, and quadruplets) were conducted across the different human clinical studies. Specifically, minimal sets of biomarkers were analyzed for their ability to predict the directional shift of MS disease activity (e.g., increasing or decreasing disease activity, as measured by number of gadolinium enhancing lesions).

To analyze the minimal predictive set of biomarkers for longitudinal patient samples, combinations of biomarker pairs, triplicates, and quadruplets were analyzed in a shifts (baseline-normalized, pairwise differences) analysis to predict the increase or decrease of Gd-enhancing lesions. The overarching procedure for the analysis is:
1. Read in the list of biomarkers.
2. Read in the data for these biomarkers and their attendant demographic and clinical features for each study from the data lake.
3. Drop all samples that were collected more than a threshold time (e.g., more than 30 days) from their associated MRI scan.
4. Compute the difference in NPX values between all pairs of samples that have increasing or decreasing lesion activity.
   a. Filter out only the sample pairs where one sample has an associated MRI with 0 Gd lesions for the true baseline-normalization approach.
5. For each study:
   a. using the increasing/decreasing or Non-Gad+→Gad+/Gad+→Non-Gad+ as an endpoint,
   b. perform a five-fold cross validation split,
   c. select a logistic regression model configuration that worked well in past multivariate analyses,
   d. create feature matrices from every combination of two, three, and four proteins (no demographic/clinical features are necessary as covariates since baseline-normalization bakes it into the process),
   e. train a copy of the logistic regression model on four of the five splits, and evaluate its performance on the fifth,
6. Average the AUROC of each model across the five splits and the three studies. Take standard deviation of performances to compute a metric of uncertainty (repeat for PPV).
7. Sort the models by their AUROC, and create ROC curves for each study for the model corresponding to the highest performing feature set.

We ran the above analysis in two ways:

The above analysis was conducted in two ways:
   A. including full list of biomarkers, and
   B. a follow-up analysis excluding the highest performing biomarker (NEFL).

Tables 3 and 4 below show that biomarker panels including two, three, or four biomarkers are predictive of the directional shift of MS disease activity.

In particular, for pairs of biomarkers, a panel including NEFL and CD6 biomarkers achieved an area under the receiver operating characteristic curve (AUROC) of 0.860 and a mean PPV of 0.77. Additionally, a biomarker panel including NEFL and CXCL9 biomarkers achieved an AUROC of 0.85 and a mean PPV of 0.74. Additional pairs of biomarkers (not including NEFL) were also predictive. For example, a biomarker panel including MOG and CXCL9 achieved an AUROC of 0.761 and a PPV of 0.686. A biomarker panel including CD6 and CXCL9 achieved an AUROC of 0.766 and a PPV of 0.699. A biomarker panel including MOG and CD6 achieved an AUROC of 0.745 and a PPV of 0.705.

In particular, for biomarker triplicates, a panel including NEFL, CXCL9, and CD6 achieved an AUROC of 0.885 and a mean PPV of 0.79. Additionally, a biomarker panel including MOG, CD6, and CXCL9 achieved an AUROC of 0.798 and a PPV of 0.71.

In particular, for biomarker quadruplets, a biomarker panel including NEFL, MOG, CXCL9, and CD6 achieved an AUROC of 0.884 and a PPV of 0.763. A biomarker panel including NEFL, CXCL9, CD6, and CXCL13 achieved an AUROC of 0.889 and a PPV of 0.764. A biomarker panel including NEFL, TNFRSF10A, COL4A1, and CCL20 achieved an AUROC of 0.836 and a PPV of 0.725. Additional biomarker quadruplets (not including NEFL) also demonstrated predictiveness. For example, a combination of MOG, CXCL9, IL-12B and APLP1 achieved an AUROC of 0.795 and PPV of 0.67. A combination of CXCL9, OPG, APLP1, and OPN achieved an AUROC of 0.741 and a PPV of 0.65. A combination of MOG, IL-12B, OPN, and CNTN2 achieved an AUROC of 0.765 and a PPV of 0.69.

TABLE 3

Baseline-normalization shifts prediction: Biomarker panels for anticipating a shift (e.g., increase or decrease) in MS disease activity.

| Biomarkers | Study | AUROC (mean) | AUROC (weighted mean) | AUROC (stdev) | PPV (mean) | PPV (weighted mean) | PPV (stdev) |
|---|---|---|---|---|---|---|---|
| NEFL, MOG, CD6, CXCL9 | F6 | 0.884 | 0.8854 | 0.0859 | 0.763 | 0.7635 | 0.1382 |
| NEFL, CXCL9, TNFRSF10A, COL4A1 | F4 | 0.846 | 0.8516 | 0.1064 | 0.7485 | 0.7541 | 0.0945 |
| NEFL, CD6, CXCL9 | F6 | 0.885 | 0.8862 | 0.0911 | 0.7865 | 0.7876 | 0.1255 |
| NEFL, TNFRSF10A, COL4A1 | F4 | 0.819 | 0.8258 | 0.1755 | 0.756 | 0.7636 | 0.0752 |
| NEFL, MOG | Blended | 0.802 | 0.8038 | 0.1764 | 0.698 | 0.7002 | 0.0520 |
| NEFL, CD6 | F6 | 0.860 | 0.8621 | 0.1082 | 0.7745 | 0.7774 | 0.0873 |
| NEFL, CXCL9 | Blended | 0.854 | 0.8564 | 0.1093 | 0.7435 | 0.7472 | 0.1211 |
| NEFL, TNFRSF10A | F4 | 0.824 | 0.8297 | 0.1679 | 0.734 | 0.7402 | 0.0766 |
| MOG, CXCL9, IL-12B, APLP1 | F6 | 0.795 | 0.7917 | 0.1350 | 0.6665 | 0.6646 | 0.0844 |
| CXCL9, COL4A1, OPG, VCAN | F4 | 0.736 | 0.7410 | 0.0947 | 0.674 | 0.6761 | 0.0613 |
| CXCL9, OPG, APLP1, OPN | F4 | 0.741 | 0.7449 | 0.1303 | 0.6515 | 0.6513 | 0.0664 |
| MOG, IL-12B, APLP1 | F6 | 0.737 | 0.7310 | 0.1699 | 0.6495 | 0.6454 | 0.0757 |
| MOG, CD6, CXCL9 | Blended | 0.798 | 0.7947 | 0.0832 | 0.7125 | 0.7105 | 0.0915 |
| CXCL9, COL4A1, VCAN | F4 | 0.711 | 0.7148 | 0.0578 | 0.6575 | 0.6596 | 0.0525 |
| MOG, IL-12B | F6 | 0.735 | 0.7296 | 0.1707 | 0.628 | 0.6246 | 0.0618 |
| CXCL9, CD6 | Blended | 0.766 | 0.7636 | 0.0919 | 0.699 | 0.6962 | 0.0854 |
| MOG, CXCL9 | Blended | 0.761 | 0.7588 | 0.1383 | 0.686 | 0.6861 | 0.0937 |
| MOG, CD6 | Blended | 0.745 | 0.7419 | 0.1083 | 0.705 | 0.7023 | 0.0596 |
| CXCL9, COL4A1 | F4 | 0.716 | 0.7177 | 0.0869 | 0.6445 | 0.6454 | 0.0395 |

TABLE 4

Biomarker panels for predicting a decrease in MS disease activity.

| Biomarkers | Cohort | AUROC mean | AUROC (weighted mean) | AUROC (stdev) | PPV (mean) | PPV (weighted mean) | PPV (stdev) |
|---|---|---|---|---|---|---|---|
| NEFL, CD6, CXCL9, CXCL13 | F6 | 0.889 | 0.8882 | 0.0654 | 0.764 | 0.7645 | 0.0804 |
| NEFL, MOG, CD6, CXCL9 | F6 | 0.859 | 0.8585 | 0.0847 | 0.7845 | 0.7848 | 0.1088 |
| NEFL, TNFRSF10A, COL4A1, CCL20 | F4 | 0.836 | 0.8414 | 0.1604 | 0.725 | 0.7310 | 0.1247 |

TABLE 4-continued

Biomarker panels for predicting a decrease in MS disease activity.

| Biomarkers | Cohort | AUROC (mean) | AUROC (weighted mean) | AUROC (stdev) | PPV (mean) | PPV (weighted mean) | PPV (stdev) |
|---|---|---|---|---|---|---|---|
| NEFL, CD6, CXCL9 | F6 | 0.876 | 0.8758 | 0.0770 | 0.763 | 0.7638 | 0.1050 |
| NEFL, TNFRSF10A, COL4A1 | F4 | 0.834 | 0.8387 | 0.1628 | 0.7055 | 0.7110 | 0.1316 |
| NEFL, CD6 | F6 | 0.857 | 0.8579 | 0.0991 | 0.7585 | 0.7590 | 0.1140 |
| NEFL, TNFRSF10A | F4 | 0.840 | 0.8445 | 0.1573 | 0.697 | 0.7012 | 0.1229 |
| MOG, IL-12B, OPN, CNTN2 | F6 | 0.765 | 0.7587 | 0.1181 | 0.6935 | 0.6891 | 0.0959 |
| CD6, COL4A1, CCL20, VCA | F4 | 0.693 | 0.6960 | 0.0794 | 0.6545 | 0.6565 | 0.0759 |
| MOG, IL-12B, CNTN2 | F6 | 0.760 | 0.7538 | 0.1238 | 0.6975 | 0.6925 | 0.1085 |
| CD6, CCL20, VCAN | F4 | 0.691 | 0.6926 | 0.1037 | 0.657 | 0.6581 | 0.0771 |
| MOG, IL-12B | F6 | 0.732 | 0.7261 | 0.1275 | 0.691 | 0.6864 | 0.0549 |
| CD6, VCAN | F4 | 0.693 | 0.6936 | 0.1228 | 0.6125 | 0.6117 | 0.0544 |

Example 43: Additional Multivariate (Pairs, Triplets, and Quadruplets) Biomarker Panel for Predicting Presence or Absence of Multiple Sclerosis Multivariate analyses of minimal sets of biomarkers (e.g., pairs, triplicates, and quadruplets) were conducted across the different human clinical studies. Specifically, minimal sets of biomarkers were analyzed for their ability to predict a classification of presence or absence of general MS disease (e.g., presence indicated by at least 1 Gd-enhancing lesion and absence indicated by 0 Gd-enhancing lesions).

To analyze the minimal predictive set of biomarkers, combinations of biomarker pairs, triplicates, and quadruplets were analyzed in a cross-sectional analysis to predict the presence or absence of Gd-enhancing lesions ("General Disease Activity," or GDA). The overarching procedure for the analysis is:

1. Read in the list of biomarkers.
2. Read in the data for these biomarkers and their attendant demographic and clinical features for each study from the data lake.
3. Drop all samples that were collected beyond a threshold time (e.g., more than 30 days) from their associated MRI scan.
4. Perform optimized demographic and clinical adjustment.
    A. Run an OLS regression between the optimal subset of demographic/clinical features and the NPX level of each individual biomarker value, using only the Gd-samples (with no disease activity) for a given study, filtering out outliers.
        a. DiseaseDuration: the number of years since MS diagnosis.
        b. Age: the age of a patient in number of years.
        c. Sample_Age: the length of storage of a sample before it was formally analyzed.
        d. Delta BloodMinusDiagnosis: the number of days between an MRI and respective blood sample (must be between 30).
    B. Extract residuals from this procedure and use that as input into model-building procedures.
5. For each study:
    a. construct the GDA endpoint,
    b. perform a five-fold cross validation split,
    c. select a logistic regression model configuration that worked well in past multivariate analyses,
    d. create feature matrices from every combination of two, three, and four proteins (and no demographic/clinical features as covariates),
    e. train a copy of the logistic regression model on four of the five splits, and evaluate its performance on the fifth,
6. Average the AUROC of each model across the five splits and the three studies.
7. Sort the models by their AUROC, and create ROC curves for each study for the model corresponding to the highest performing feature set.

The above analysis was conducted in two ways:
    A. including full list of biomarkers, and
    B. a follow-up analysis excluding the highest performing biomarker (NEFL).

Table 5 below shows that biomarker panels including two, three, or four biomarkers are predictive for presence or absence of MS. In particular, for pairs of biomarkers, a panel including NEFL and TNFSF13B achieved an AUROC of 0.788 and a PPV of 0.708, a panel including NEFL and CNTN2 achieved an AUROC of 0.777 and a PPV of 0.732, and a panel of NEFL and CXCL9 achieved an AUROC of 0.777 and a PPV of 0.713. Additional pairs of biomarkers (without NEFL) were also predictive for presence or absence of multiple sclerosis. A panel including MOG and CDCP1 achieved an AUROC of 0.672 and a PPV of 0.597, a panel including MOG and TNFSF13B achieved an AUROC of 0.672 and a PPV of 0.599, and a panel including MOG and CXCL9 achieved an AUROC of 0.670 and a PPV of 0.606.

In particular, for biomarker triplicates, a panel including NEFL, CNTN2, and TNFSF13B achieved an AUROC of 0.794 and a PPV of 0.745. Here, substitution of CNTN2 in the biomarker triplicate with either APLP1 or TNFRSF10A achieved similar AUROC values of 0.794 and 0.792, respectively. For a biomarker triplicate without NEFL, a panel including MOG, CXCL9, and TNFSF13B achieved an AUROC of 0.690 and a PPV of 0.623, a panel including MOG, OPG, and TNFSF13B achieved an AUROC of 0.685 and a PPV of 0.637, and a panel including MOG, CCL20, and TNFSF13B achieved an AUROC of 0.685 and a PPV of 0.664. APLP1, CCL20, and CNTN2 are the next proteins that help improve signal beyond biomarker triplicates. For biomarker quadruplets, a panel including NEFL, TNFRSF10A, CNTN2, and TNFSF13B achieved an AUROC of 0.798 and a PPV of 0.742.

TABLE 5

Biomarker panels for determining whether an associated MRI had the presence or absence of Gadolinium-enhancing lesions based on protein signatures in blood serum for a single blood draw within 30 days of the MRI.

| Biomarker Set (List of proteins/features) | AUROC | Delta AUROC | PPV | PPV Unc. |
|---|---|---|---|---|
| NEFL, TNFSF13B | 0.788 | 0.002 | 0.708 | 0.002 |
| NEFL, CNTN2 | 0.777 | 0.003 | 0.732 | 0.002 |
| NEFL, CXCL9 | 0.777 | 0.004 | 0.713 | 0.002 |
| MOG, CDCP1 | 0.672 | 0.008 | 0.597 | 0.002 |
| MOG, TNFSF13B | 0.672 | 0.007 | 0.599 | 0.002 |
| MOG, CXCL9 | 0.670 | 0.005 | 0.606 | 0.002 |
| NEFL, CNTN2, TNFSF13B | 0.794 | 0.002 | 0.745 | 0.002 |
| NEFL, APLP1, TNFSF13B | 0.794 | 0.002 | 0.715 | 0.002 |
| NEFL, TNFRSF10A, TNFSF13B | 0.792 | 0.003 | 0.718 | 0.002 |
| MOG, CXCL9, TNFSF13B | 0.690 | 0.006 | 0.623 | 0.002 |
| MOG, OPG, TNFSF13B | 0.685 | 0.006 | 0.637 | 0.002 |
| MOG, CCL20, TNFSF13B | 0.685 | 0.008 | 0.664 | 0.002 |
| NEFL, TNFRSF10A, CNTN2, TNFSF13B | 0.798 | 0.002 | 0.742 | 0.002 |
| NEFL, COL4A1, CNTN2, TNFSF13B | 0.798 | 0.002 | 0.749 | 0.002 |
| NEFL, TNFRSF10A, APLP1, TNFSF13B | 0.797 | 0.003 | 0.705 | 0.002 |
| MOG, CXCL9, APLP1, TNFSF13B | 0.697 | 0.005 | 0.634 | 0.002 |
| MOG, CXCL9, OPG, TNFSF13B | 0.696 | 0.005 | 0.643 | 0.002 |
| MOG, CXCL9, OPG, CNTN2 | 0.693 | 0.006 | 0.631 | 0.002 |

Example 44: Additional Multivariate (Pairs, Triplets, and Quadruplets) Biomarker Panel for Predicting Severity of Multiple Sclerosis Multivariate analyses of minimal sets of biomarkers (e.g., pairs, triplicates, and quadruplets) were conducted across the different human clinical studies according to the methods described in Example 3. Specifically, minimal sets of biomarkers were analyzed for their ability to predict a number of Gd-enhancing lesions (e.g., a measure of subtle MS disease).

A regression analysis was performed analogously to the cross-sectional and shift analysis, with the following procedure:

1. Read in the list of biomarkers.
2. Read in the data for these biomarkers and their attendant demographic and clinical features for each study from the data lake.
3. Drop all samples that were collected more than a threshold time (e.g., more than 30 days) from their associated MRI scan.
4. Perform optimized demographic and clinical adjustment.
   A. Run an OLS regression between the optimal subset of demographic/clinical features and the NPX level of each individual biomarker value, using only the Gd-samples (with no disease activity) for a given study, filtering out outliers.
      a. DiseaseDuration: the number of years since MS diagnosis.
      b. Age: the age of a patient in number of years.
      c. Sample_Age: the length of storage of a sample before it was formally analyzed.
      d. Delta BloodMinusDiagnosis: the number of days between an MRI and respective blood sample (must be between 30).
   B. Extract residuals from this procedure and use that as input into model-building procedures.
5. For each study:
   a. use the Gd lesion count (clipped at a maximum of 5) as an endpoint for the regression,
   b. perform a five-fold cross validation split,
   c. select a ridge regression model configuration that worked well in past multivariate analyses,
   d. create feature matrices from every combination of two, three, and four proteins (and no demographic/clinical features as covariates),
   e. train a copy of the ridge regression model on four of the five splits, and evaluate its performance on the fifth,
6. Average the adjusted $R^2$ of each model across the five splits and the three studies.
7. Sort the models by their adjusted $R^2$ and create correlation plots between the predictions and the endpoints for each study for the model corresponding to the highest performing feature set.

The above analysis was conducted in two ways:
   A. including full list of biomarkers, and
   B. a follow-up analysis excluding the highest performing biomarker (NEFL).

Table 6 below shows that biomarker panels including two, three, or four biomarkers are generally predictive for determining subtle MS disease activity.

In particular, for pairs of biomarkers, a panel including NEFL and TNFSF13B achieved a Spearman's R coefficient value of 0.524, a panel including NEFL and SERPINA9 achieved a Spearman's R coefficient value of 0.501, and a panel including NEFL and GH achieved a Spearman's R coefficient value of 0.505. Additional pairs of biomarkers (without NEFL) were also predictive for determining subtle MS disease activity. For example, a panel including MOG and TNFSF13B achieved a Spearman's R coefficient value of 0.286 and a panel including MOG and CXCL9 achieved a Spearman's R coefficient value of 0.290.

For biomarker triplicates, a panel including NEFL, SERPINA9, and TNFSF13B achieved a achieved a Spearman's R coefficient value of 0.533, a panel including NEFL, CNTN2, and TNFSF13B achieved a Spearman's R coefficient value of 0.525, and a panel including NEFL, APLP1, and TNFSF13B achieved a Spearman's R coefficient value of 0.537. Additionally, a panel of MOG, CXCL9, and TNFSF13B achieved a Spearman's R coefficient value of 0.306, a panel of MOG, CCL20, and COL4A1 achieved a Spearman's R coefficient value of 0.210, and a panel of CXCL13, APLP1, and FLRT2 achieved a Spearman's R coefficient value of 0.143.

For biomarker quadruplicates, a panel including NEFL, CXCL13, CCL20, and TNFSF13B achieved a Spearman's R coefficient value of 0.520. Additionally, a panel including NEFL, CXCL13, CXCL9, and TNFSF13B achieved a Spearman's R coefficient value of 0.513 and a panel including NEFL, CXCL13, SERPINA9, and TNFSF13B achieved a Spearman's R coefficient value of 0.513. A biomarker quadruplicate (not including NEFL) of MOG, CXCL9, OPG, SERPINA9, and TNFSF13B achieved a Spearman's R coefficient value of 0.302.

TABLE 6

Biomarker panels for predicting the number of lesions that an associated MRI had based on protein signatures in blood serum for a single blood draw within 30 days of the MRI.

| Biomarker Set (List of proteins/features) | Avg. Performance | | | | | | |
|---|---|---|---|---|---|---|---|
| | Spearman's R | Delta Spearman's R | Adj. $R^2$ | Delta Adj. $R^2$ | MSE | Delta MSE | Delta MAE MAE |
| NEFL, TNFSF13B | 0.524 | 0.020 | 0.266 | 0.003 | 1.362 | 0.033 | 0.886 0.006 |
| NEFL, SERPINA9 | 0.501 | 0.017 | 0.243 | 0.007 | 1.394 | 0.027 | 0.894 0.005 |
| NEFL, GH | 0.505 | 0.010 | 0.242 | 0.003 | 1.386 | 0.027 | 0.891 0.007 |
| MOG, TNFSF13B | 0.286 | 0.009 | 0.053 | 0.006 | 1.698 | 0.043 | 1.011 0.015 |
| MOG CXCL9 | 0.290 | 0.016 | 0.047 | 0.008 | 1.695 | 0.038 | 1.010 0.013 |
| MOG, IL-12B | 0.272 | 0.006 | 0.035 | 0.005 | 1.700 | 0.029 | 1.018 0.012 |
| NEFL, SERPINA9, TNFSF13B | 0.533 | 0.024 | 0.258 | 0.009 | 1.363 | 0.033 | 0.883 0.003 |
| NEFL, CNTN2, TNFSF13B | 0.525 | 0.022 | 0.251 | 0.008 | 1.338 | 0.035 | 0.876 0.004 |
| NEFL, APLP1, TNFSF13B | 0.537 | 0.013 | 0.250 | 0.008 | 1.345 | 0.022 | 0.883 0.004 |
| MOG, CXCL9, TNFSF13B | 0.306 | 0.011 | 0.041 | 0.007 | 1.680 | 0.045 | 1.007 0.014 |
| MOG, SERPINA9, TNFSF13B | 0.297 | 0.013 | 0.037 | 0.012 | 1.702 | 0.043 | 1.009 0.014 |
| MOG, OPG, TNFSF13B | 0.300 | 0.009 | 0.035 | 0.006 | 1.692 | 0.046 | 1.003 0.015 |
| NEFL, CCL20, SERPINA9, TNFSF13B | 0.535 | 0.026 | 0.238 | 0.012 | 1.367 | 0.029 | 0.888 0.002 |
| NEFL, APLP1, SERPINA9, TNFSF13B | 0.542 | 0.018 | 0.237 | 0.012 | 1.348 | 0.022 | 0.883 0.003 |
| NEFL, CCL20, APLP1, TNFSF13B | 0.544 | 0.016 | 0.236 | 0.013 | 1.345 | 0.021 | 0.886 0.003 |
| MOG, CXCL9, OPG, TNFSF13B | 0.318 | 0.012 | 0.023 | 0.009 | 1.674 | 0.048 | 1.000 0.014 |
| MOG, OPG, SERPINA9, TNFSF13B | 0.312 | 0.013 | 0.020 | 0.011 | 1.696 | 0.046 | 1.002 0.014 |
| MOG, CXCL9, SERPINA9, TNFSF13B | 0.317 | 0.010 | 0.018 | 0.006 | 1.687 | 0.045 | 1.007 0.014 |

Example 45: Additional Multivariate (Pairs, Triplets, and Quadruplets) Biomarker Panel for Predicting Multiple Sclerosis Disease Progression Multivariate analyses of minimal sets of biomarkers (e.g., pairs, triplicates, and quadruplets) were conducted n=205 samples from the University of Basel Hospital according to the methods described in Example 3. Specifically, minimal sets of biomarkers were analyzed for their ability to predict a primary disease endpoint of disease progression (e.g., association of serum protein measurement with Expanded Disability Status Score (EDSS)). All sets use mathematical combinations (such as a logistic regression model or decision tree) to combine individual biomarker levels into a multivariate score.

A ridge (L2) regularization linear model was evaluated with 5-fold cross-validation (to estimate mean and uncertainty) across all exhaustive combinations of pairs, triplets, and quadruplets of protein subsets. Performance was then sorted by Spearman R 2 (per the rationale above), and this procedure was repeated for:
1. Models built with just the logarithmic transform of the protein concentrations
2. Models built with the logarithmic transform of the protein concentrations plus age, sex, and disease duration covariates incorporated as eligible features
3. Models built with the logarithmic transform of the protein concentrations after the residuals have been extracted from an OLS regression procedure to predict each respective biomarker concentration from just the demographic information (age, sex, and disease duration) contained within the samples that present no disease activity (i.e. contain 0 Gd lesions in their corresponding MRI).

Table 7 below documents best performing minimally predictive biomarker sets (e.g., pairs, triplets, and quadruplets) according to regression on EDSS predicting the number of lesions that an associated MRI had based on protein signatures in blood serum for a single blood draw within 30 days of the MRI. Of note, the biomarker triplicate of GFAP, NEFL, and MOG exhibited the highest overall adjusted $R^2$ (with a measurable improvement above the best univariate feature in field—GFAP). Additionally, biomarker pairs of A) GFAP and MOG, B) GFAP and NEFL, and C) APLP1 and GFAP as well as biomarker quadruplets GFAP, NEFL, MOG, and IL-12B/PRTG/APLP1 also exhibited predictiveness.

The best biomarker sets with Covariate (age, sex, disease duration) adjusted Log(pg/mL)) include: the biomarker pair of NEFL and MOG which exhibited the highest overall adjusted $R^2$. Biomarker triplicates of NEFL, MOG, and GH as well as NEFL, MOG, and SERPINA9 also predict EDSS in an improved fashion. Biomarker quadruplets NEFL, MOG, GH, and SERPINA9 and NEFL, MOG, GH, and TNFRSF10A also improve further. Additionally, biomarker triplicate CXCL9, OPG, and SERPINA9 is predictive of disease progression and further improves when MOG is added as a biomarker quadruplet.

The best biomarker sets with Demographic (age, sex, disease duration) adjusted include biomarker pair CXCL9 and OPG and biomarker triplicate CXCL9, OPG, and TNFRSF10A. Biomarker quadruplet CD6, IL-12B, APLP1, and CCL20 forms the highest Pearson $R^2$ correlation of any of the demographic-adjusted models.

TABLE 7

Biomarker panels for predicting disease progression (e.g., predicting the number of lesions that an associated MRI had based on protein signatures in blood serum for a single blood draw within 30 days of the MRI.

| Biomarker Set (List of proteins/features) | F6 Avg Performance | | | | | | | | |
|---|---|---|---|---|---|---|---|---|---|
| | Spearman's $R^2$ | Spearman's R | Delta Pearson's $R^2$ | Delta Pearson's $R^2$ | $R^2$ Adj | $R^2$ Delta Adj | Progression Direction | MSE | MAE |
| APLP1, GFAP | 0.267 | 0.084 | 0.306 | 0.094 | 0.269 | 0.098 | Positive | 2.175 | 1.131 |
| MOG, GFAP | 0.261 | 0.081 | 0.334 | 0.103 | 0.299 | 0.108 | Positive | 2.233 | 1.154 |
| NEFL, GFAP | 0.233 | 0.076 | 0.297 | 0.105 | 0.260 | 0.110 | Positive | 2.370 | 1.161 |
| NEFL, MOG | 0.288 | 0.090 | 0.442 | 0.058 | 0.413 | 0.061 | Positive | 1.596 | 0.954 |
| NEFL, SERPINA9 | 0.287 | 0.085 | 0.439 | 0.059 | 0.410 | 0.063 | Positive | 1.608 | 0.966 |
| SERPINA9, FLRT2 | 0.286 | 0.085 | 0.434 | 0.061 | 0.405 | 0.065 | Positive | 1.724 | 1.029 |
| CXCL9, OPG | 0.141 | 0.046 | 0.169 | 0.058 | 0.125 | 0.062 | Negative | 2.743 | 1.207 |
| CD6, IL12B | 0.140 | 0.036 | 0.126 | 0.035 | 0.080 | 0.037 | Negative | 2.870 | 1.235 |
| CD6, APLP1 | 0.133 | 0.054 | 0.152 | 0.053 | 0.107 | 0.056 | Negative | 2.777 | 1.215 |
| NEFL, APLP1, GFAP | 0.279 | 0.089 | 0.309 | 0.103 | 0.253 | 0.111 | Positive | 2.183 | 1.119 |
| NEFL, MOG, GFAP | 0.279 | 0.085 | 0.351 | 0.115 | 0.299 | 0.124 | Positive | 2.216 | 1.135 |
| MOG, APLP1, GFAP | 0.278 | 0.086 | 0.330 | 0.099 | 0.276 | 0.107 | Positive | 2.154 | 1.132 |
| NEFL, MOG, GH | 0.290 | 0.089 | 0.441 | 0.057 | 0.396 | 0.062 | Positive | 1.595 | 0.950 |
| CXCL9, OPG, SERPINA9 | 0.290 | 0.086 | 0.439 | 0.061 | 0.394 | 0.066 | Positive | 1.502 | 0.951 |
| NEFL, MOG, SERPINA9 | 0.290 | 0.087 | 0.445 | 0.061 | 0.400 | 0.065 | Positive | 1.555 | 0.945 |
| CXCL9, OPG, TNFRSF10A | 0.152 | 0.050 | 0.169 | 0.063 | 0.101 | 0.069 | Negative | 2.755 | 1.215 |
| CD6, IL12B, APLP1 | 0.151 | 0.039 | 0.138 | 0.039 | 0.068 | 0.042 | Negative | 2.938 | 1.255 |
| CD6, IL12B, TNFSF13B | 0.146 | 0.030 | 0.116 | 0.037 | 0.044 | 0.040 | Negative | 2.884 | 1.236 |
| NEFL, MOG, APLP1, GFAP | 0.309 | 0.092 | 0.345 | 0.112 | 0.272 | 0.124 | Positive | 2.144 | 1.108 |
| NEFL, MOG, PRTG, GFAP | 0.298 | 0.090 | 0.355 | 0.120 | 0.283 | 0.133 | Positive | 2.162 | 1.104 |
| NEFL, MOG, IL12B, GFAP | 0.297 | 0.100 | 0.333 | 0.123 | 0.259 | 0.137 | Positive | 2.130 | 1.090 |

TABLE 7-continued

Biomarker panels for predicting disease progression (e.g., predicting the number of lesions that an associated MRI had based on protein signatures in blood serum for a single blood draw within 30 days of the MRI.

| Biomarker Set (List of proteins/features) | F6 Avg Performance | | | | | | | | |
|---|---|---|---|---|---|---|---|---|---|
| | Spearman's $R^2$ | Spearman's R | Delta Pearson's $R^2$ | Delta Pearson's $R^2$ | $R^2$ Adj | $R^2$ Delta Adj | Progression Direction | MSE | MAE |
| MOG, CXCL9, OPG, SERPINA9 | 0.293 | 0.087 | 0.441 | 0.061 | 0.378 | 0.068 | Positive | 1.491 | 0.946 |
| NEFL, MOG, GH, SERPINA9 | 0.292 | 0.089 | 0.445 | 0.059 | 0.383 | 0.066 | Positive | 1.553 | 0.943 |
| NEFL, MOG, GH, TNFRSF10A | 0.292 | 0.089 | 0.442 | 0.057 | 0.380 | 0.064 | Positive | 1.592 | 0.948 |
| CD6, CCL20, IL12B, FLRT2 | 0.158 | 0.050 | 0.142 | 0.056 | 0.047 | 0.062 | Negative | 2.919 | 1.243 |
| CD6, IL12B, APLP1, PRTG | 0.156 | 0.034 | 0.137 | 0.040 | 0.042 | 0.044 | Negative | 2.967 | 1.261 |
| CD6, CCL20, IL12B, APLP1 | 0.156 | 0.057 | 0.171 | 0.061 | 0.079 | 0.068 | Negative | 2.973 | 1.257 |

Additional Tables

TABLE 8A

Study codes for analyses of biomarkers

| Study Code | Study Name | Endpoint | Type | Sample Size | Additional Description |
|---|---|---|---|---|---|
| F1 | Serum Pools | MS v. Normal and other Inflammatory Disease | Serum Pools | 4 | 47 individual samples were pooled to 4 serum pools representing MS subjects with shorter disease duration, MS subjects with longer disease duration, healthy controls, and rheumatoid arthritis subjects (representing non-neurological inflammatory disease). |
| F2 | ACP | Exacerbation vs. Quiescence | Cross Sectional | 125 | Protein profiles of 124 patient serum samples measured cross-sectionally to classify whether patient was in the state of exacerbation versus quiescence, as confirmed by a clinician. Whereas the rest of the data in this analysis was accumulated from the CLIMB and EPIC cohorts, this data was assessed based on a cohort of patients from the Accelerated Cure Project. |
| F3A | Brigham AIM2, CLIMB cohort | Relapse/Remission (clinically defined) | Longitudinal | 60 | Longitudinal assessment of 30 paired sample sets in Clinical Relapse/Remission. Clinically defined Relapse/Remission status was assessed by Physician's examination at the time of the blood draw. |
| F3B | Brigham AIM3, CLIMB cohort | GAD + v. Non-GAD + | Longitudinal | 60 | Longitudinal assessment of 30 paired sample sets in Radiographic Relapse/Remission. Radiographic defined Relapse/Remission status was assessed by presence of gadolinium-enhancing lesions on an MRI administered within 30 days of blood draw. |
| F3C | Brigham AIM1, CLIMB cohort | High annualized relapse rate (ARR) v. Low ARR | Cross Sectional | 60 | Protein profiles of 60 patient serum samples measured cross-sectionally to classify whether patient had a low (<0.2) ARR versus a high (>1.0) ARR. |
| Normals | ACP Normal and MS longitudinal | MS v. Normal: Age, Sex, BMI and MS Remission → Remission | MS (Longitudinal) Normals (Cross sectional) | 78 | |
| F4 AIM3 | Brigham GAD + (enhance expansion | GAD + v. Non- and Cross high disease activity) | Longitudinal Sectional | 268 | Longitudinal: Protein profiles of 146 MS serum samples (73 pairs) where 1 time point corresponded to a patient with 0 Gd lesions in time-matched MRI, and the other time point corresponded to the same patient with at least 1 Gd lesion in time-matched MRI. The objective was to classify if a patient had changed from 0 to at least 1 lesion or vice versa. |

TABLE 8A-continued

Study codes for analyses of biomarkers

| Study Code | Study Name | Endpoint | Type | Sample Size | Additional Description |
|---|---|---|---|---|---|
| | | | | | Cross-Sectional: Protein profiles of 326 MS serum samples measured cross-sectionally to classify whether patient had 0 Gd lesions on MRI versus at least 1 Gd lesion on MRI. Analysis of the F4 samples included reanalysis of the AIM3 samples (same endpoint and study). After exclusions this resulted in n = 326. |
| F5 | UCSF EPIC Cohort | GAD + v. Non-GAD + | Cross Sectional | 180 | Protein profiles of subset of 180 patient serum samples across the F5 EPIC study measured cross-sectionally to classify whether patient had 0 Gd lesions on MRI versus at least 1 Gd lesion on MRI. |
| F6 | Univ. of Basel-AIM A SMSC Cohort | Primary: GAD + v. Non-GAD + Secondary: EDSS, T2 volume, ARR and clinically defined relapse status | Longitudinal | 205 | Study investigating MS-specific blood biomarker signatures relevant to clinical & neuroimaging outcomes in samples from the University Hospital Basel Cohort (UHBC). |

TABLE 8B

Additional Descriptors of Studies (e.g., combined studies)

| Study Code | Description for classification |
|---|---|
| F4 Paired-Subtle DA | Protein profiles of 146 MS serum samples (73 pairs) where 1 time point corresponded to a patient with 0 Gd lesions in time-matched MRI, and the other time point corresponded to the same patient with exactly 1 Gd lesion in time-matched MRI. The objective was to classify if a patient had changed from 0 to 1 lesion or vice versa. |
| F4 Paired-General DA | Protein profiles of 196 MS serum samples (98 pairs) where 1 time point corresponded to a patient with 0 Gd lesions in time-matched MRI, and the other time point corresponded to the same patient with at least 1 Gd lesion in time-matched MRI. The objective was to classify if a patient had changed from 0 to positive lesions or vice versa. |
| F4 + F5 (Gd presence)-Subtle DA | Protein profiles of subset of 506 patient serum samples measured cross-sectionally to classify whether patient had 0 Gd lesions on MRI versus exactly 1 Gd lesion on MRI. This is a proxy for subtle disease activity, as measured radiographically. |
| F4 + F5 (Gd presence)-General DA | Protein profiles of 506 patient serum samples (across the EPIC and CLIMB cohorts) measured cross-sectionally to classify whether patient had 0 Gd lesions on MRI versus my Gd lesions on MRI. This is a proxy for general disease activity, as measured radiographically. |
| F4 + F5 (Gd presence)-Extreme DA | Protein profiles of subset of 506 patient serum samples measured cross-sectionally to classify whether patient had 0 Gd lesions on MRI versus at least 3 Gd lesion on MRI. This is a proxy for extreme radiographic disease activity. |
| AIM1 (annualized relapse rate) | Protein profiles of 60 patient serum samples measured cross-sectionally to classify whether patient had a low (<0.2) ARR versus a high (>1.0) ARR. |
| AIM3-Paired | Protein profiles of 58 MS serum samples (98 pairs) where 1 time point corresponded to a patient with 0 Gd lesions in time-matched MRI, and the other time point corresponded to the same patient with at least 1 Gd lesion in time-matched MRI. The objective was to classify if a patient had changed from 0 to positive lesions or vice versa. |
| ACP (exacerbation vs. quiescence) | Protein profiles of 124 patient serum samples measured cross-sectionally to classify whether patient was in the state of exacerbation versus quiescence, as confirmed by a clinician. Whereas the rest of the data in this analysis was accumulated from the CLIMB and EPIC cohorts, this data was assessed based on a cohort of patients from the Accelerated Cure Project. |

TABLE 9

Additional biomarkers for use in predicting multiple sclerosis disease activity.

| Biomarker Name | Biomarker Symbol | Accession Number (Uniprot Database) |
|---|---|---|
| Cell Adhesion Molecule 3 | CADM3 | Q8N126 |
| Kallikrein Related Peptidase 6 | KLK6 | Q92876 |
| Brevican | BCAN | Q96GW7 |
| Oligodendrocyte Myelin Glycoprotein | OMG | P23515 |
| CD5 molecule | CD5 | P06127 |
| Cytotoxic and Regulatory T Cell Molecule | CRTAM | O95727 |
| CD244 Molecule | CD244 | Q9BZW8 |
| Tumor Necrosis Factor Receptor Superfamily Member 9 | TNFRSF9 | Q07011 |
| Proteinase 3 | PRTN3 | P24158 |
| Follistatin Like 3 | FSTL3 | O95633 |
| C-X-C Motif Chemokine Ligand 10 | CXCL10 | P02778 |
| C-X-C Motif Chemokine Ligand 11 | CXCL11 | O14625 |
| Interleukin 18 Binding Protein | IL-18BP | O95998 |
| Macrophage Scavenger Receptor 1 | MSR1 | P21757 |
| C-C Motif Chemokitie Ligatid 3 | CCL3 | P10147 |
| Tumor Necrosis Factor Ligand Superfamily Member 12 | TWEAK | O43508 |
| Trefoil Factor 3 | TFF3 | Q07654 |
| Matrix Metallopeptidase 9 | MMP-9 | P14780 |

TABLE 9-continued

Additional biomarkers for use in predicting multiple sclerosis disease activity.

| Biomarker Name | Biomarker Symbol | Accession Number (Uniprot Database) |
|---|---|---|
| Insulin Like Growth Factor Binding Protein 1 | IGFBP-1 | P08833 |
| Interleukin 12A | IL12A | P29459 |
| Seizure Related 6 Homolog Like | SEZ6L | Q9BYH1 |
| Dipeptidyl Peptidase Like 6 | DPP6 | P42658 |
| Neurocan | NCAN | O14594 |
| Tubulointerstitial Nephritis Antigen Like 1 | TINAGL1 | Q9GZM7 |
| Calcium Activated Nucleotidase 1 | CANT1 | Q8WVQ1 |
| Nectin Cell Adhesion Molecule 2 | NECTIN2 | Q92692 |
| Neural Proliferation, Differentiation and Control Protein 1 | NPDC1 | Q9NQX5 |
| Tumor Necrosis Factor Receptor Superfamily Member 11A | TNFRSF11A | Q9Y6Q6 |
| Contactin 4 | CNTN4 | Q8IWV2 |
| Neutrophic Receptor Tyrosine Kinase 2 | NTRK2 | Q16620 |
| Neutrophic Receptor Tyrosine Kinase 3 | NTRK3 | Q16288 |
| Cadherin 6 | CDH6 | P55285 |
| Carcinoembryonic Antigen Related Cell Adhesion Molecule 8 | CEACAM8 | P31997 |
| Mitotic Arrest Deficient 1 Like 1 | MAD1L1 | Q9Y6D9 |
| Fc Fragment of IgA Receptor | FCAR | P24071 |
| Myeloperoxidase | MPO | P05164 |
| Osteomodulin | OMD | Q99983 |
| Matrix Extracellular Phosphoglycoprotein | MEPE | Q9NQ76 |
| GDNF Family Receptor Alpha 3 | GDNFR-alpha-3 | Q60609 |
| Scavenger Receptor Class F Member 2 | SCARF2 | Q96GP6 |
| CD40 Ligand | IgM | P29965 |
| Tumor Necrosis Factor Receptor Superfamily Member 1B | TNF-R2 | P20333 |
| Programmed Cell Death 1 Ligand | PD-L1 | Q9NZQ7 |
| Notch 3 | NOTCH3 | Q9UM47 |
| Contactin 1 | CNTN1 | Q12860 |
| Oncostatin M | OSM | P13725 |
| Transforming Growth Factor Alpha | TGF-α | P01135 |
| Peptidoglycan Recognition Protein 1 | PGLYRP1 | O75594 |
| Nitric Oxide Synthase 3 | NO53 | P29474 |
| Discoidin Domain Receptor Tyrosine Kinase 1 | DDR1 | Q08345 |
| C-X-C Motif Chemokine Ligand 16 | CXCL16 | Q91-12A7 |
| Interleukin 18 | IL-18 | O14116 |
| Interleukin 6 | IL-6 | P05231 |
| CD166 antigen | ALCAM | O13740 |
| Spondin-2 | SPON2 | Q9BUD6 |
| Protocadherin-17 | PCDH17 | O14917 |

TABLE 10

Substitutable biomarkers for use in predicting multiple sclerosis disease activity.

| Biomarker Symbol | Substitute Biomarker 1 | Substitute Biomarker 2 | Substitute Biomarker 3 | Substitute Biomarker 4 | Substitute Biomarker 5 |
|---|---|---|---|---|---|
| NEFL | MOG (0.200-0.470) | CADM3 (0.142-0.184) | GFAP (0.330 in CSF, 0.509 in Serum) | | |
| MOG | CADM3 (0.217-0.515) | KLK6 (0.226-0.483) | BCAN (0.424-648) | OMG (0.285-0.371) | GFAP (0.164 in Serum) |
| CD6 | CD5 (0.206-0.448) | CRTAM (0.172-0.364) | CD244 (0.159-0.419) | TNFRSF9 (0.154-0.344) | |
| CXCL9 | CXCL10 (0.181-0.621) | CXCL11 (0.152-0.176) | IL-12B (0.206-0.272) | GFAP (0.198 in Serum) | |
| OPG | TFF3 (0.159-0.513) | ENPP2 (0.281-0.330) | | | |
| OPN | OMD (0.459-0.553) | MEPE (0.347-0.515) | GFAP (0.250 in Serum) | | |
| CXCL13 | NOS3 (0.371-0.404) | MMP-2 (0.222 in Serum) | | | |
| GFAP | NEFL (0.509 in Serum) | OPN (0.250 in Serum) | CXCL9 (0.198 in Serum) | MOG (0.164 in Serum) | CHI3L1/YkL40 (0.593 in CSF) |
| CDCP1 | MSR1 (0.365-0.410) | IL-18BP (0.270-0.481) | IL-18 (0.321-0.330) | GFAP (0.136 in Serum) | |
| CCL20/MIP 3-α | CCL3 (0.145-0.150) | TWEAK (0.164-0.199) | | | |
| IL-12B | IL-12 (0.877-0.949) | CXCL9 (0.206-0.272) | | | |
| APLP1 | SEZ6L (0.299-0.369) | BCAN (0.435-0.561) | DPP6 (0.201-0.314) | NCAN (0.213-0.294) | KLK6 (0.217-0.423) |
| TNFRSF10A | TNFRSF11A (0.244-0.355) | SPON2 (0.204-0.549) | CHI3L1 (0.208-0.261) | IFI30 (0.224-0.247) | |

TABLE 10-continued

Substitutable biomarkers for use in predicting multiple sclerosis disease activity.

| Biomarker Symbol | Substitute Biomarker 1 | Substitute Biomarker 2 | Substitute Biomarker 3 | Substitute Biomarker 4 | Substitute Biomarker 5 |
|---|---|---|---|---|---|
| COL4A1 | IL-6 (0.186-0.212) | Notch 3 (0.155-0.246) | PCDH17 (0.107-0.320) | | |
| SERPINA9 | TNFRSF9 (0.169-0.202) | CNTN4 (0.089-0.181) | | | |
| FLRT2 | DDR1 (0.344-0.633) | NTRK2 (0.293-0.698) | CDH6 (0.495-0.522) | MMP-2 (0.134-0.305) | |
| TNFSF13B | CXCL16 (0.514) | ALCAM (0.180-0.501) | IL-18 (0.329 in Serum) | | |
| IFI30 | CEACAM8 (0.547) | MAD1L1 (0.403) | FCAR (0.450) | MPO (0.354) | PRTN3 (0.474) |
| GH | IGFBP-1 (0.162-0.250) | GH2 | | | |
| VCAN | TINAGL1 (0.244-0.460) | CANT1 (0.182-0.517) | NECTIN2 (0.278-0.457) | NPDC1 (0.173-0.426) | MMP-9 (0.301 in Serum) |
| PRTG | NTRK2 (0.219-0.539) | NTRK3 (0.249-0.485) | CNTN4 (0.187-0.446) | | |
| CNTN2 | DPP6 (0.238-0.384) | GDNFR-alpha-3 (0.168-0.325) | SCARF2 (0.113-0.290) | | |
| GH2 | IgM (0.158) | | | | |
| IL18 | IL-18BP (0.338) | TNF-R2 (0.390) | PD-L1 (0.334) | | |
| MMP-2 | Notch 3 (0.616) | CNTN1 (0.582) | | | |

TABLE 11

Biomarker categorizations

| Biomarkers | Category |
|---|---|
| NEFL | Neurodegeneration |
| APLP1 | Neurodegeneration |
| OPG | Neurodegeneration |
| SERPINA9 | Neurodegeneration |
| PRTG | Neurodegeneration |
| GFAP | Neurodegeneration, Myelin Integrity |
| CNTN2 | Neurodegeneration |
| FLRT2 | Neurodegeneration, Neurite Outgrowth & Neurogenesis |
| CCL20 | Inflammation |
| GH | Inflammation |
| CXCL13 | Inflammation |
| IL-12B | Inflammation |
| TNFRSF10A | Inflammation, Neurodegeneration |
| TNFSF13B (BAFF) | Inflammation, Immune Modulation |
| CD6 | Inflammation, Immune Modulation |
| CXCL9 | Inflammation, Immune Modulation |
| VCAN | Inflammation, Myelin Integrity |
| COL4A1 | Myelin Integrity, Neurodegeneration, Neurite Outgrowth & Neurogenesis, |
| MOG | Myelin Integrity, Immune modulation |
| CDCP1 | Immune modulation |
| OPN | Immune Modulation |
| CDH6 | Cell Regulation, Cell Adhesion |
| CADM3 | Cell Regulation |
| DDR1 | Cell Regulation |
| DPP6 | Cell Regulation |
| IGFBP-1 | Cell Regulation |
| MEPE | Cell Regulation |
| NOS3 | Cell Regulation |
| Notch 3 | Cell Regulation |
| OMD | Cell Regulation |
| SCARF2 | Cell Regulation |
| TINAGL1 | Cell Regulation |
| TNFRSF11A | Cell Regulation |
| TFF3 | Gut-Brain Axis |
| CD244 | Immune Modulation |
| CD5 | Immune Modulation |
| CRTAM | Immune Modulation |
| CXCL11 | Immune Modulation |
| CXCL16 | Immune Modulation |
| NECTIN2 | Immune Modulation |
| PD-L1 | Immune Modulation |
| TNFRSF9 | Immune Modulation |
| CCL3 | Inflammation |
| GH2 | Inflammation |
| IFI30 (GILT) | Inflammation |
| IL-18 | Inflammation |
| IL-18BP | Inflammation |
| IL12A | Inflammation |
| MMP-2 | Inflammation |
| MMP-9 | Inflammation |
| TWEAK | Inflammation, Cell Regulation |
| CXCL10 | Inflammation, Immune Modulation |
| IL6 | Inflammation, Immune Modulation |
| YkL40 (CHI3L1) | Inflammation, Immune Modulation |
| ENPP2 | Metabolism |
| MSR1 | Metabolism |
| CANT1 | Metabolism |
| OMG | Immune Modulation, Myelin Integrity |
| ALCAM | Neurite Outgrowth & Neurogenesis |
| BCAN | Neurite Outgrowth & Neurogenesis |
| CNTN4 | Neurite Outgrowth & Neurogenesis |
| KLK6 | Neurite Outgrowth & Neurogenesis |
| NCAN | Neurite Outgrowth & Neurogenesis |
| NTRK2 | Neurite Outgrowth & Neurogenesis |
| SPON2 | Neurite Outgrowth & Neurogenesis |
| GDNFR-alpha-3 | Neuroregulatory |
| NPDC1 | Neuroregulatory |
| NTRK3 | Neuroregulatory |

TABLE 11-continued

Biomarker categorizations

| Biomarkers | Category |
|---|---|
| PCDH17 | Neuroregulatory |
| SEZ6L | Neuroregulatory |
| TNF-R2 | Neuroregulatory |

TABLE 12

Biomarker involvement in particular locations (brain, brain barrier, blood). Numerical indicators are on a scale of 1-5, with 1 indicating that corresponding biomarker is minimally found in the location whereas 5 indicating that corresponding biomarker is heavily found in the location.

| Biomarker | Brain | Brain Barrier | Blood |
|---|---|---|---|
| TNFSF13B | 1 | | 5 |
| CXCL13 | | | 1 |
| GFAP | 5 | | 1 |
| IL12B | | | 2 |
| MOG | 4 | | |
| NFL | 4 | | 2 |
| OPG | | | 2 |
| OPN | 4 | | 1 |
| TNFRSF10A | | | 2 |
| APLP1 | 4 | | |
| CCL20 | | | 2 |
| CD6 | | | 3 |
| CDCP1 | | | 2 |
| CNTN2 | 4 | | |
| COL4A1 | 1 | 4 | |
| CXCL9 | | 4 | 1 |
| FLRT2 | 2 | 3 | |
| GH | | | 1 |
| PRTG | 1 | 1 | |
| SERPINA9 | | | 3 |
| VCAN | 2 | | 4 |

TABLE 13A

Biomarker involvement in particular cell types. Numerical indicators are on a scale of 1-4, with 1 indicating that corresponding biomarker is minimally found in the cell type whereas 4 indicating that corresponding biomarker is heavily found in the cell type.

| Biomarker | Neuronal Cells | OPCs | Oligodendrocytes | Astrocytes | Microglia | Pericytes | Endothelial Cells | VLMCs |
|---|---|---|---|---|---|---|---|---|
| TNFSF13B | 1 | | | | | | | |
| CXCL13 | | | | | | | | |
| GFAP | | | | 4 | | | | |
| IL12B | | | | | | | | |
| MOG | | | 4 | | | | | |
| NFL | 4 | | | | | | | |
| OPG | | | | | | | | |
| OPN | 3 | | 4 | 3 | | | | |
| TNFRSF10A | | | | | | | | |
| APLP1 | 3 | | 4 | | | | | |
| CCL20 | | | | | | | | |
| CD6 | | | | | | | | |
| CDCP1 | | | | | | | | |
| CNTN2 | 3 | | 4 | | | | | |
| COL4A1 | 2 | | | | | 3 | | 3 |
| CXCL9 | | | | | | | 3 | |
| FLRT2 | 3 | 2 | | 2 | | | | 4 |
| GH | | | | | | | | |
| PRTG | 2 | | | 2 | | | 2 | |
| SERPINA9 | | | | | | | | |
| VCAN | 2 | 4 | | 3 | | | | 3 |

TABLE 13B

Biomarker involvement in particular cell types. Numerical indicators are on a scale of 1-4, with 1 indicating that corresponding biomarker is minimally found in the cell type whereas 4 indicating that corresponding biomarker is heavily found in the cell type.

| Biomarker | T Cells | B Cells | NK Cells | Granulocytes | Dendritic Cells | Monocytes |
|---|---|---|---|---|---|---|
| TNFSF13B | 1 | | | 4 | 2 | 2 |
| CXCL13 | 1 | | | | | |
| GFAP | 1 | 1 | 1 | 1 | | |
| IL12B | | | | 2 | | |
| MOG | | | | | | |
| NFL | 2 | | | | | |
| OPG | | | | | 2 | |
| OPN | | | | 1 | | |
| TNFRSF10A | 2 | 2 | 1 | 1 | 1 | 1 |
| APLP1 | | | | | | |
| CCL20 | 2 | 2 | | | | |
| CD6 | 3 | | | | | |
| CDCP | | | 1 | | 1 | |
| CNTN2 | | | | | | |
| COL4A1 | | | | | | |
| CXCL9 | | | | | | 1 |
| FLRT2 | | | | | | |
| GH | 1 | 1 | | | | |
| PRTG | | | | | | |
| SERPINA9 | | | | | | 2 |
| VCAN | 2 | | | | 3 | 4 |

The invention claimed is:

1. A method for determining multiple sclerosis (MS) disease activity in a subject, the method comprising:
   obtaining or having obtained a dataset comprising expression levels of a plurality of biomarkers, wherein the plurality of biomarkers comprise at least one protein from each of
   biomarker 1, biomarker 2, biomarker 3, biomarker 4, biomarker 5, biomarker 6, biomarker 7, and biomarker 8,
   wherein biomarker 1 is NEFL, MOG, CADM3, or GFAP,
   wherein biomarker 2 is MOG, CADM3, KLK6, BCAN, OMG, or GFAP,
   wherein biomarker 3 is CD6, CD5, CRTAM, CD244, or TNFRSF9,
   wherein biomarker 4 is CXCL9, CXCL10, IL-12B, CXCL11, or GFAP,
   wherein biomarker 5 is OPG, TFF3, or ENPP2,
   wherein biomarker 6 is OPN, OMD, MEPE, or GFAP, wherein biomarker 7 is CXCL13, NOS3, or MMP-2, and wherein biomarker 8 is GFAP, NEFL, OPN, CXCL9, MOG, or CHI3L1, wherein the at least one protein from each biomarker is different from each other, generating a prediction of multiple sclerosis disease activity by applying a predictive model to the expression levels of the plurality of biomarkers, and providing the prediction of multiple sclerosis disease activity for selecting a therapeutic agent(s) or plasma exchange for administering to the subject based on the prediction of multiple sclerosis disease activity in the subject.

2. The method of claim 1, wherein the plurality of biomarkers comprise each biomarker in group 1, wherein biomarker 1 is NEFL, wherein biomarker 2 is MOG, wherein biomarker 3 is CD6, wherein biomarker 4 is CXCL9, wherein biomarker 5 is OPG, wherein biomarker 6 is OPN, wherein biomarker 7 is CXCL13, and wherein biomarker 8 is GFAP.

3. The method of claim 2, wherein a performance of the predictive model is characterized by an area under the curve (AUC) ranging from 0.667 to 0.869.

4. The method of claim 2, wherein a performance of the predictive model is characterized by a positive predictive value ranging from 0.617 up to 0.861.

5. The method of claim 1, wherein the multiple sclerosis disease activity is any one of:
    a presence of general disease activity, a presence of subtle disease activity, a shift increase or decrease) in disease activity, a severity of MS, a relapse or flare event associated with MS, a rate of relapse, a MS state, a response to a MS therapy, a degree of MS disability, or a risk of developing MS.

6. The method of claim 1, further comprising classifying the subject based on the prediction.

7. The method of claim 1, wherein generating the prediction of multiple sclerosis disease activity comprises comparing a score outputted by the predictive model to a reference score.

8. The method of claim 7, wherein the reference score corresponds to any of:
    A) the patient at a baseline timepoint when the patient was not exhibiting disease activity,
    B) clinically diagnosed patients with no disease activity, or
    C) healthy patients.

9. The method of claim 1, wherein the expression levels of the plurality of biomarkers is determined from a test sample obtained from the subject.

10. The method of claim 9, wherein the test sample is a blood or serum sample.

11. The method of claim 9 or 10, wherein the subject has multiple sclerosis, is suspected of having multiple sclerosis, or was previously diagnosed with multiple sclerosis.

12. The method of claim 1, wherein obtaining or having obtained the dataset comprises performing an immunoassay to determine the expression levels of the plurality of biomarkers.

13. The method of claim 12, wherein the immunoassay is a Proximity Extension Assay (PEA) or a Multiplex Assay.

14. The method of claim 1, further comprising:
    determining a differential diagnosis of multiple sclerosis based on the prediction of multiple sclerosis disease activity.

15. The method of claim 14, wherein the differential diagnosis of multiple sclerosis comprises at least one of relapsing-remitting multiple sclerosis (RRMS), secondary progressive multiple sclerosis (SPMS), primary-progressive multiple sclerosis (PPMS), progressive relapsing multiple sclerosis (PRMS), and clinically isolated syndrome (CIS).

* * * * *